(12) United States Patent
Hoang et al.

(10) Patent No.: US 9,315,591 B2
(45) Date of Patent: Apr. 19, 2016

(54) MODIFIED PHOSPHINIMINE CATALYSTS FOR OLEFIN POLYMERIZATION

(71) Applicant: NOVA Chemicals (International) S.A., Fribourg (CH)

(72) Inventors: Peter Phung Minh Hoang, Calgary (CA); Victoria Ker, Calgary (CA); Charles Ashton Garret Carter, Calgary (CA); Sergio Alejandro Guillen-Castellanos, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/463,046

(22) Filed: Aug. 19, 2014

(65) Prior Publication Data
US 2014/0357819 A1     Dec. 4, 2014

Related U.S. Application Data

(63) Continuation-in-part of application No. 14/447,720, filed on Jul. 31, 2014, which is a continuation-in-part of application No. 13/200,144, filed on Sep. 19, 2011, now Pat. No. 8,952,111.

(30) Foreign Application Priority Data

Jun. 9, 2011     (CA)  ...................................... 2742461

(51) Int. Cl.

| | |
|---|---|
| C08F 4/649 | (2006.01) |
| C08F 4/6592 | (2006.01) |
| C08F 210/16 | (2006.01) |
| C08F 10/00 | (2006.01) |
| C08F 4/52 | (2006.01) |
| C08F 10/02 | (2006.01) |
| C08F 110/02 | (2006.01) |
| C08F 4/659 | (2006.01) |

(52) U.S. Cl.
CPC ................. *C08F 4/52* (2013.01); *C08F 4/6494* (2013.01); *C08F 4/6592* (2013.01); *C08F 10/02* (2013.01); *C08F 4/65912* (2013.01); *C08F 4/65916* (2013.01); *C08F 110/02* (2013.01); *C08F 210/16* (2013.01); *C08F 2410/01* (2013.01); *C08F 2420/04* (2013.01)

(58) Field of Classification Search
CPC .. C08F 4/6494; C08F 4/6495; C08F 4/65912; C08F 4/65916; C08F 4/6592; C08F 10/00; C08F 210/16
See application file for complete search history.

(56) References Cited

U.S. PATENT DOCUMENTS

| | | | |
|---|---|---|---|
| 3,248,179 A | 4/1966 | Norwood | |
| 4,325,849 A | 4/1982 | Rosen et al. | |
| 4,543,399 A | 9/1985 | Jenkins, III et al. | |
| 4,588,790 A | 5/1986 | Jenkins, III et al. | |
| 4,613,484 A | 9/1986 | Ayres et al. | |
| 5,028,670 A | 7/1991 | Chinh et al. | |
| 5,206,075 A | 4/1993 | Hodgson, Jr. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,433,471 A | 7/1995 | Shepherd et al. | |
| 5,434,116 A | 7/1995 | Sone et al. | |
| 5,436,304 A | 7/1995 | Griffin et al. | |
| 5,462,999 A | 10/1995 | Griffin et al. | |
| 5,554,775 A | 9/1996 | Krishnamurti et al. | |
| 5,616,661 A | 4/1997 | Eisinger et al. | |
| 5,637,659 A | 6/1997 | Krishnamurti et al. | |
| 5,668,228 A | 9/1997 | Chinh et al. | |
| 5,684,097 A | 11/1997 | Palmroos et al. | |
| 5,712,352 A | 1/1998 | Brant et al. | |
| 5,763,543 A | 6/1998 | Muhle et al. | |
| 5,965,677 A | 10/1999 | Stephan et al. | |
| 6,008,662 A | 12/1999 | Newton et al. | |
| 6,063,879 A | 5/2000 | Stephan et al. | |
| 6,114,479 A | 9/2000 | Speca et al. | |
| 6,117,955 A | 9/2000 | Agapiou et al. | |
| 6,124,230 A | 9/2000 | Speca et al. | |
| 6,140,432 A | 10/2000 | Agapiou et al. | |
| 6,180,729 B1 | 1/2001 | Lange et al. | |
| 6,180,736 B1 | 1/2001 | Muhle et al. | |
| 6,201,076 B1 | 3/2001 | Etherton et al. | |
| 6,235,672 B1 | 5/2001 | McKay et al. | |
| 6,277,931 B1 | 8/2001 | Jaber et al. | |
| 6,342,463 B1 | 1/2002 | Stephan et al. | |
| 6,372,864 B1 | 4/2002 | Brown | |
| 6,399,535 B1 | 6/2002 | Shih et al. | |
| 6,476,165 B1 | 11/2002 | Wang | |
| 6,559,090 B1 | 5/2003 | Shih et al. | |
| 6,686,306 B2 | 2/2004 | Shih | |

(Continued)

FOREIGN PATENT DOCUMENTS

| | | |
|---|---|---|
| CA | 2 716 772 A1 | 4/2011 |
| EP | 0 630 910 A1 | 12/1994 |

(Continued)

OTHER PUBLICATIONS

Catalysts, Supported; Kirk-Othmer Encyclopedia of Chemical Technology, Copyright John Wiley & Sons; pp. 1-37.
Wild, L., Ryle, T.R., Knobeloch, D.C. and Peat, I.R.; Determination of Branching Distributions in Polyethylene and Ethylene Copolymers, Journal of Polymer Science; Polymer Physics Edition, vol. 20, (1982) pp. 441-455.
Pangborn, Amy B., Giardello, Michael A., Grubbs, Robert H., Rosen, Robert K. and Timmers, Francis J., Safe and Convenient Procedure for Solvent Purification, Organometallics, 1996, vol. 15, pp. 1518-1520.
Peri, J.B. and Hensley, A.L., Jr., The Surface Structure of Silica Gel, The Journal of Physical Chemistry, vol. 72, Aug. 1968, pp. 2926-2933.

(Continued)

*Primary Examiner* — Caixia Lu
(74) *Attorney, Agent, or Firm* — Julie L. Heinrich

(57) ABSTRACT

Olefin polymerization is carried out with a supported phosphinimine catalyst which has been treated with a long chain substituted amine compound.

22 Claims, 21 Drawing Sheets

(56) References Cited

U.S. PATENT DOCUMENTS

| | | |
|---|---|---|
| 6,734,131 B2 | 5/2004 | Shih et al. |
| 6,777,509 B2 | 8/2004 | Brown et al. |
| 6,968,375 B1 | 11/2005 | Brown |
| 6,977,283 B1 | 12/2005 | Shutt et al. |
| 6,984,695 B2 | 1/2006 | Brown et al. |
| 7,531,602 B2 | 5/2009 | Hoang et al. |
| 2005/0148742 A1 | 7/2005 | Hagerty et al. |
| 2006/0189769 A1* | 8/2006 | Hoang et al. ............ 526/129 |
| 2010/0029877 A1* | 2/2010 | Funaya et al. ............ 526/209 |

FOREIGN PATENT DOCUMENTS

| | | |
|---|---|---|
| EP | 0 659 773 A1 | 6/1995 |
| EP | 0 811 638 A2 | 12/1997 |
| WO | 93/03093 A1 | 2/1993 |

OTHER PUBLICATIONS

Brunauer, Stephen, Emmett, P.H. and Teller, Edward, Adsorption of Gases in Multimolecular Layers, Journal of the American Chemical Society, vol. 60, Feb. 1938, pp. 309-319.

* cited by examiner

MODIFIED PHOSPHINIMINE CATALYSTS FOR OLEFIN POLYMERIZATION

CROSS REFERENCE TO RELATED PATENT APPLICATION

This application is a continuation-in-part of U.S. Ser. No. 14/447,720, filed on Jul. 31, 2014 which is a continuation-in part of U.S. application Ser. No. 13/200,144, filed on Sep. 19, 2011, which claims priority to and the benefit of Canadian Application No. 2,742,461, filed Jun. 9, 2011.

FIELD OF THE INVENTION

The present invention relates to supported phosphinimine catalysts, which when treated with appropriate amounts of a suitable catalyst modifier, have improved activity and which produce improved polyethylene with improved reactor operability. Catalyst modifiers comprise at least one long chain substituted amine and are present in a phosphinimine based polymerization catalyst prior to its entry into a polymerization reactor.

BACKGROUND OF THE INVENTION

Gas phase olefin polymerization with single site catalysts has been a well-established art field since the invention of metallocene catalysts over two decades ago. Although single site polymerization catalysts (such as metallocene catalysts, constrained geometry catalysts, and phosphinimine catalysts) are often chosen for their very high activity, the use of such catalysts can lead to reactor fouling especially in a fluidized bed gas phase reactor. Such fouling may include polymer agglomeration, sheeting, or chunking, and may ultimately require reactor shut down.

In order to improve reactor operability, several specialized catalyst preparative methods, operating conditions, and additives have been used to modify the performance of metallocenes and to reduce reactor fouling.

European Pat. Appl. No. 630,910 discusses reversibly reducing the activity of a metallocene catalyst using a Lewis base compound such as for example an amine compound.

Long chain substituted alkanolamine compounds in particular, have been used in combination with metallocenes to reduce the amount of reactor fouling in fluidized bed polymerization processes. The use of substituted alkanolamines in combination with metallocene catalysts to improve reactor operability and reduce static levels is described in European Pat. Appl. No. 811,638 and in U.S. Pat. Nos. 5,712,352; 6,201,076; 6,476,165; 6,180,729; 6,977,283; 6,114,479; 6,140,432; 6,124,230; 6,117,955; 5,763,543; and 6,180,736. Alkanolamines have been added to a metallocene catalyst prior to addition to a reaction zone, as described in U.S. Pat. Nos. 6,140,432; 6,124,230 and 6,114,479. Alkanolamines have also been added directly to a reactor or other associated parts of a fluidized bed reactor processes such as the recycle stream loop as is taught in European Pat. Appl. No. 811,638 and in U.S. Pat. No. 6,180,729 respectively.

There has been no systematic exploration of the effect of long chain substituted amines, including monoalkanolamines and dialkanolamines, on supported phosphinimine catalysts.

SUMMARY OF THE INVENTION

We now report that a supported phosphinimine catalyst which has been treated with appropriate amounts of a suitable catalyst modifier, operates at higher productivity levels and with reduced associated reactor fouling. When specific levels of catalyst modifier were added to a supported phosphinimine catalyst, the productivity could be increased by more than 10%. Surprisingly, treatment of a supported phosphinimine catalyst with a suitable catalyst modifier, also lead to modified, even improved copolymer products, which had increased branching homogeneity and could be used to make cast film having lower gel levels.

The present invention is directed to the use of a catalyst modifier comprising at least one long-chain amine. Addition of a catalyst modifier to a supported phosphinimine catalyst for use in a gas phase polymerization reactor, gives very good reactor operability, improved polymer product and few reactor discontinuity events. An example of a suitable catalyst modifier is a long chain amine compound such as a C6 to C30 hydrocarbyl substituted dialkanolamine.

Provided is a process for polymerizing ethylene and optionally an alpha olefin in a reactor with a polymerization catalyst comprising: i) a phosphinimine catalyst; ii) an inert support; iii) a cocatalyst; and iv) a catalyst modifier; wherein the catalyst modifier comprises at least one long-chain amine compound and is present in an amount to give from 1.0 to 4.0 weight percent of catalyst modifier based on the weight of i), ii) and iii) of the polymerization catalyst.

Provided is a process for polymerizing ethylene and optionally an alpha olefin in a reactor, the process comprising introducing a polymerization catalyst into the reactor, the polymerization catalyst comprising: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula:
$R^1R^2{}_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

Provided is an olefin polymerization catalyst comprising: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula: $R^1R^2{}_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

Provided is a polymerization process comprising contacting ethylene and at least one alpha olefin with a polymerization catalyst in a gas phase reactor, the polymerization catalyst comprising: i) a phosphinimine catalyst, ii) an inert support, iii) a cocatalyst, and iv) a catalyst modifier; wherein the catalyst modifier is present in from 0.25 to 6.0 weight percent based on the weight of i), ii) and iii) of the polymerization catalyst and comprises a compound having the formula: $R^1R^2{}_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; and wherein the polymerization catalyst is prepared by adding all of the catalyst modifier to the inert support prior to the addition of the phosphinimine catalyst and prior to the addition of the cocatalyst.

Provided is a polymerization catalyst comprising: i) a phosphinimine catalyst; ii) an inert support; iii) a cocatalyst; and iv) a catalyst modifier; wherein the catalyst modifier is present from 0.25 to 6.0 weight percent based on the weight of i), ii) and iii) of the polymerization catalyst and comprises a compound having the formula: $R^1R^2{}_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; and wherein the polymerization catalyst is prepared by adding all of the catalyst modifier to the inert support prior to the addition of the phosphinimine catalyst and prior to the addition of the cocatalyst.

In an embodiment of the invention, a catalyst modifier is present in from 1.0 to 4.0 weight percent based on the weight of i), ii) and iii) of a polymerization catalyst comprising: i) a phosphinimine catalyst; ii) an inert support; iii) a cocatalyst; and iv) a catalyst modifier.

In an embodiment of the invention, a catalyst modifier is present in from 1.5 to 3.5 weight percent based on the weight of i), ii) and iii) of a polymerization catalyst comprising: i) a phosphinimine catalyst; ii) an inert support; iii) a cocatalyst; and iv) a catalyst modifier.

In an embodiment of the invention, a catalyst modifier comprises at least one compound represented by the formula: $R^1N((CH_2)_nOH)((CH_2)_mOH)$ where $R^1$ is a hydrocarbyl group having anywhere from 5 to 30 carbon atoms, and n and m are integers from 1-20.

In an embodiment of the invention, a catalyst modifier comprises at least one compound represented by the formula: $R^1N((CH_2)_nOH)_2$ where $R^1$ is an hydrocarbyl group having anywhere from 6 to 30 carbon atoms, and n is an integer from 1-20.

In an embodiment of the invention, a catalyst modifier comprises at least one compound represented by the formula: $R^1N(CH_2CH_2OH)_2$ where $R^1$ is an hydrocarbyl group having anywhere from 6 to 30 carbon atoms.

In an embodiment of the invention, a phosphinimine catalyst has the formula: $(L)(PI)MX_2$, where M is Ti, Zr or Hf; PI is a phosphinimine ligand having the formula $R_3P=N-$, where R is independently selected from the group consisting of hydrogen, halogen, and $C_1$-$C_{20}$ hydrocarbyl; L is a ligand selected from the group consisting of cyclopentadienyl, substituted cyclopentadienyl, indenyl, substituted indenyl, fluorenyl, and substituted fluorenyl; and X is an activatable ligand.

In an embodiment of the invention, a cocatalyst is selected from the group consisting of ionic activators, alkylaluminoxanes and mixtures thereof.

In an embodiment of the invention, the polymerization process is a gas phase polymerization process carried out in a fluidized bed reactor.

DETAILED DESCRIPTION OF PREFERRED EMBODIMENTS

Figure 1:
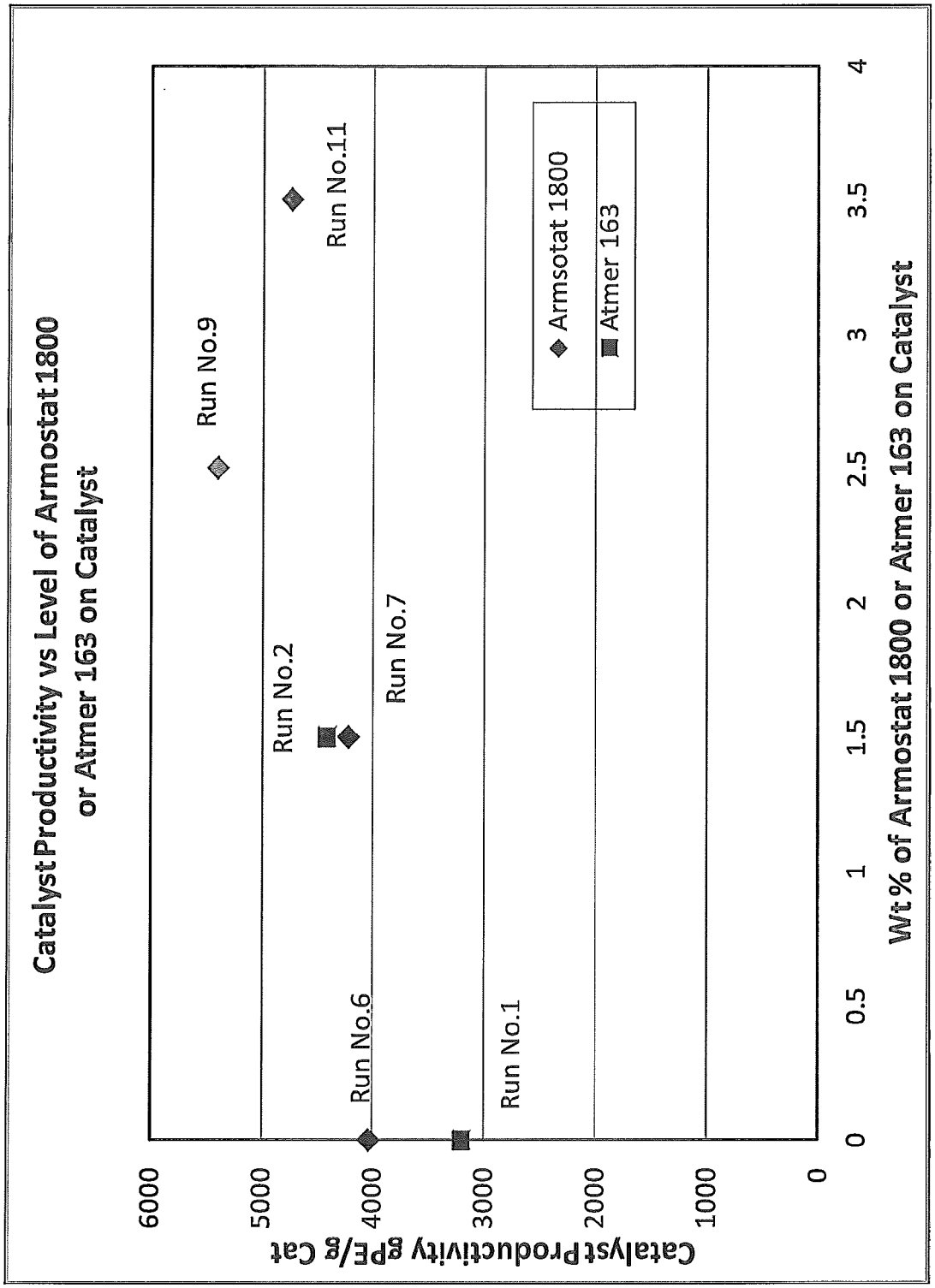
FIG. 1 shows how the productivity of the polymerization catalyst improves when different levels and type of catalyst modifier are included in the catalyst formulation. Poly. Run Nos. 7, 9 and 11 for various levels of Armostat-1800, relative to baseline Run No. 6. Poly. Run No. 2 for Atmer-163 relative to baseline Run No. 1. Baseline polymerization runs are where there is no catalyst modifier included in the catalyst formulation.
Figure 2:
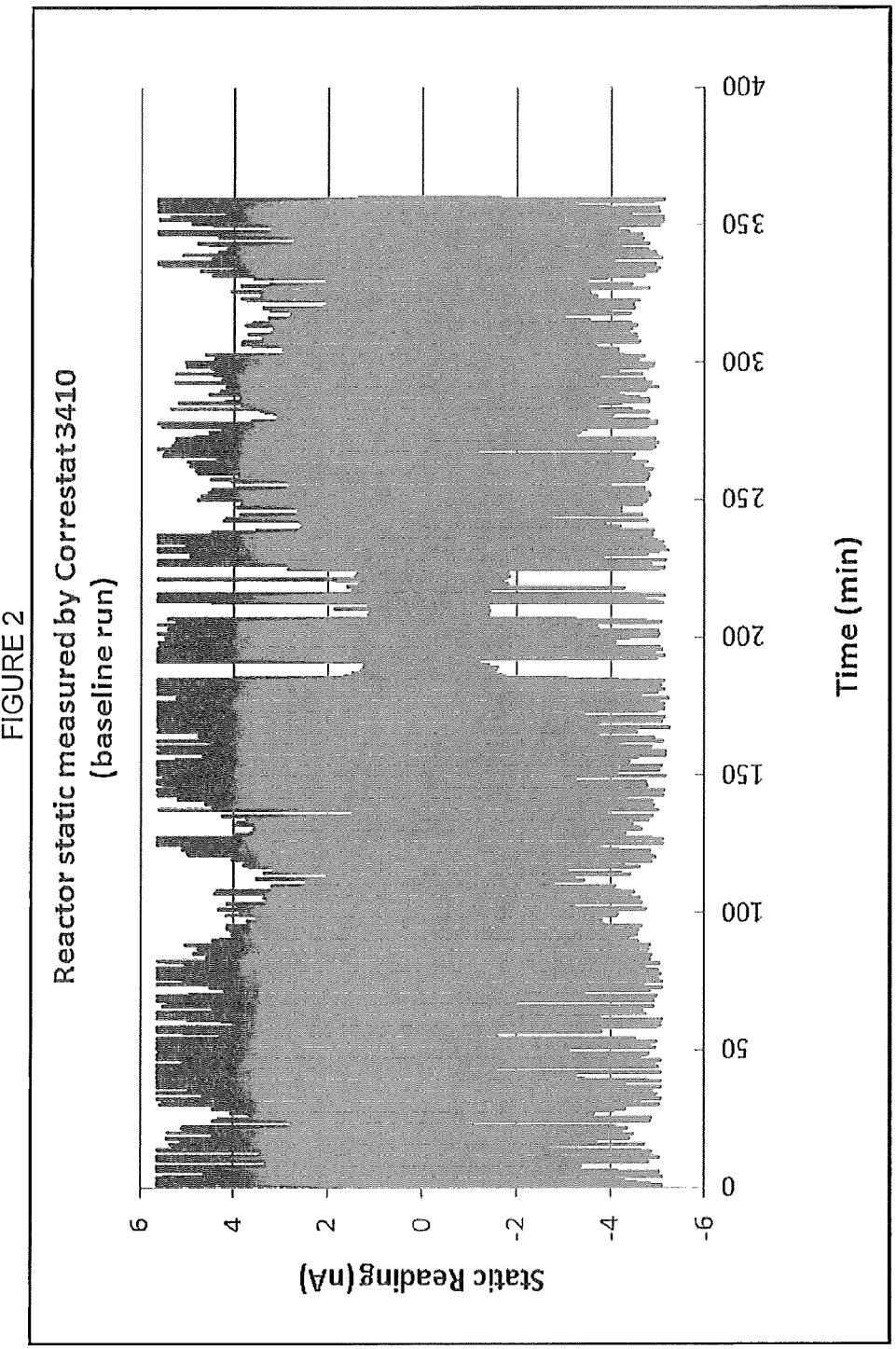
FIG. 2 shows the reactor static in nanoamps (nA) over time, measured using a Correstat 3410 static probe located in the reactor during a polymerization run. The polymerization is carried out in the presence of a catalyst not treated with a catalyst modifier (baseline Run No. 1).
Figure 3:
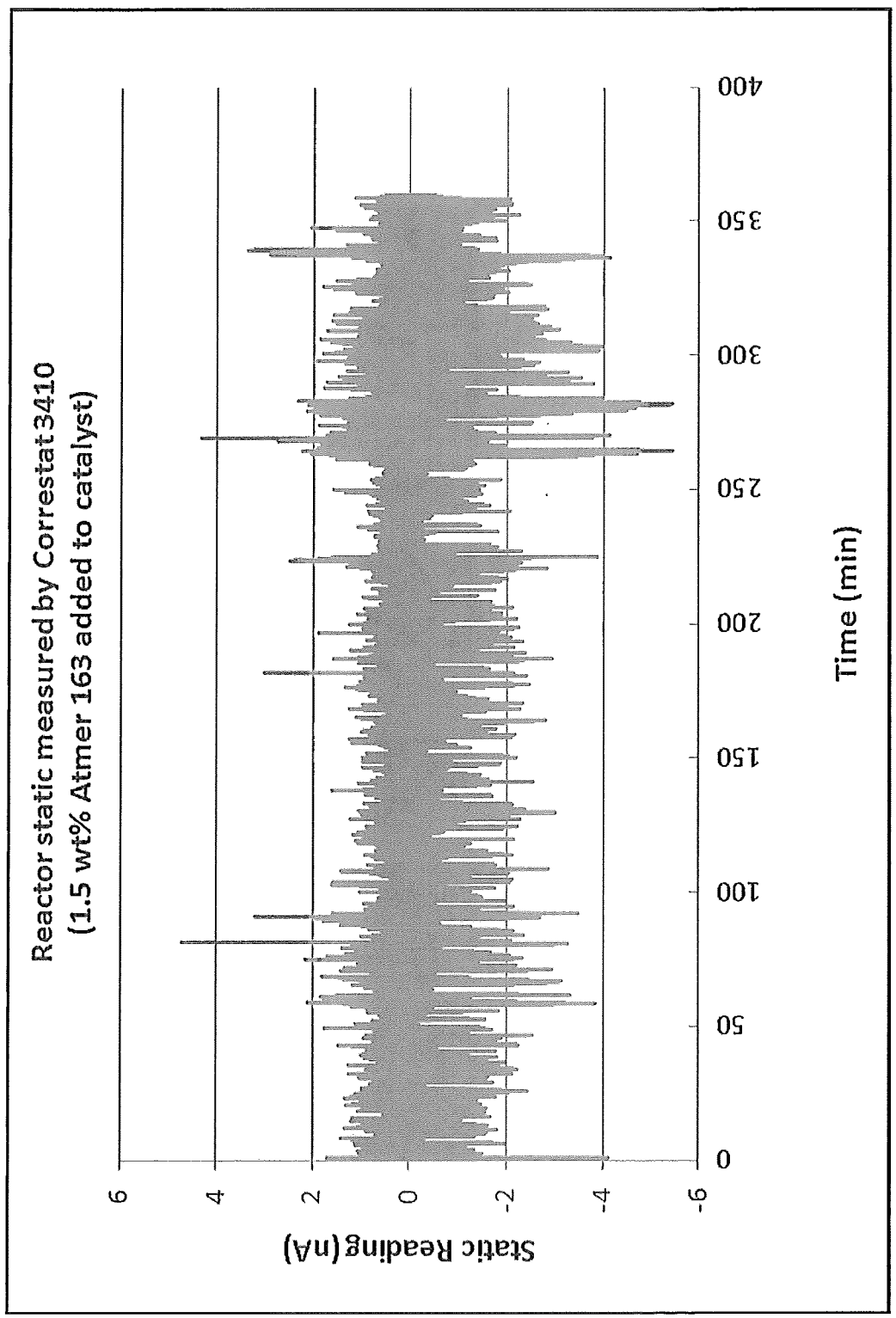
FIG. 3 shows the reactor static in nanoamps (nA) over time, measured using a Correstat 3410 static probe located in the reactor during a polymerization run. The polymerization is carried out in the presence of catalyst treated with 1.5 wt % of Atmer-163.
Figure 4:
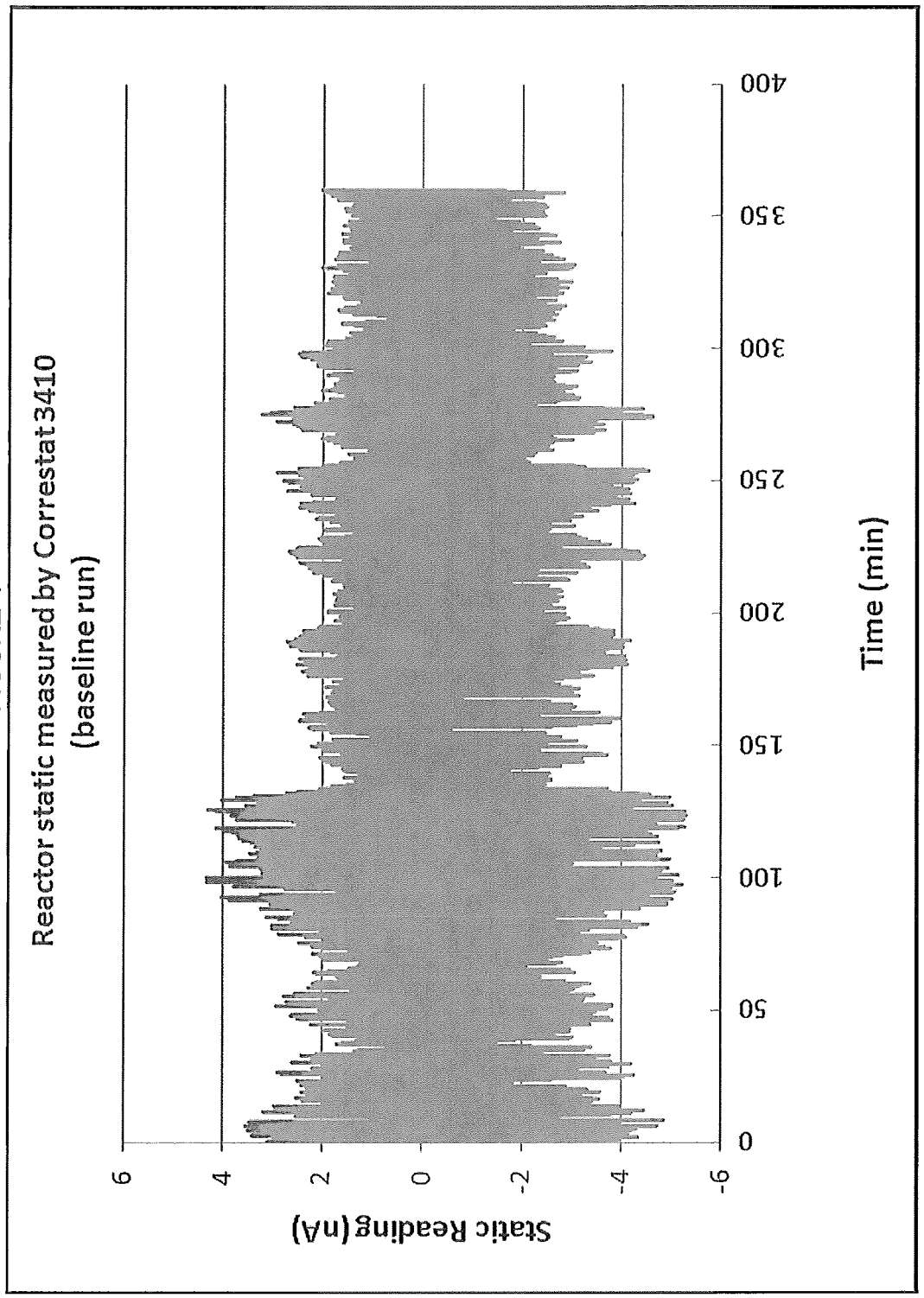
FIG. 4 shows the reactor static in nanoamps (nA) over time, measured using a Correstat 3410 static probe located in the reactor during a polymerization run. The polymerization is carried out in the presence of a catalyst not treated with a catalyst modifier (baseline Run No. 6).
Figure 5:
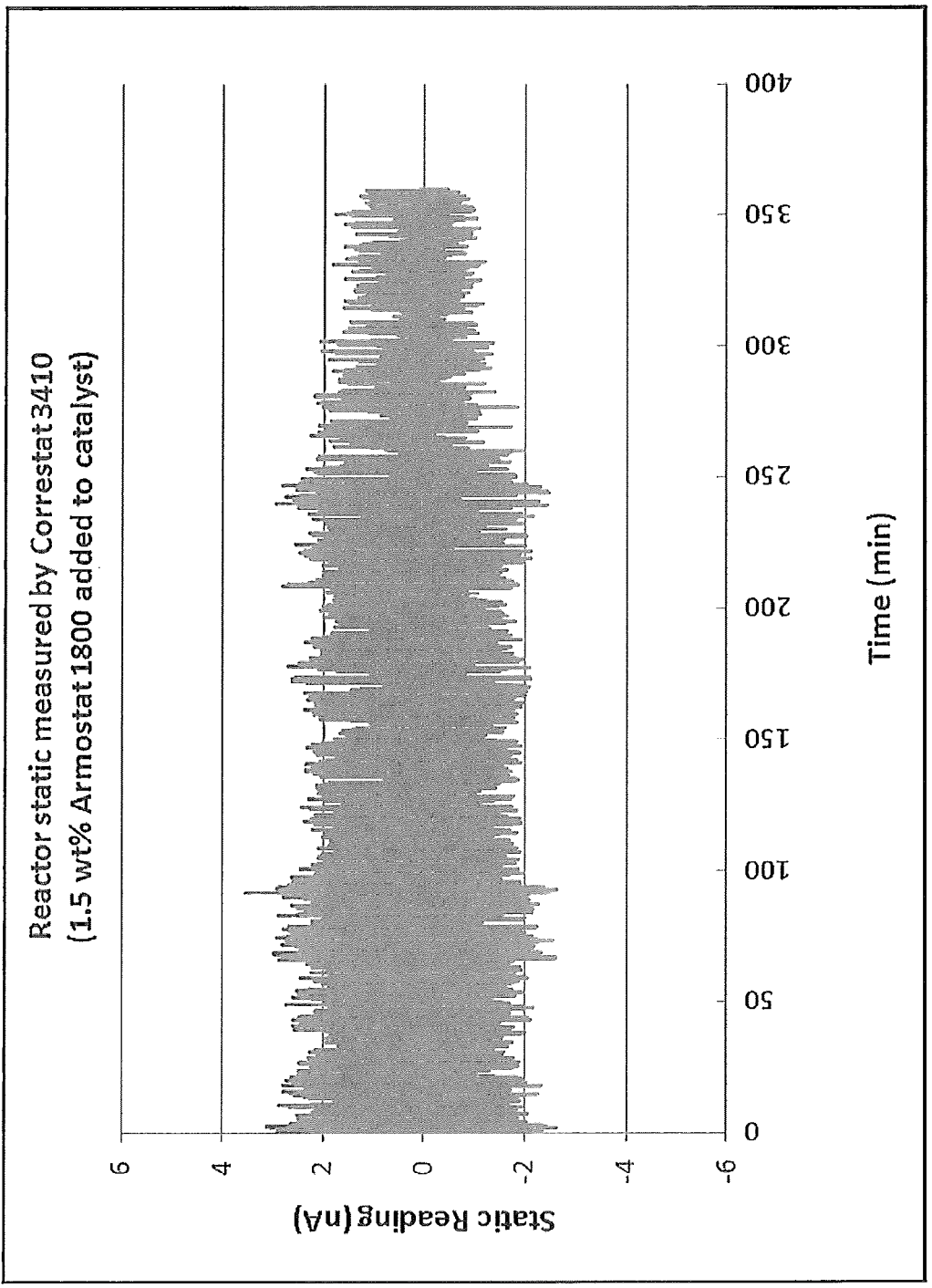
FIG. 5 shows the reactor static in nanoamps (nA) over time, measured using a Correstat 3410 static probe located in the reactor during a polymerization run. The polymerization is carried out in the presence of catalyst treated with 1.5 wt % of Armostat-1800.
Figure 6:
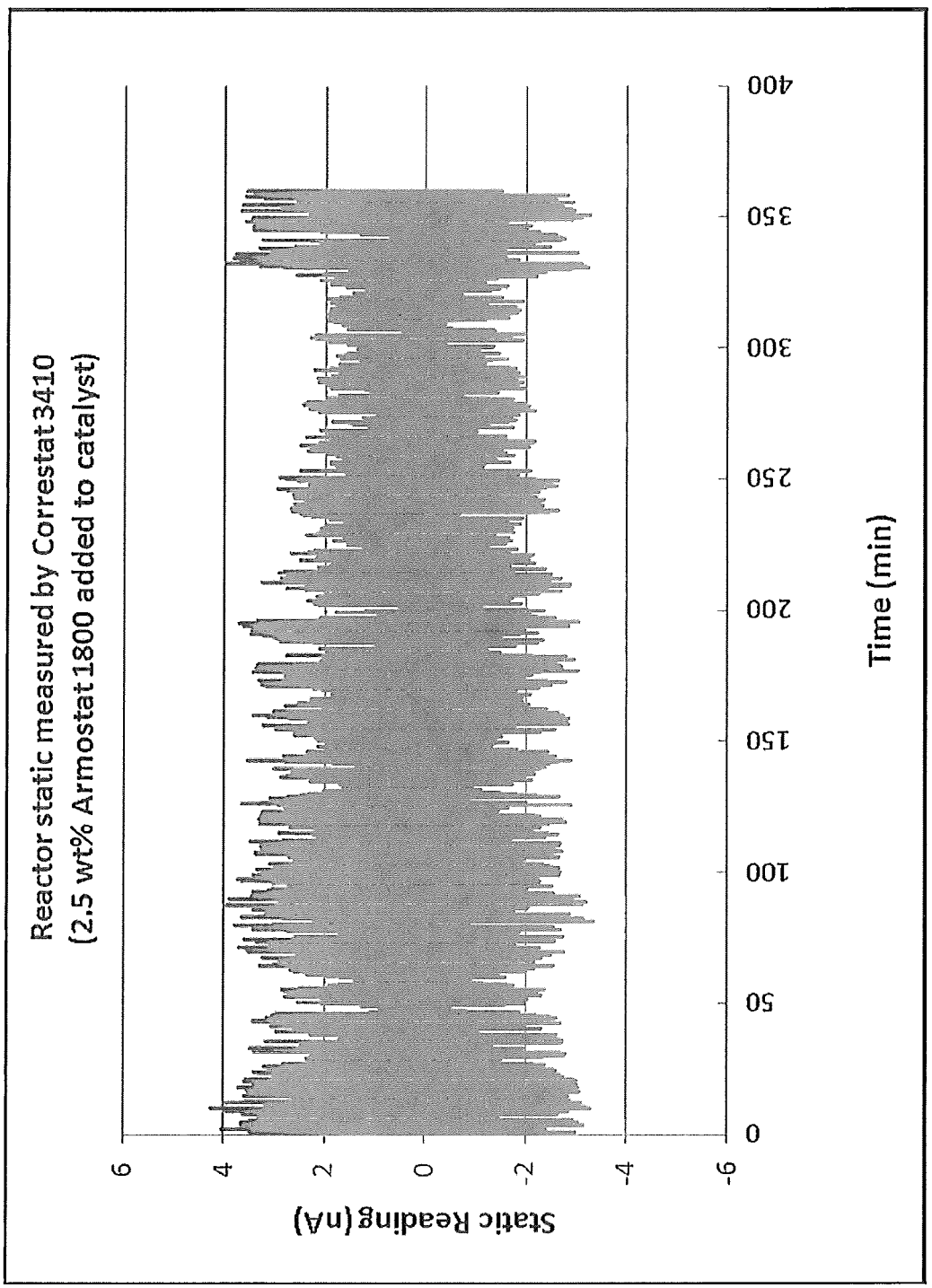
FIG. 6 shows the reactor static in nanoamps (nA) over time, measured using a Correstat 3410 static probe located in the reactor during a polymerization run. The polymerization is carried out in the presence of catalyst treated with 2.5 wt % of Armostat-1800.
Figure 7:
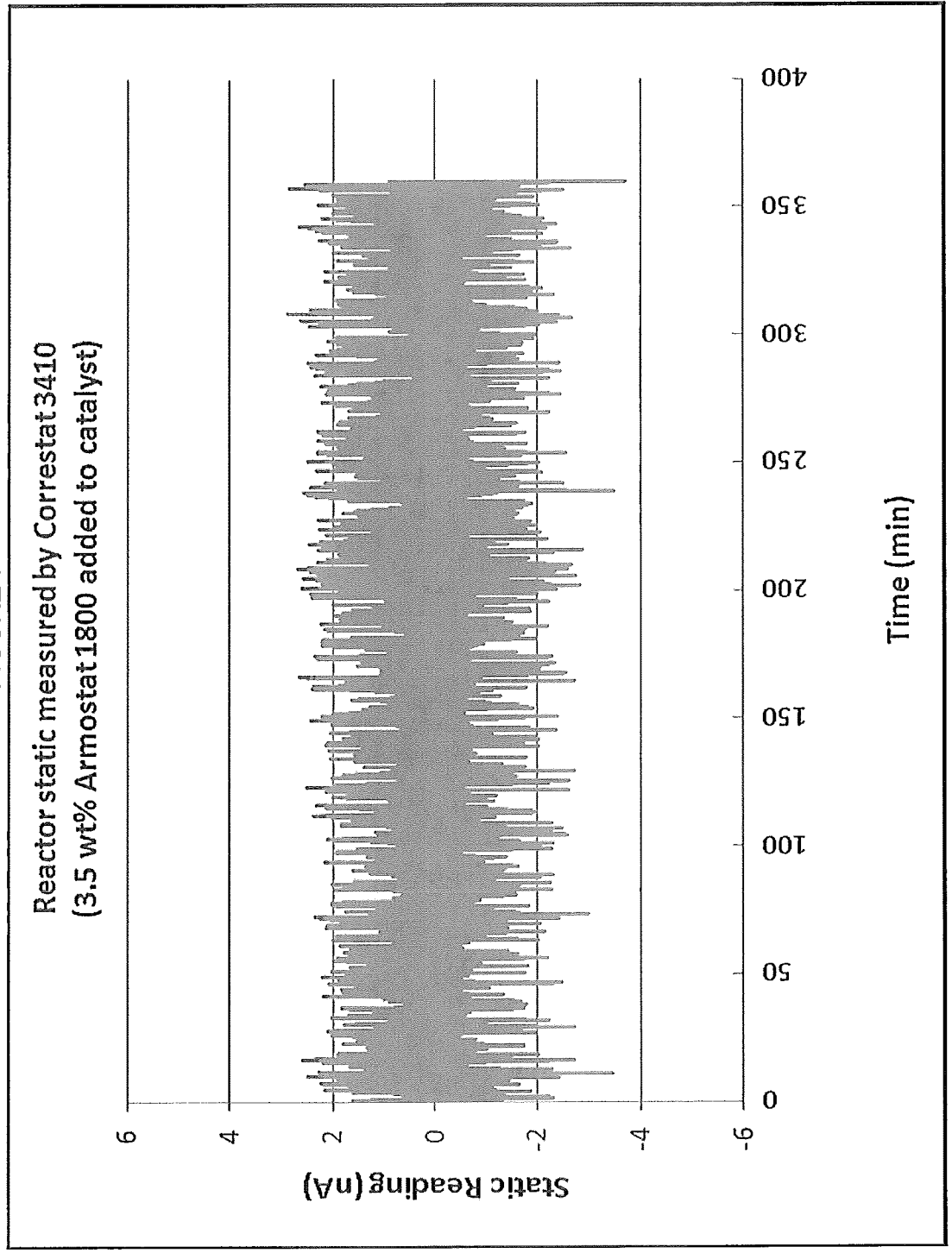
FIG. 7 shows the reactor static in nanoamps (nA) over time, measured using a Correstat 3410 static probe located in the reactor during a polymerization run. The polymerization is carried out in the presence of catalyst treated with 3.5 wt % of Armostat-1800.

In the present invention, a "catalyst modifier" comprises at least one long chain amine compound which, when added to a phosphinimine based polymerization catalyst in appropriate amounts, can reduce, prevent or mitigate at least one: of fouling, sheeting, temperature excursions, and static level of a material in polymerization reactor; and/or can alter the properties of copolymer product obtained in a polymerization process.

The Catalyst Modifier

In the present invention, carrying out a polymerization reaction with a phosphinimine based polymerization catalyst, which has been treated with a catalyst modifier comprising at least one long chain amine compound, allows for high production rates in a gas phase polymerization reactor with reduction of at least one of: reactor fouling, reactor static levels, catalyst static levels, and reactor temperature excursions. Alterations or improvements to product polymer, and reduction in cast film gel counts are also obtained.

The catalyst modifier employed in the present invention comprises a long chain amine compound. In the present invention, the terms "long chain substituted amine" or "long chain amine" are defined as tri-coordinate nitrogen compounds (i.e. amine based compounds) containing at least one hydrocarbyl group having at least 5 carbon atoms, preferably from 6 to 30 carbon atoms. The terms "hydrocarbyl" or "hydrocarbyl group" includes branched or straight chain hydrocarbyl groups which may be fully saturated groups (i.e. have no double or triple bonding moieties) or which may be partially unsaturated (i.e. they may have one or more double or triple bonding moieties). The long chain hydrocarbyl group may also contain un-saturation in the form of aromatic ring moieties attached to or part of the main chain. Preferably, the long chain amine (i.e. the tri-coordinate nitrogen compound) will also have at least one heteroatom containing hydrocarbyl group. Such heteroatom containing hydrocarbyl groups can be branched or straight chain hydrocarbyl groups or substituted hydrocarbyl groups having one or more carbon atoms and at least one heteroatom. Heteroatom containing hydrocarbyl groups may also contain unsaturated moieties. Suitable heteroatoms include for example, oxygen, nitrogen, phosphorus or sulfur. Other groups which may be attached to nitrogen in a long chain substituted amine compound are generally selected from hydrocarbyl groups having one or more carbon atoms and/or a hydrogen group (H).

In embodiments of the invention, the long chain amine is a long chain substituted monoalkanolamine, or a long chain substituted dialkanolamine. These amines have one or two alcoholhydrocarbyl groups respectively as well as a hydrocarbyl group having at least 5 carbons.

In an embodiment of the invention, the catalyst modifier employed comprises at least one long chain amine compound represented by the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the catalyst modifier comprises at least one long chain substituted monoalkanolamine represented by the formula $R^1R^2_xN((CH_2)_nOH)_y$ where $R^1$ is a hydrocarbyl group having anywhere from 5 to 30 carbon atoms, $R^2$ is a hydrogen or a hydrocarbyl group having anywhere from 1 to 30 carbon atoms, and n is an integer from 1-20.

In an embodiment of the invention, the catalyst modifier comprises at least one long chain substituted dialkanolamine represented by the formula: $R^1N((CH_2)_nOH)((CH_2)_mOH)$ where $R^1$ is a hydrocarbyl group having anywhere from 5 to 30 carbon atoms, and n and m are integers from 1-20.

In an embodiment of the invention, the catalyst modifier comprises at least one long chain substituted dialkanolamine represented by the formula: $R^1N((CH_2)_nOH)_2$ where $R^1$ is a hydrocarbyl group having anywhere from 6 to 30 carbon atoms, and n is an integer from 1-20.

In an embodiment of the invention, the catalyst modifier comprises at least one long chain substituted dialkanolamine represented by the formula: $R^1N((CH_2)_nOH)_2$ where $R^1$ is a hydrocarbyl group having anywhere from 6 to 30 carbon atoms, and n is 2 or 3.

In an embodiment of the invention, the catalyst modifier comprises at least one long chain substituted dialkanolamine represented by the formula: $R^1N((CH_2)_nOH)_2$ where $R^1$ is a linear hydrocarbyl group having anywhere from 6 to 30 carbon atoms, and n is 2 or 3.

In an embodiment of the invention, the catalyst modifier comprises at least one long chain substituted dialkanolamine represented by the formula: $R^1N(CH_2CH—_2OH)_2$ where $R^1$ is a linear hydrocarbyl group having anywhere from 6 to 30 carbon atoms.

In an embodiment of the invention, the catalyst modifier comprises at least one long chain substituted dialkanolamine represented by the formula: $R^1N(CH_2CH—_2OH)_2$ where $R^1$ is a linear, saturated alkyl group having anywhere from 6 to 30 carbon atoms.

In an embodiment of the invention, the catalyst modifier comprises at least one long chain substituted dialkanolamine represented by the formula: $R^1N(CH_2CH_2OH)_2$ where $R^1$ is a hydrocarbyl group having anywhere from 8 to 22 carbon atoms.

In an embodiment of the invention, the catalyst modifier comprises a long chain substituted dialkanolamine represented by the formula: $C_{18}H_{37}N(CH_2CH_2H)_2$.

In an embodiment of the invention, the catalyst modifier comprises long chain substituted dialkanolamines represented by the formulas: $C_{13}H_{27}N(CH_2CH_2OH)_2$ and $C_{15}H_{31}N(CH_2CH_2OH)_2$.

In an embodiment of the invention, the catalyst modifier comprises a mixture of long chain substituted dialkanolamines represented by the formula: $R^1N(CH_2CH_2OH)_2$ where $R^1$ is a hydrocarbyl group having anywhere from 8 to 18 carbon atoms.

Non limiting examples of catalyst modifiers which can be used in the present invention are Kemamine AS990™, Kemamine AS650™, Armostat-1800™, bis-hydroxy-cocoamine, 2,2'-octadecyl-amino-bisethanol, and Atmer-163™.

The long chain substituted amine may also be a polyoxyethylenehydrocarbyl amine.

In an embodiment of the invention, the catalyst modifier comprises a polyoxyethylenehydrocarbyl amine represented by the formula: $R^1N((CH_2CH_2O)_nH)((CH_2CH_2O)_mH)$, where $R^1$ is a hydrocarbyl group having from 5 to 30 carbons, and n and m are integers from 1-10 or higher (i.e. polymeric).

The Polymerization Catalyst

In the present invention, the (olefin) polymerization catalyst comprises: i) a phosphinimine catalyst, ii) an inert support, iii) a cocatalyst, and iv) a catalyst modifier.

The Phosphinimine Catalyst

Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Preferably, the phosphinimine catalyst is based on metals from group 4, which includes titanium, hafnium and zirconium. The most preferred phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

In an embodiment of the invention, a phosphinimine catalyst is defined by the formula: $(L)_n(PI)_mMX_p$ where M is a transition metal selected from Ti, Hf, Zr; PI is a phosphinimine ligand; L is a cyclopentadienyl type ligand or a heteroatom ligand; X is an activatable ligand; m is 1 or 2; n is 0 or 1; and p is determined by the valency of the metal M. Preferably m is 1, n is 1 and p is 2.

In an embodiment of the invention, a phosphinimine catalyst is defined by the formula: $(L)(PI)MX_2$ where M is a transition metal selected from Ti, Hf, Zr; PI is a phosphinimine ligand; L is a cyclopentadienyl type ligand; and X is an activatable ligand.

The phosphinimine ligand is defined by the formula: $R_3P=N—$, where N bonds to the metal, and wherein each R is independently selected from the group consisting of a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $—SiR'_3$ wherein each R' is independently selected from the group consisting of hydrogen, a $C_{1-8}$ alkyl or alkoxy radical, $C_{6-10}$ aryl or aryloxy radicals; and germanyl radical of the formula: $—GeR'_3$ wherein R' is as defined above.

In an embodiment of the invention the phosphinimine ligand is chosen so that each R is a hydrocarbyl radical. In a particular embodiment of the invention, the phosphinimine ligand is tri-(tertiarybutyl)phosphinimine (i.e. where each R is a tertiary butyl group, or "t-Bu" for short).

In an embodiment of the invention, the phosphinimine catalyst is a group 4 compound/complex which contains one phosphinimine ligand (as described above) and one ligand L which is either a cyclopentadienyl-type ligand or a heteroatom ligand.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current invention, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as $—CH_2C_6F_5$); a halogen atom; a $C_{1-8}$ alkoxy radical; a $C_{6-10}$ aryl or aryloxy radical (each of which may be further substituted by for example a halide and/or a hydrocarbyl group; for example a suitable $C_{6-10}$ aryl group is a perfluoroaryl group such as $—C_6F_5$); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $—Si$ $(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula $—Ge(R')_3$ wherein R' is as defined directly above.

As used herein, the term "heteroatom ligand" refers to a ligand which contains at least one heteroatom selected from the group consisting of boron, nitrogen, oxygen, silicon, phosphorus or sulfur. The heteroatom ligand may be sigma or pi-bonded to the metal. Exemplary heteroatom ligands include but are not limited to "silicon containing" ligands, "amido" ligands, "alkoxy" ligands, "boron heterocycle" ligands and "phosphole" ligands.

Silicon containing ligands are defined by the formula: —(μ)SiR$^x$R$^y$R$^z$ where the "—" denotes a bond to the transition metal and μ is sulfur or oxygen. The substituents on the Si atom, namely R$^x$, R$^y$ and R$^z$ are required in order to satisfy the bonding orbital of the Si atom. The use of any particular substituent R$^x$, R$^y$ or R$^z$ is not especially important. In an embodiment of the invention, each of R$^x$, R$^y$ and R$^z$ is a C$_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The term "alkoxy" is also intended to convey its conventional meaning. Thus, these ligands are characterized by (a) a metal oxygen bond, and (b) the presence of a hydrocarbyl group bonded to the oxygen atom. The hydrocarbyl group may be a ring structure and may optionally be substituted (e.g. 2,6 di-tertiary butyl phenoxy).

The "boron heterocyclic" ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659 and 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is C$_4$PH$_4$ (which is analogous to cyclopentadiene with one carbon in the ring being replaced by phosphorus). The phosphole ligands may be substituted with, for example, C$_{1-20}$ hydrocarbyl radicals (which may, optionally, contain halogen substituents); phosphido radicals; amido radicals; silyl or alkoxy radicals. Phosphole ligands are also well known to those skilled in the art of olefin polymerization and are described as such in U.S. Pat. No. 5,434,116.

The term "activatable ligand" refers to a ligand which may be activated by a cocatalyst (also referred to as an "activator"), to facilitate olefin polymerization. An activatable ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins. In embodiments of the present invention, the activatable ligand, X is independently selected from the group consisting of a hydrogen atom; a halogen atom; a C$_{1-10}$ hydrocarbyl radical; a C$_{1-10}$ alkoxy radical; a C$_{8-10}$ aryl oxide radical, each of which said hydrocarbyl, alkoxy, and aryl oxide radicals may be unsubstituted by or further substituted by a halogen atom, a C$_{1-8}$ alkyl radical, a C$_{1-8}$ alkoxy radical, a C$_{8-10}$ aryl or aryloxy radical; an amido radical which is unsubstituted or substituted by up to two C$_{1-8}$ alkyl radicals; and a phosphido radical which is unsubstituted or substituted by up to two C$_{1-8}$ alkyl radicals. Two activatable X ligands may also be joined to one another and form for example, a substituted or unsubstituted diene ligand (i.e. 1,3-diene); or a delocalized heteroatom containing group such as an acetate group.

The number of activatable ligands depends upon the valency of the metal and the valency of the activatable ligand. The preferred phosphinimine catalysts are based on group 4 metals in their highest oxidation state (i.e. 4$^+$). Particularly suitable activatable ligands are monoanionic such as a halide (e.g. chloride) or a hydrocarbyl (e.g. methyl, benzyl).

In some instances, the metal of the phosphinimine catalyst may not be in the highest oxidation state. For example, a titanium (III) component would contain only one activatable ligand.

In an embodiment of the invention, the phosphinimine catalyst has the formula, (L)(PI)MX$_2$, where M is Ti, Zr or Hf; PI is a phosphinimine ligand having the formula R$_3$P=N—, where R is independently selected from the group consisting of hydrogen, halogen, and C$_1$-C$_{20}$ hydrocarbyl; L is a ligand selected from the group consisting of cyclopentadienyl, substituted cyclopentadienyl, indenyl, substituted indenyl, fluorenyl, and substituted fluorenyl; and X is an activatable ligand.

In an embodiment of the invention, the phosphinimine catalyst has the formula: (L)((t-Bu)$_3$P=N)TiX$_2$, where L is a ligand selected from the group consisting of cyclopentadienyl, substituted cyclopentadienyl, indenyl, and substituted indenyl; and X is an activatable ligand.

In an embodiment of the invention, the phosphinimine catalyst has the formula: (L)((t-Bu)$_3$P=N)TiX$_2$, where L is a ligand selected from the group consisting of a substituted cyclopentadienyl and substituted indenyl; and X is an activatable ligand.

In an embodiment of the invention, the phosphinimine catalyst contains a phosphinimine ligand, a cyclopentadienyl ligand ("Cp" for short) and two chloride or two methyl ligands bonded to the group 4 metal.

In an embodiment of the invention, the phosphinimine catalyst contains a phosphinimine ligand, a substituted cyclopentadienyl ligand and two chloride or two methyl ligands bonded to the group 4 metal.

In an embodiment of the invention, the phosphinimine catalyst contains a phosphinimine ligand, a perfluoroaryl substituted cyclopentadienyl ligand and two chloride or two methyl ligands bonded to the group 4 metal.

In an embodiment of the invention, the phosphinimine catalyst contains a phosphinimine ligand, a perfluorophenyl substituted cyclopentadienyl ligand (i.e. Cp—C$_6$F$_5$) and two chloride or two methyl ligands bonded to the group 4 metal.

In an embodiment of the invention, the phosphinimine catalyst contains a 1,2-substituted cyclopentadienyl ligand and a phosphinimine ligand which is substituted by three tertiary butyl substituents.

In an embodiment of the invention, the phosphinimine catalyst contains a 1,2 substituted cyclopentadienyl ligand (e.g. a 1,2-(R*)(Ar—F)Cp) where the substituents are selected from R* a hydrocarbyl group, and Ar—F a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group respectively.

In the present invention, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current invention contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the invention, the phosphinimine catalyst has the formula: $(1,2\text{-}(R^*)(Ar\text{—}F)Cp)M(N=P(t\text{-}Bu)_3)X_2$ where R* is a hydrocarbyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the invention, the phosphinimine catalyst has the formula: $(1,2\text{-}(R^*)(Ar\text{—}F)Cp)M(N=P(t\text{-}Bu)_3)X_2$ where R* is an alkyl group; Ar—F is a perfluorinated aryl group, a 2,6 (i.e. ortho) fluoro substituted phenyl group, a 2,4,6 (i.e. ortho/para) fluoro substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: $(1,2\text{-}(R^*)(Ar\text{—}F)Cp)M(N=P(t\text{-}Bu)_3)X_2$ where R* is a hydrocarbyl group having from 1 to 20 carbons; Ar—F is a perfluorinated aryl group; M is Ti, Zr or Hf; and X is an activatable ligand. In an embodiment of the invention, the phosphinimine catalyst has the formula: $(1,2\text{-}(R^*)(Ar\text{—}F)Cp)M(N=P(t\text{-}Bu)_3)X_2$ where R* is a straight chain alkyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the invention, the phosphinimine catalyst has the formula: $(1,2\text{-}(n\text{-}R^*)(Ar\text{—}F)Cp)Ti(N=P(t\text{-}Bu)_3)X_2$ where R* is a straight chain alkyl group; Ar—F is a perfluorinated aryl group; M is Ti, Zr or Hf; and X is an activatable ligand. In an embodiment of the invention, the phosphinimine catalyst has the formula: $(1,2\text{-}(R^*)(C_6F_5)Cp)M(N=P(t\text{-}Bu)_3)X_2$ where R* is a hydrocarbyl group having 1 to 20 carbon atoms; M is Ti, Zr or Hf; and X is an activatable ligand. In an embodiment of the invention, the phosphinimine catalyst has the formula: $(1,2\text{-}(n\text{-}R^*)(C_6F_5)Cp)M(N=P(t\text{-}Bu)_3)X_2$ where R* is a straight chain alkyl group; M is Ti, Zr or Hf; and X is an activatable ligand. In further embodiments, M is Ti and R* is selected from the group consisting of n-propyl, n-butyl and n-hexyl, and X is selected from chloride or methide. In further embodiments, M is Ti and R* is any one of a methyl, ethyl, n-propyl, n-butyl, n-pentyl, n-hexyl, n-heptyl, and n-octyl group. In further embodiments, X is chloride or methide.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$). In embodiments of the invention, Ar—F is selected from the group comprising perfluorinated phenyl or perfluorinated naphthyl groups.

Some phosphinimine catalysts which may be used in the present invention include: $((C_6F_5)Cp)Ti(N=P(t\text{-}Bu)_3)Cl_2$; $(1,2\text{-}(n\text{-}propyl)(C_6F_5)Cp)Ti(N=P(t\text{-}Bu)_3)Cl_2$, $(1,2\text{-}(n\text{-}butyl)(C_6F_5)Cp)Ti(N=P(t\text{-}Bu)_3)Cl_2$ and $(1,2\text{-}(n\text{-}hexyl)(C_6F_5)Cp)Ti(N=P(t\text{-}Bu)_3)Cl_2$.

In an embodiment of the invention, the phosphinimine catalyst will have a single or multiply substituted indenyl ligand and a phosphinimine ligand which is substituted by three tertiary butyl substituents.

An indenyl ligand (or "Ind" for short) as defined in the present invention will have framework carbon atoms with the numbering scheme provided below, so the location of a substituent can be readily identified.

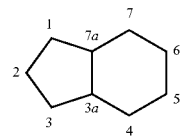

In an embodiment of the invention, the phosphinimine catalyst will have a singly substituted indenyl ligand and a phosphinimine ligand which is substituted by three tertiary butyl substituents.

In an embodiment of the invention, the phosphinimine catalyst will have a singly or multiply substituted indenyl ligand where the substituent is selected from the group consisting of a substituted or unsubstituted alkyl group, a substituted or an unsubstituted aryl group, and a substituted or unsubstituted benzyl (e.g. $C_6H_5CH_2$—) group. Suitable substituents for the alkyl, aryl or benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, $R^\yen$-Indenyl, where the $R^\yen$ substituent is a substituted or unsubstituted alkyl group, a substituted or an unsubstituted aryl group, or a substituted or unsubstituted benzyl group. Suitable substituents for an $R^\yen$ alkyl, $R^\yen$ aryl or $R^\yen$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have an indenyl ligand having at least a 1-position substituent (1-$R^\yen$) where the substituent $R^\yen$ is a substituted or unsubstituted alkyl group, a substituted or an unsubstituted aryl group, or a substituted or unsubstituted benzyl group. Suitable substituents for an $R^\yen$ alkyl, $R^\yen$ aryl or $R^\yen$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^\yen$-Indenyl where the substituent $R^\yen$ is in the 1-position of the indenyl ligand and is a substituted or unsubstituted alkyl group, a substituted or unsubstituted aryl group, or a substituted or an unsubstituted benzyl group. Suitable substituents for an $R^\yen$ alkyl, $R^\yen$ aryl or $R^\yen$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^\yen$-Indenyl, where the substituent $R^\yen$ is a (partially/fully) halide substituted alkyl group, a (partially/fully) halide substituted benzyl group, or a (partially/fully) halide substituted aryl group.

In an embodiment of the invention, the phosphinimine catalyst will have a singly substituted indenyl ligand, 1-R¥-Indenyl, where the substituent $R^¥$ is a (partially/fully) halide substituted benzyl group.

When present on an indenyl ligand, a benzyl group can be partially or fully substituted by halide atoms, preferably fluoride atoms. The aryl group of the benzyl group may be a perfluorinated aryl group, a 2,6 (i.e. ortho) fluoro substituted phenyl group, 2,4,6 (i.e. ortho/para) fluoro substituted phenyl group or a 2,3,5,6 (i.e. ortho/meta) fluoro substituted phenyl group respectively. The benzyl group is, in an embodiment of the invention, located at the 1 position of the indenyl ligand.

In an embodiment of the invention, the phosphinimine catalyst will have a singly substituted indenyl ligand, 1-R¥-Indenyl, where the substituent $R^¥$ is a pentafluorobenzyl ($C_6F_5CH_2$—) group.

In an embodiment of the invention, the phosphinimine catalyst has the formula: $(1-R^¥-(Ind))M(N=P(t-Bu)_3)X_2$ where $R^¥$ is a substituted or unsubstituted alkyl group, a substituted or an unsubstituted aryl group, or a substituted or unsubstituted benzyl group, wherein substituents for the alkyl, aryl or benzyl group are selected from the group consisting of alkyl, aryl, alkoxy, aryloxy, alkylaryl, arylalkyl and halide substituents; M is Ti, Zr or Hf; and X is an activatable ligand.

In an embodiment of the invention, the phosphinimine catalyst has the formula: $(1-R^¥-(Ind))M(N=P(t-Bu)_3)X_2$ where $R^¥$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the invention, the phosphinimine catalyst has the formula: $(1-R^¥-(Ind))M(N=P(t-Bu)_3)X_2$ where $R^¥$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the invention, the phosphinimine catalyst has the formula: $(1-R^¥-(Ind))Ti(N=P(t-Bu)_3)X_2$ where $R^¥$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the invention, the phosphinimine catalyst has the formula: $(1-C_6F_5CH_2-Ind)M(N=P(t-Bu)_3)X_2$, where M is Ti, Zr or Hf; and X is an activatable ligand.

In an embodiment of the invention, the phosphinimine catalyst has the formula: $(1-C_6F_5CH_2-Ind)Ti(N=P(t-Bu)_3)X_2$, where X is an activatable ligand.

In an embodiment of the invention, the phosphinimine catalyst has the formula: $(1-C_6F_5CH_2-Ind)Ti(N=P(t-Bu)_3)Cl_2$.

The Cocatalyst

In the present invention, the phosphinimine catalyst is used in combination with at least one activator (or "cocatalyst") to form an active polymerization catalyst system for olefin polymerization. Activators (i.e. cocatalysts) include ionic activator cocatalysts and hydrocarbyl aluminoxane cocatalysts.

The activator used to activate the phosphinimine catalyst can be any suitable activator including one or more activators selected from the group consisting of alkylaluminoxanes and ionic activators, optionally together with an alkylating agent.

The alkylaluminoxanes are complex aluminum compounds of the formula:

$R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

The alkylaluminoxanes are typically used in substantial molar excess compared to the amount of group 4 transition metal in the phosphinimine catalyst. The $Al^1$:group 4 transition metal molar ratios are from 10:1 to 10,000:1, preferably about 30:1 to 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present invention may be a combination of an alkylating agent (which may also serve as a scavenger) with an activator capable of ionizing the group 4 metal of the phosphinimine catalyst (i.e. an ionic activator). In this context, the activator can be chosen from one or more alkylaluminoxane and/or an ionic activator.

When present, the alkylating agent may be selected from the group consisting of $(R^4)_pMgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_qZnX^2_{2-q}$ wherein $R^4$ is as defined above, $X^2$ is halogen and q is 1 or 2; $(R^4)_sAl^2X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. $PhR^8_2NH^+$, which is substituted by two $R^8$ radicals such as for example two $C_{1-4}$ alkyl radicals).

Examples of compounds capable of ionizing the phosphinimine catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyltrispentafluorophenyl borate, benzene (diazonium) phenyltrispentafluorophenyl borate, tropillium tetrakis(2,3,5,6-tetrafluorophenyl)borate, triphenylmethylium tetrakis(2,3,5,6-tetrafluorophenyl)borate, benzene (diazonium)tetrakis(3,4,5-trifluorophenyl)borate, tropillium tetrakis(3,4,5-trifluorophenyl)borate, benzene (diazonium)tetrakis(3,4,5-trifluorophenyl)borate, tropillium tetrakis(1,2,2-trifluoroethenyl)borate, trophenylmethylium tetrakis(1,2,2-trifluoroethenyl)borate, benzene (diazonium)tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene (diazonium)tetrakis(2,3,4,5-tetrafluorophenyl)borate.

Commercially available activators which are capable of ionizing the group 4 metal of the phosphinimine catalyst include:

N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and trispentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

The Inert Support

In the present invention, the phosphinimine catalyst is supported on an inert support. The support used in the present invention can be any support known in the art to be suitable for use with polymerization catalysts. For example the support can be any porous or non-porous support material, such as talc, inorganic oxides, inorganic chlorides, aluminophosphates (i.e. AlPO$_4$) and polymer supports (e.g. polystyrene, etc). Preferred supports include Group 2, 3, 4, 5, 13 and 14 metal oxides generally, silica, alumina, silica-alumina, magnesium oxide, magnesium chloride, zirconia, titania, clay (e.g. montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the invention, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an inorganic oxide, such as silica, typically has a surface area of from about 10 to about 700 m$^2$/g, a pore volume in the range from about 0.1 to about 4.0 cc/g and an average particle size of from about 5 to about 500 µm. In a specific embodiment, the support material has a surface area of from about 50 to about 500 m$^2$/g, a pore volume in the range from about 0.5 to about 3.5 cc/g and an average particle size of from about 10 to about 200 µm. In another specific embodiment the support material has a surface area of from about 100 to about 400 m$^2$/g, a pore volume in the range from about 0.8 to about 3.0 cc/g and an average particle size of from about 5 to about 100 µm.

The support material, especially an inorganic oxide, such as silica, typically has an average pore size (i.e. pore diameter) of from about 10 to about 1000 Angstroms(Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society,* 1938, v 60, pg 309-319.

A silica support which is suitable for use in the present invention has a high surface area and is amorphous. By way of example, useful silicas are commercially available under the trademark of Sylopol® 958, 955 and 2408 from Davison Catalysts, a Division of W. R. Grace and Company and ES-70W by PQ Corporation.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,968,375.

An agglomerate of clay and inorganic oxide which may be useful in the current invention may have the following properties: a surface area of from about 20 to about 800 m$^2$/g, preferably from 50 to about 600 m$^2$/g; particles with a bulk density of from about 0.15 to about 1 g/ml, preferably from about 0.20 to about 0.75 g/ml; an average pore diameter of from about 30 to about 300 Angstroms (Å), preferably from about 60 to about 150 Å; a total pore volume of from about 0.10 to about 2.0 cc/g, preferably from about 0.5 to about 1.8 cc/g; and an average particle size of from about 4 to 150 microns (µm), preferably from about 8 to 100 microns.

Optionally, a support, for example a silica support, may be treated with one or more salts of the type: Zr(SO$_4$)$_2$.4H$_2$O, ZrO(NO$_3$)$_2$, and Fe(NO$_3$)$_3$ as taught in CA Patent Application No. 2,716,772 to the same applicant. Supports that have been otherwise chemically treated are also contemplated for use with the catalysts and processes of the present invention.

Without wishing to be bound by theory, Zr(SO$_4$)$_2$.4H$_2$O and ZrO(NO$_3$)$_2$ may each act as a source of zirconium oxide (i.e. ZrO$_2$) which may form for example after calcinations temperatures are employed. Alternately, the Zr(SO$_4$)$_2$.4H$_2$O can be used to add Zr(SO$_4$)$_2$ to an inert support if suitably high calcinations temperatures (those which promote formation of zirconium oxide) are not employed.

The present invention is not limited to any particular procedure for supporting the phosphinimine catalyst or the cocatalyst. Processes for depositing a phosphinimine catalyst complex and/or a cocatalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support a single site catalyst see U.S. Pat. No. 5,965,677). For example, the phosphinimine catalyst may be added to a support by co-precipitation with the support material. The cocatalyst can be added to a support before and/or after the phosphinimine catalyst or together with the phosphinimine catalyst (i.e. the phosphinimine catalyst may be mixed with a cocatalyst in a suitable solvent or diluents and the mixture added to a support). Optionally, the cocatalyst can be added to a supported phosphinimine catalyst in situ or on route to a reactor. The phosphinimine catalyst and/or cocatalyst may be slurried or dissolved in a suitable diluent or solvent respectively and then added to a support. Suitable solvents or diluents include but are not limited to hydrocarbons and mineral oil. The phosphinimine catalyst may be added to the solid support, in the form of a solid, solution or slurry, followed by the addition of the cocatalyst in solid form or as a solution or slurry. The cocatalyst may be added to the solid support, in the form of a solid, solution or slurry, followed by the addition of the phosphinimine catalyst in solid form or as a solution or slurry. Phosphinimine catalyst, cocatalyst, and support can be mixed together in the presence or absence of a diluent or solvent, but use of diluent(s) or solvent(s) is preferred.

The loading of the phosphinimine catalyst on the support is not specifically defined, but by way of non-limiting example can be from about 0.005 to 1.0, or from about 0.010 to 0.50, or from about 0.015 to 0.40, or from about 0.015 to 0.035 mmol of the phosphinimine catalyst per gram of support. In further embodiments of the invention, the loading of the phosphinimine catalyst on the support may be from about 0.020 to 0.031 mmol, or from about 0.025 to 0.0305 mmol of the phosphinimine catalyst per gram of support.

In embodiments of the invention, a titanium based phosphinimine catalyst will be added to the inert support so as to give from 0.01 to 10 wt % of Ti, or from 0.05 to 5.0 wt % of Ti, or from 0.05 to 3.0 wt % of Ti, or from 0.10 to 2.0 wt % of Ti based on the combined weight of the phosphinimine catalyst, the inert support and the cocatalyst.

The phosphinimine based (olefin) polymerization catalyst may be fed to a reactor system in a number of ways. The polymerization catalyst may be fed to a reactor in dry mode using a dry catalyst feeder, examples of which are well known in the art. Alternatively, the polymerization catalyst may be fed to a reactor as a slurry in a suitable diluent. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Solvents which will not extract appreciable amounts of the phosphinimine catalyst, the cocatalyst or the catalyst modifier away from the inert support are preferred. The (olefin) polymerization catalyst components, which include at least one phosphinimine catalyst, at least one support, at least one cocatalyst, and at least one catalyst modifier, may be combined offline and prior to their addition to a polymerization zone, or they may be combined on route to a polymerization zone.

The Polymerization Process

Olefin polymerization processes which are compatible with the current invention include gas phase and slurry phase polymerization processes, with gas phase processes being preferred. Preferably, ethylene copolymerization with an alpha-olefin is carried out in the gas phase, in for example a fluidized bed reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399; 4,588,790; 5,028,670; 5,317,036; 5,352,749; 5,405,922; 5,436,304; 5,433,471; 5,462,999; 5,616,661 and 5,668,228). In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from the group consisting of $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the invention is directed toward a polymerization process involving the polymerization of one or more of the monomer(s) and comonomer(s) including ethylene alone or in combination with one or more linear or branched comonomer(s) having from 3 to 30 carbon atoms, preferably 3-12 carbon atoms, more preferably 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In an embodiment of the present invention, ethylene is copolymerized with an alpha olefin having from 3-10 carbon atoms and ethylene makes up at least 75 wt % of the total olefin feed entering the reactor.

In an embodiment of the present invention, ethylene is copolymerized with an alpha olefin having from 3-10 carbon atoms and ethylene makes up at least 85 wt % of the total olefin feed entering the reactor.

In embodiments of the present invention, ethylene is copolymerized with propylene, 1-butene, 1-hexene or 1-octene.

In an embodiment of the present invention, ethylene is copolymerized with 1-butene and ethylene makes up at least 75 weight % (i.e. wt %) of the total olefin feed entering the reactor.

In an embodiment of the present invention, ethylene is copolymerized with 1-hexene and ethylene makes up at least 75 wt % of the total olefin feed entering the reactor.

In an embodiment of the present invention, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current invention to use a polymer seed bed that has been treated with a catalyst modifier or an optional scavenger (see below). In addition, the polymer products obtained by using the catalysts and processes of the current invention may themselves be used as polymer seed bed materials.

Optional Scavenger

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula: $R^3{}_2Al^1O(R^3Al^1O)_m Al^1R^3{}_2$ wherein each $R^3$ is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the phosphinimine catalyst) of from about 20 to about 2000, or from about 50 to about 1000, or from about 100 to about 500. Generally the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

A scavenger may optionally be added to the catalyst modifier prior to inclusion of the catalyst modifier in a polymerization catalyst or prior to the combination of a catalyst modifier with another polymerization catalyst component (i.e. one or more of the phosphinimine catalyst, the inert support, or the cocatalyst).

Polymer

The polymer compositions made using the present invention are most preferably copolymers of ethylene and an alpha olefin selected from 1-butene, 1-hexene and 1-octene.

In embodiments of the invention, the copolymer composition will comprise at least 75 weight % of ethylene units, or at least 80 wt % of ethylene units, or at least 85 wt % of ethylene units with the balance being an alpha-olefin unit, based on the weight of the copolymer composition.

Polymer properties such as average molecular weight (e.g. Mw, Mn and Mz), molecular weight distribution (i.e. Mw/Mn), density, melt indices (e.g. $I_2$, $I_5$, $I_{21}$, $I_{10}$), melt index or melt flow ratios (e.g. $I_{21}/I_2$, $I_{21}/I_5$), comonomer distribution breadth index (CDBI), TREF-profile, comonomer distribution profile, and the like as these terms are defined further below and in for example co-pending CA Application No. 2,734,167 (to the same Applicant) are not specifically defined, but by way of non-limiting example only, the polymer compositions made using the present invention, may have a density of from 0.910 g/cc to 0.93 g/cc, a melt index of from 0.5 to 10.0 g/10 min, a melt flow ratio ($I_{21}/I_2$) of from 14 to 18, a weight average molecular weight of from 40,000 to 140,000, and a unimodal or bimodal TREF profile.

Catalyst Modifier Addition

In the present invention, the catalyst modifier affects at least one of the following: reactor static level, catalyst static level, reactor temperature control, catalyst productivity, copolymer composition distribution, and film gel count.

In an embodiment of the present invention, adding a catalyst modifier to an inert support, prior to the addition of a phosphinimine catalyst and prior to the addition of a cocatalyst during the preparation of a polymerization catalyst, affects the rate at which the polymerization catalyst can be fed to a reactor.

In an embodiment of the present invention, adding a catalyst modifier to an inert support, prior to the addition of a phosphinimine catalyst and prior to the addition of a cocatalyst during the preparation of a polymerization catalyst, improves the catalyst flowability as indicated by a Flodex value.

Use of a specific amount of the catalyst modifier (e.g. from about 0.5 to about 4.0 wt % based on the weight of the polymerization catalyst) actually improves the catalyst productivity as is further taught below.

In the present invention, the catalyst modifier may be included in the polymerization catalyst at any point during the preparation of the polymerization catalyst so long as the catalyst modifier is added before the polymerization catalyst enters a polymerization zone or polymerization reactor. Hence, in an embodiment of the invention, at least one phosphinimine catalyst, at least one inert support, at least one cocatalyst and at least one catalyst modifier are combined in any order prior to or on route to their entry into a polymerization zone or reactor. In specific embodiments of the invention: the catalyst modifier may be added to a support after both the phosphinimine catalyst and the cocatalyst have been added; the catalyst modifier may be added to a support before either of the phosphinimine catalyst or the cocatalyst are added; the catalyst modifier may be added to a support after the phosphinimine catalyst but before the cocatalyst; the catalyst modifier may be added to a support after the cocatalyst but before the phosphinimine catalyst. Also, the catalyst modifier can be added in portions during any stage of the preparation of the polymerization catalyst.

In an embodiment of the present invention, the catalyst modifier is added to a "finished" polymerization catalyst already comprising the phosphinimine catalyst, inert support and cocatalyst (as used here, the term "finished" is meant to denote that the catalyst modifier is not yet present in the polymerization catalyst). The catalyst modifier can be added to the "finished" polymerization catalyst offline and prior to addition of the polymerization catalyst to the polymerization zone, or the catalyst modifier may be added to the "finished" polymerization catalyst on route to a reactor.

In an embodiment of the present invention, the catalyst modifier is added to an inert support, prior to the addition of the phosphinimine catalyst and prior to the addition of the cocatalyst to prepare the polymerization catalyst.

The catalyst modifier may be included in the polymerization catalyst (or where appropriate, added to a polymerization catalyst component or components which comprise at least one of the phosphinimine catalyst, the inert support and the cocatalyst) in any suitable manner. By way of non-limiting example, the catalyst modifier may be dry blended (if it is a solid) with a "finished" polymerization catalyst (or a polymerization catalyst component) or it may be added neat (if the catalyst modifier is a liquid) or it may be added as solution or slurry in a suitable hydrocarbon solvent or diluent respectively. The "finished" polymerization catalyst (or polymerization catalyst components) can likewise be put into solution or made into a slurry using suitable solvents or diluents respectively, followed by addition of the catalyst modifier (as a neat solid or liquid or as a solution or a slurry in suitable solvents or diluents) or vice versa. Alternatively, the catalyst modifier may be deposited onto a separate support and the resulting supported catalyst modifier blended either dry or in a slurry with the "finished" polymerization catalyst, but this method is not preferred. The catalyst modifier can be combined neat (if a liquid) or as a solution or slurry in a suitable hydrocarbon solvent or diluent with an inert support prior to the addition of a phosphinimine catalyst and/or a cocatalyst. The catalyst modifier may also be dry blended (if it is a solid) with an inert support prior to addition of the phosphinimine catalyst and/or the cocatalyst.

Suitable solvents or diluents are inert hydrocarbons and include but are not limited to aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane, cyclohexane, toluene and mixtures thereof.

Removal of diluents or solvents to give the polymerization catalyst as a solid or powder can be carried out using any suitable means known in the art. For example, the catalyst may be isolated by one or more filtration or decantation steps, or one or more evaporation steps. Removal of diluents or solvents by evaporation/drying is well known, but preferably the evaporation is carried out under conditions which do not adversely affect the performance of the polymerization catalyst. Removal of solvent or diluents can be carried out under ambient pressures or reduced pressures. Removal of diluents or solvents can be achieved under ambient temperatures or elevated temperatures, provided that elevated temperatures do not lead to catalyst deactivation. Diluents or solvents may in some circumstances (i.e. for low boiling diluents/solvents) be "blown off" using an inert gas. The time required to remove the diluents or solvents is not specifically defined.

Polymerization catalysts in the form of a solid can be fed to a polymerization zone using well known solid catalyst feeder equipment. Alternatively, the polymerization catalyst may be used in slurried form. By "slurried form" it is meant that the polymerization catalyst is suspended in a suitable diluent or mixture of diluents. Suitable diluents may include but are not limited to cyclohexane, pentane, heptanes, isopentane, mineral oil and mixtures thereof. Preferably, the diluent chosen is one in which little or no extraction of polymerization catalyst components from the support occurs. Such a slurry form catalyst can be fed to a polymerization reactor zone using suitable slurry feed equipment which is well known in the art.

The amount of catalyst modifier added to a reactor (or other associated process equipment) is conveniently represented herein as the parts per million (ppm) of catalyst modifier based on the weight of copolymer produced.

The amount of catalyst modifier included in a polymerization catalyst is conveniently represented herein as a weight percent (wt %) of the catalyst modifier based on the combined weight of the phosphinimine catalyst, the inert support and the cocatalyst. In order to avoid any ambiguity, the phrase "weight of the polymerization catalyst" includes the weight of the phosphinimine catalyst, the inert support, and the cocatalyst but not the weight of the catalyst modifier.

The total amount of catalyst modifier included in the polymerization catalyst can range anywhere from about 0.1 to 10 weight percent (or smaller ranges within this range) based on the combined weight of the phosphinimine catalyst, the inert support and the cocatalyst. However, to maximize catalyst productivity and reactor operability at the same time, the amount of catalyst modifier included in the polymerization catalyst is preferably from 0.25 to 6.0 weight percent (i.e. wt % based on the weight of the phosphinimine catalyst, the inert support and the cocatalyst), or from 0.25 to 5.0 weight percent, or from 0.5 to 4.5 weight percent, or from 1.0 to 4.5 weight percent, or from 0.75 to 4.0 weight percent, or from 0.5 to 4.0 weight percent, or from 0.25 to 4.0 weight percent, or from 1.0 to 4.0 weight per cent, or from 0.5 to 3.5 weight percent, or from 1.25 to 3.75 weight percent, or from 1.0 to 3.5 weight percent, or from 1.5 to 3.5 weight percent, or from 0.75 to 3.75 weight percent, or from 0.25 to 3.75 weight percent, or from 0.75 to 3.5 weight percent, or from 1.0 to 3.75 weight percent.

In an embodiment of the invention, the polymerization catalyst comprises: i) a phosphinimine catalyst; ii) an inert support; iii) a cocatalyst; and iv) a catalyst modifier; wherein the catalyst modifier comprises a "long chain amine" compound as described above in "The Catalyst Modifier" section and which is present in from 0.25 to 6.0 weight percent based on the weight of i), ii) and iii) of the polymerization catalyst.

In an embodiment of the invention, the polymerization catalyst comprises: i) a phosphinimine catalyst; ii) an inert support; iii) a cocatalyst; and iv) a catalyst modifier; wherein the catalyst modifier is present from 0.25 to 6.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization catalyst comprises: i) a phosphinimine catalyst; ii) an inert support; iii) a cocatalyst; and iv) a catalyst modifier; wherein the catalyst modifier is present from 0.25 to 5.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization catalyst comprises: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization catalyst comprises: i) a phosphinimine catalyst; ii) an inert support; iii) a cocatalyst; and iv) a catalyst modifier; wherein the catalyst modifier is present from 1.0 to 4.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization catalyst comprises: i) a phosphinimine catalyst; ii) an inert support; iii) a cocatalyst; and iv) a catalyst modifier; wherein the catalyst modifier is present from 1.0 to 4.0 weight percent based on the weight of i), ii) and iii) of the polymerization catalyst and comprises at least one compound represented by the formula: $R^1N((CH_2)_nOH)((CH_2)_mOH)$ where $R^1$ is a hydrocarbyl group having anywhere from 5 to 30 carbon atoms, and n and m are integers from 1 to 20.

In an embodiment of the invention, the polymerization catalyst comprises: i) a phosphinimine catalyst; ii) an inert support; iii) a cocatalyst; and iv) a catalyst modifier; wherein the catalyst modifier is present from 1.0 to 4.0 weight percent based on the weight of i), ii) and iii) of the polymerization catalyst and comprises at least one compound represented by the formula: $R^1N((CH_2)_nOH)_2$ where $R^1$ is a hydrocarbyl group having anywhere from 6 to 30 carbon atoms, and n is independently an integer from 1-20.

One measure of reactor operability is the level of static present in one or more locations in a gas phase fluidized bed polymerization system. The level of static present in the polymerization catalyst is also a useful proxy for potential reactor operability problems. The effect of the catalyst modifier on static may be conveniently monitored with one or more static probes. Static probes are designed to register static activity above or below zero. In a gas phase polymerization run, a fouling event is sometimes preceded by large non-zero measurements of static. One or more static probes can be used to measure the level of static anywhere in the reactor proper (including upper, lower or intermediate bed probes), at a location within the entrainment zone, at a location within the recycle stream, at the distributor plate, at the annular disk which provides access to the flowing stream of gas entering the reactor, and the like as discussed in U.S. Pat. Appl. No. 2005/0148742A1, which is incorporated herein by reference. Hence, the static probes themselves may be designated as at least one recycle line probe, at least one annular disk probe, at least one distributor plate probe, at least one upper reactor static probe, an annular disk probe or a conventional probe which is located within the fluidized bed. The polymerization catalyst static can be measured using a static probe located in the catalyst injection tube, or catalyst metering device.

In a conventional reactor wall static probe, the probe measures the electric current that flows from a probe tip and which results from particle impact therewith. The particles could be resin particles or catalyst particles for example. The probe measures current per unit of area on the probe tip which serves as an estimate of the charge transfer occurring on the reactor wall. In this scenario, the probe tip is meant to simulate a small portion of the reactor wall. The probe tip may be made of any suitable conducting materials such as carbon steel, iron, stainless steel, titanium, platinum, nickel, Monel®, copper, aluminum and the like as further described in U.S. Pat. No. 6,008,662, which is incorporated herein by reference.

More generally, static probes include a metallic probe tip, one or more signal wires, and an electric feed to a measuring instrument as discussed in U.S. Pat. Appl. 2005/0148742 A1. Any instrument or device capable of measuring current flow from the probe tip to ground can be used. These include for example an ammeter, a picoammeter, a multi-meter, or electrometer. The current may also be measured in an indirect way by instead determining the voltage generated by the current when it is passed through an in-series resistor. The current can be determined from voltage using Ohm's law as further described in U.S. Pat. No. 6,008,662, which is incorporated herein by reference.

Typical current levels measured with a conventional reactor wall static probe range from ±0.1 to 10 nanoamps/cm$^2$, or smaller ranges within this range (e.g. ±0.1 to 8 nanoamps/cm$^2$, ±0.1 to 6 nanoamps/cm$^2$ and the like). The measurements of current will generally be represented as averages over a given time period or they may be represented as the root mean squared values in order to provide all positive number values.

Any one or more static probes in any location in the fluidized bed system may be determinative of the onset of a reactor discontinuity event.

The effect of the catalyst modifier on reactor operability may also be evidenced by other observations not limited to that of the measurement of static activity. For example, productivity levels can be measured (in grams of polymer produced per gram of catalyst used) as an indicator of overall reactor and catalyst performance. Activity measurements may be similarly used (by incorporating a time dimension into productivity measurements). Direct or indirect observations of temperature fluctuations at various locations in a fluidized bed reactor system (or other reactor systems) can also be monitored and the ideal amount of catalyst modifier determined in order to minimize heat fluctuations. Common thermocouples can be used at various locations for this purpose.

In an embodiment of the invention, the polymerization process is carried out by introducing a polymerization catalyst into a reactor, the polymerization catalyst comprising: i) a phosphinimine catalyst; ii) an inert support; iii) a cocatalyst; and iv) a catalyst modifier; wherein the catalyst modifier comprises a "long chain amine" compound as described above in "The Catalyst Modifier" section and which is present in from 0.25 to 6.0 weight percent based on the weight of i), ii) and iii) of the polymerization catalyst.

In an embodiment of the invention, the polymerization process is carried out in the presence of a polymerization catalyst comprising: i) a phosphinimine catalyst; ii) an inert support; iii) a cocatalyst; and iv) a catalyst modifier; wherein the catalyst modifier is present from 0.25 to 6.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization process comprises contacting ethylene and at least one alpha olefin with a polymerization catalyst in a gas phase reactor, the polymerization catalyst comprising: i) a phosphinimine catalyst, ii) an inert support, iii) a cocatalyst, and iv) a catalyst modifier; wherein the catalyst modifier is present in from 0.25 to 6.0 weight percent based on the weight of i), ii), and iii) of the polymerization catalyst and comprises a compound having the formula:

$R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; and wherein the polymerization catalyst is prepared by adding all of the catalyst modifier to the inert support prior to the addition of the phosphinimine catalyst and prior to the addition of the cocatalyst.

In an embodiment of the invention, the polymerization process is carried out in the presence of a polymerization catalyst comprising: i) a phosphinimine catalyst; ii) an inert support; iii) a cocatalyst; and iv) a catalyst modifier; wherein the catalyst modifier is present from 0.25 to 5.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization process is carried out in the presence of a polymerization catalyst comprising: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization process is carried out in the presence of a polymerization catalyst comprising: i) a phosphinimine catalyst; ii) an inert support; iii) a cocatalyst; and iv) a catalyst modifier; wherein the catalyst modifier is present from 1.0 to 4.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization process is carried out in the presence of a polymerization catalyst comprising: i) a phosphinimine catalyst; ii) an inert support; iii) a cocatalyst; and iv) a catalyst modifier; wherein the catalyst modifier is present from 1.25 to 3.75 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the polymerization process is carried out in the presence of a polymerization catalyst comprising: i) a phosphinimine catalyst; ii) an inert support; iii) a cocatalyst; and iv) a catalyst modifier; wherein the catalyst modifier is present from 1.5 to 3.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, a gas phase polymerization process carried out in a reactor in the presence of a polymerization catalyst comprising: i) a phosphinimine catalyst; ii) an inert support; iii) a cocatalyst; and iv) a catalyst modifier; improves at least one of reactor static level (i.e. decreases), catalyst static level (i.e. decreases), reactor temperature excursions (i.e. decreases) and catalyst productivity (i.e. increases), relative to a gas phase polymerization process carried out in a reactor in the presence of a polymerization catalyst comprising: i) a phosphinimine catalyst; ii) an inert support; and iii) a cocatalyst, but no catalyst modifier.

In an embodiment of the invention, a gas phase polymerization process carried out in a reactor in the presence of a polymerization catalyst comprising: i) a phosphinimine catalyst; ii) an inert support; iii) a cocatalyst; and iv) a catalyst modifier, wherein the catalyst modifier is present from 0.5 to 4.5 weight percent based on the weight of i), ii) and iii) of the polymerization catalyst; improves at least one of reactor static level (i.e. decreases), catalyst static level (i.e. decreases), reactor temperature excursions (i.e. decreases) and catalyst productivity (i.e. increases), relative to a gas phase polymerization process carried out in a reactor in the presence of a polymerization catalyst comprising: i) a phosphinimine catalyst; ii) an inert support; and iii) a cocatalyst, but no catalyst modifier.

In an embodiment of the invention, a gas phase polymerization process carried out in a reactor in the presence of a polymerization catalyst comprising: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; decreases the reactor static level relative to a gas phase polymerization process carried out in a reactor in the presence of a polymerization catalyst comprising: i) a phosphinimine catalyst; ii) an inert support; and iii) a cocatalyst, but no catalyst modifier.

In an embodiment of the invention, a gas phase polymerization process carried out in a reactor in the presence of a polymerization catalyst comprising: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; decreases the catalyst static level relative to a gas phase polymerization process carried out in a reactor in the presence of a polymerization catalyst comprising: i) a phosphinimine catalyst; ii) an inert support; and iii) a cocatalyst, but no catalyst modifier.

In an embodiment of the invention, a gas phase polymerization process carried out in a reactor in the presence of a polymerization catalyst comprising: i) a phosphinimine catalyst; ii) an inert support; iii) a cocatalyst; and iv) a catalyst modifier; wherein the catalyst modifier is present from 0.5 to 4.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; decreases the severity of reactor temperature excursions relative to a gas phase polymerization process carried out in a reactor in the presence of a polymerization catalyst comprising: i) a phosphinimine catalyst; ii) an inert support; and iii) a cocatalyst, but no catalyst modifier.

In an embodiment of the invention, a gas phase polymerization process carried out in a reactor in the presence of a polymerization catalyst comprising: i) a phosphinimine catalyst; ii) an inert support; iii) a cocatalyst; and iv) a catalyst modifier; wherein the catalyst modifier is present from 1.0 to 4.0 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; has increased productivity relative to a gas phase polymerization process carried out in a reactor in the presence of a polymerization catalyst comprising: i) a phosphinimine catalyst; ii) an inert support; and iii) a cocatalyst, but no catalyst modifier.

In an embodiment of the invention, a gas phase polymerization process carried out in a reactor in the presence of a polymerization catalyst comprising: i) a phosphinimine catalyst, ii) an inert support, iii) a cocatalyst, and iv) a catalyst modifier; wherein the catalyst modifier is present in from 0.25 to 6.0 weight percent based on the weight of i), ii), and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; where the polymerization catalyst is prepared by adding all of the catalyst modifier to the inert support prior to the addition of the phosphinimine catalyst and prior to the addition of the cocatalyst; has improved catalyst feeding relative to a gas phase polymerization process carried out in a reactor in the presence of a polymerization catalyst which is prepared by adding all of the catalyst modifier to the inert support after the addition of the phosphinimine catalyst and after the addition of the cocatalyst.

The presence of a catalyst modifier in the polymerization catalyst may also affect the properties of ethylene copolymers produced during gas phase polymerization of ethylene and an alpha-olefin as well as the properties of films made with those copolymers.

For example, the catalyst modifier may, when added in appropriate amounts to a phosphinimine based polymerization catalyst, alter the composition distribution (as defined below) in an ethylene copolymer relative to copolymer produced with a phosphinimine based polymerization catalyst not treated with the catalyst modifier. The catalyst modifier may, when added in appropriate amounts to a phosphinimine based polymerization catalyst, increase the short chain branching homogeneity of an ethylene copolymer relative to copolymer produced with a phosphinimine based polymerization catalyst not treated with a catalyst modifier. More specifically, a catalyst modifier may, when present in the polymerization catalyst in appropriate amounts, alter one or more of the following: the composition distribution breadth index (CDBI) of the ethylene copolymer as measured using temperature rising elution fractionation (TREF) methods; the weight percent of a higher temperature eluting material (i.e. from 90° C. to 105° C.) observed in TREF profile obtained for the ethylene copolymer; and the comonomer distribution profile in the ethylene copolymer as measured by gel permeation chromatography with Fourier transform infra-red detection (GPC-FTIR).

Ethylene copolymers can be defined by a composition distribution breadth index (CDBI), which is a measure as to how comonomers are distributed in an ethylene copolymer. The definition of composition distribution breadth index (CDBI) can be found in U.S. Pat. No. 5,206,075 and PCT publication WO 93/03093. The CDBI is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 can be employed. From the weight fraction versus composition distribution curve, the CDBI is determined by establishing the weight percentage of a copolymer sample that has a comonomer content within 50% of the median comonomer content on each side of the median. Generally, ethylene copolymers with a CDBI of less than about 50%, are considered "heterogeneously branched" copolymers with respect to the short chain branching. Such heterogeneously branched materials may include a highly branched fraction, a medium branched fraction and a higher density fraction having little or no short chain branching. In contrast, ethylene copolymers with a CDBI of greater than about 50% are considered "homogeneously branched" copolymers with respect to short chain branching in which the majority of polymer chains may have a similar degree of branching.

In embodiments of the invention, an ethylene copolymer made with a polymerization catalyst comprising: i) a phosphinimine catalyst, ii) an inert support, iii) a cocatalyst and iv) from 1.0 to 4.0 wt % of a catalyst modifier (based on the weight of i), ii), and iii) of the polymerization catalyst); has an at least 3%, or at least 5%, or at least 7% higher composition distribution breadth index (as measured by TREF) than an ethylene copolymer made with a catalyst comprising: i) a phosphinimine catalyst, ii) an inert support, and iii) a cocatalyst, but no catalyst modifier.

An ethylene copolymer can be defined by a weight percent of a higher temperature eluting material (i.e. from 90° C. to 105° C.) observed in TREF profile. The amount of copolymer which elutes at a temperature of from 90° C. to 105° C. is another indication as to how comonomers are distributed in an ethylene copolymer.

In embodiments of the invention, an ethylene copolymer made with a polymerization catalyst comprising i) a phosphinimine catalyst, ii) an inert support, iii) a cocatalyst and iv) from 1.0 to 4.0 wt % of a catalyst modifier (based on the weight of i), ii) and iii) of the polymerization catalyst) has a weight percent of an ethylene copolymer fraction (based on the weight of the copolymer) which elutes at from 90° C. to 105° C. in a TREF analysis which is decreased by at least 1%, or by at least 2%, or by at least 3% relative to an ethylene copolymer made with a catalyst comprising: i) a phosphinimine catalyst, ii) an inert support, and iii) a cocatalyst, but no catalyst modifier.

Ethylene copolymers can have a number of different comonomer distribution profiles which represent how the comonomers are distributed amongst polymer chains of different molecular weight. The so called "comonomer distribution profile" is most typically measured using Gel-Permeation Chromatography with Fourier Transform Infra-Red detection (GPC-FTIR). If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat". The terms "reversed comonomer distribution" and "partially reversed comonomer distribution" mean that in the GPC-FTIR data obtained for the copolymer, there is one or more higher molecular weight components having a higher comonomer incorporation than in one or more lower molecular weight segments. If the comonomer incorporation rises with molecular weight, the distribution is described as "reversed". Where the comonomer incorporation rises with increasing molecular weight and then declines, the comonomer distribution is described as "partially reversed".

In embodiments of the invention, use of a polymerization catalyst comprising i) a phosphinimine catalyst, ii) an inert support, iii) a cocatalyst, and iv) from 1.0 to 4.0 wt % of a catalyst modifier (based on the weight of i), ii) and iii) of the polymerization catalyst) for ethylene/alpha-olefin copolymerization, changes the comonomer distribution profile of an ethylene copolymer from a normal profile to a flat profile, or from a flat profile to a reversed profile or from a normal profile to a reversed profile, relative to an ethylene copolymer made with a polymerization catalyst comprising: i) a phosphinimine catalyst, ii) an inert support, and iii) a cocatalyst, but no catalyst modifier.

The catalyst modifier, may when included in the phosphinimine based polymerization catalyst in appropriate amounts, provide ethylene copolymer which when cast into film has reduced numbers of gels, relative to copolymer produced with a phosphinimine based olefin polymerization catalyst not treated with a catalyst modifier.

In an embodiment of the invention, the presence of from 1.0 to 4.0 weight per cent of a catalyst modifier in a polymerization catalyst comprising i) a phosphinimine catalyst, ii) an inert support, iii) a cocatalyst, and iv) a catalyst modifier decreases the number of gels present (by OCS gel count) in a film cast from a copolymer obtained using the polymerization catalyst (relative to film cast from a copolymer obtained using a polymerization catalyst not treated with a catalyst modifier).

In embodiments of the invention, the presence of from 1.0 to 4.0 weight per cent of a catalyst modifier in an olefin polymerization catalyst comprising i) a phosphinimine catalyst, ii) an inert support, iii) a cocatalyst, and iv) a catalyst modifier, decreases the number of gels present in a film cast from a copolymer obtained using the olefin polymerization catalyst, from above 100 to below 10, or from above 50 to below 10, or from above 20 to below 10 according to OCS gel count.

Although a catalyst modifier, must in the present invention, be present in the polymerization catalyst at some point before adding the polymerization catalyst to a polymerization zone, the present invention does not preclude embodiments in which a catalyst modifier is also added directly to a reaction zone or to some other part of a gas phase process which is associated with the reaction zone.

Hence, the catalyst modifier may also be fed directly to a reactor system using any appropriate method known to persons skilled in the art. For example, the catalyst modifier may be fed to a reactor system as a neat solid or liquid or as a solution or as a slurry in a suitable solvent or diluent respectively. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Alternatively, the catalyst modifier may be added to an inert support material and then fed to a polymerization reactor as a dry feed or a slurry feed. The catalyst modifier may be fed to various locations in a reactor system. When considering a fluidized bed process for example, the catalyst modifier may be fed directly to any area of the reaction zone, or any area of the entrainment zone, or it may be fed to any area within the recycle loop, where such areas are found to be effective sites at which to feed a catalyst modifier. For example, further catalyst modifier can be added to a reactor with all or a portion of one or more of the monomers or the cycle gas; or further catalyst modifier can be added through a dedicated feed line or added to any convenient feed stream including an ethylene feed stream, a comonomer feed stream, a catalyst feed line or a recycle line; or further catalyst modifier can be fed to a location in a fluidized bed system in a continuous or intermittent manner; or further catalyst modifier can be added to a reactor at a time before, after or during the start of the polymerization reaction; or further catalyst modifier can be added by spraying a solution or mixture of the catalyst modifier directly into a reaction zone; or further catalyst modifier can be added to a polymer seed bed present in a reactor prior to starting the polymerization reaction by introduction of the polymerization catalyst.

When further catalyst modifier is desired then it may be added as a solution or mixture with a solvent or diluent respectively, and the catalyst modifier may make up for example from 0.1 to 30 wt % of the solution or mixture, or from 0.1 to 20 wt %, or from 0.1 to 10 wt %, or from 0.1 to 5 wt % or from 0.1 to 2.5 wt % or from 0.2 to 2.0 wt %, although a person skilled in the art will recognize that further, possibly broader ranges, may also be used and so the invention should not be limited in this regard.

When further catalyst modifier is desired then the amount of catalyst modifier fed to a reactor will generally not exceed about 150 ppm, or 100 ppm, or 75 ppm, or 50 ppm, or 25 ppm (parts per million based on the weight of the (co)polymer being produced).

EXAMPLES

Catalyst Modifier

Atmer-163™ was obtained from CRODA CANADA LTD and dried over 3 Å molecular sieves for several days prior to use. Atmer-163 has as its main component, a mixture of C13 to C15 hydrocarbyl diethanolamines, $CH_3(CH_2)_nN(CH_2CH_2OH)_2$ where n is 12 to 14.

Armostat-1800™ was obtained from Akzo Nobel and purified by drying a toluene or pentane solution over 3 Å molecular sieves for several days prior to use. Armostat-1800 is principally a long chain substituted alkanolamine having the formula: $C_{18}H_{37}N(CH_2CH_2OH)_2$.

In an alternative manner of drying the Armostat-1800 material, 950 g of the material, was loaded in a 2 L-round bottom flask and melted in an oil bath at 80° C. The oil bath temperature was then raised to 110° C. and a high vacuum was applied while maintaining stirring. Bubbles were observed due to the release of gas and moisture vapor. Approximately two hours later, gas evolution subsided and heating/evacuation was continued for another hour. The Armostat-1800 material was then cooled down to room temperature and stored under nitrogen atmosphere until use. The moisture level in the purified Armostat-1800 was determined to be 110 ppm by Karl-Fischer titration method.

Polymerization Catalysts

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v 15, p. 1518 or used directly after being stored over activated 4 Å molecular sieves. The aluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen. The phosphinimine catalyst compound $(1,2-(n-propyl)(C_6F_5)Cp)Ti(N=P(t-Bu)_3)Cl_2$ was made in a manner similar to the procedure given in U.S. Pat. No. 7,531,602 (see Example 2). The phosphinimine compound $(1-C_6F_5CH_2—Indenyl)((t-Bu)_3P=N)TiCl_2$ was made as follows. To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2—Br$ (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford $1-C_6F_5CH_2$-indene (13.58 g, 88%). To a stirred slurry of $TiCl_4 0.2THF$ (1.72 g, 5.15 mmol) in toluene (15 mL) was added solid $(t-Bu)_3P=N—Li$ (1.12 g, 5 mmol) at room temperature. The resulting reaction mixture was heated at 100° C. for 30 min and then allowed to cool to room temperature. This mixture containing $((t-Bu)_3P=N)TiCl_3$ (1.85 g, 5 mmol) was used in the next reaction. To a THF solution (10 mL) of $1-C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-C$_6$F$_5$CH$_2$—Indenyl)((t-Bu)$_3$P=N)TiCl$_2$ (2.35 g, 74%).

Type 1 Polymerization Catalysts Based on (1,2-(n-propyl) (C$_6$F$_5$)Cp)Ti(N=P(t-Bu)$_3$)Cl$_2$ (1a) or (1-C$_6$F$_5$CH$_2$—Indenyl)((t-Bu)$_3$P=N)TiCl$_2$ (1b); Comparative: without catalyst modifier present: Type 1a) To a slurry of dehydrated silica (361.46 g) in toluene (1400 mL) was added a 10 wt % MAO solution (1004.41 g of 4.5 wt % Al in toluene) over 35 minutes. The vessel containing the MAO was rinsed with toluene (2×50 mL) and added to the reaction mixture. The resultant slurry was stirred with an overhead stirrer assembly (200 rpm) for 2 hours at ambient temperature. To this slurry was added a toluene (~100 mL) solution of (1,2-(n-propyl)(C$_6$F$_5$) Cp)Ti(N=P(t-Bu)$_3$)Cl$_2$ (8.47 g) over 10 minutes. This solution may need to be gently heated to 45° C. for a brief period (5 minutes) to fully dissolve the molecule. The vessel containing the molecule was rinsed with toluene (2×10 mL) and added to the reaction mixture. After stirring for 2 hours (200 rpm) at ambient temperature the slurry was filtered, washed with pentane (2×200 mL) and dried in vacuo to less than 1.5 wt % residual volatiles. The solid catalyst was isolated and stored under nitrogen until further use. Type 1 b) In a glovebox, into a 2 L, three-neck round bottom flask equipped with an overhead stirrer was added 150 mL toluene. While the solvent was stirred, 38.894 g of dehydrated silica was added. Next, 107.940 g of a MAO in toluene solution containing 4.5 wt % Al was added into the flask by cannula over a period of about 15 minutes while stirring was maintained. The MAO solution container was rinsed two times, each with 25 mL toluene and the rinses were added into the flask. The slurry was stirred for 1 hour at room temperature. A solution of 0.944 g (1-C$_6$F$_5$CH$_2$—Indenyl)((t-Bu)$_3$P=N)TiCl$_2$ complex in 10 mL toluene was then added into the flask over a period of about 10 minutes. The metal complex solution container was rinsed three times, each with about 6 mL toluene and the rinses were added into the flask. The slurry was stirred for 2 hours at ambient temperature. The catalyst slurry was poured into a fritted funnel, which was fitted onto a filter flask, and reduced pressure was then applied to the filter flask to separate the reaction solvent. Toluene (25 mL) was added to the filter cake and stirred with a spatula to obtain a well dispersed slurry. Reduced pressure was then applied to the filter flask to remove the wash solvent. A second toluene wash was done and reduced pressure applied to remove solvent. Pentane (50 mL) was added to the filter cake and stirred with spatula to obtain a well dispersed slurry. Reduced pressure was then applied to the filter flask to remove wash solvent. A second pentane wash was done and reduced pressure applied to remove solvent until the filter cake appears to be dry. The filter cake was then transferred to a 1 L round-bottomed flask and the catalyst was dried by applying reduced pressure to the flask until a pressure of about 300 mTorr was obtained.

Type 2 Polymerization Catalysts Based on (1,2-(n-Propyl) (C$_6$F$_5$)Cp)Ti(N=P(t-Bu)$_3$)$_2$ (2a, 2b, 2c, 2d) or (1-C$_6$F$_5$CH$_2$—Indenyl)((t-Bu)$_3$P=N)TiCl$_2$ (2e); Inventive: with catalyst modifier present: Type 2a) 1.5 wt % Atmer-163. To a pentane (400 mL) slurry of the catalyst prepared as above (100.17 g of Catalyst Type 1a) was added neat Atmer-163 (1.55 g). The slurry was stirred with an overhead stirrer assembly (200 rpm) for 30 minutes at ambient temperature at which point volatiles were removed in vacuo while heating to 30° C. The resultant catalyst was dried to less than 1.5 wt % residual volatiles, isolated and stored under nitrogen until further use. Type 2b) 1.5 wt % Armostat-1800. To a slurry of dehydrated silica (58.54 g) in toluene (240 mL) was added a 10 wt % MAO solution (161.89 g of 4.5 wt % Al in toluene) over 35 minutes. The vessel containing the MAO was rinsed with toluene (2×25 mL) and added to the reaction mixture. The resultant slurry was stirred with an overhead stirrer assembly (200 rpm) for 2 hours at ambient temperature. To this slurry was added a toluene (35 mL) solution of (1,2-(n-propyl)(C$_6$F$_5$)Cp)Ti(N=P(t-Bu)$_3$)Cl$_2$ (0.91 g) over 10 minutes. This solution may need to be gently heated to 45° C. for a brief period (5 minutes) to fully dissolve the molecule. The vessel containing the molecule was rinsed with toluene (2×10 mL) and added to the reaction mixture. After stirring for 2 hours (200 rpm) at ambient temperature a toluene (20 mL) solution of Armostat-1800 (1.37 g) was added to the slurry which was further stirred for 30 minutes. The slurry was decanted, stirred with pentane (100 mL) for 30 minutes and then decanted once again. This step was repeated once more before the catalyst was dried in vacuo to less than 1.5 wt % residual volatiles. The solid catalyst was isolated and stored under nitrogen until further use. Type 2c) 2.5 wt % Armostat-1800. A polymerization catalyst containing 2.5 wt % of Armostat-1800 was made similarly to Type 2b above except that the relative amount of Armostat-1800 added was increased to give 2.5 weight per cent of catalyst modifier based on the combined weight of the phosphinimine catalyst, the support and the cocatalyst. Type 2d) 3.5 wt % Armostat-1800. A polymerization catalyst containing 3.5 wt % of Armostat-1800 was made similarly to Type 2b above except that the relative amount of Armostat-1800 added was increased to give 3.5 weight per cent of catalyst modifier based on the combined weight of the phosphinimine catalyst, the support and the cocatalyst. Type 2e) 2.5 wt % Armostat-1800. In a 3 L, three-neck round bottom flask equipped with an overhead stirrer was added toluene (320 mL). While the stirrer was maintained at 200 rpm, dehydrated silica (79.702 g) was added. A 10 wt % MAO in toluene solution (174.607 g) was added into the flask by cannula over a period of about 15 minutes while stirring was maintained. The MAO solution container was rinsed with toluene (2×25 mL), and the rinses were added into the flask. The slurry was stirred for 2 hours at room temperature. The complex, (1-C$_6$F$_5$CH$_2$-Indenyl)((t-Bu)$_3$P=N)TiCl$_2$, (1.996 g) was then added into the flask in solid form over a period of about 5 minutes. The slurry was stirred for 2 hours at ambient temperature. A 15 wt % Armostat-1800 in toluene solution (16.762 g) was added into the flask over a period of 3 minutes. The container was rinsed with toluene (2×5 mL), and the rinses were added in the flask. The slurry was further stirred at ambient temperature for 30 minutes. The catalyst slurry was poured into a fritted funnel, which was fitted onto a filter flask, and reduced pressure applied to the filter flask to separate the reaction solvent. Toluene (150 mL) was added to the filter cake and stirred with a spatula to obtain a well dispersed slurry. Reduced pressure was then applied to the filter flask to remove the wash solvent. A second toluene wash was done and reduced pressure applied to remove solvent. Pentane (150 mL) was added to the filter cake and stirred with spatula to obtain a well-dispersed slurry. Reduced pressure was then applied to the filter flask to remove wash solvent. A second pentane wash was done and reduced pressure applied to remove solvent until the filter cake appears to be dry. The filter cake was then transferred to a 2 L round-bottomed flask and the catalyst was dried by applying reduced pressure to the flask until 315 mTorr was obtained.

General Polymerization Conditions

Continuous ethylene/1-hexene gas phase copolymerization experiments were conducted in a 56.4 liter technical scale reactor (TSR) in continuous gas phase operation (for an example of a TSR reactor set up see Eur. Pat. Appl. No. 659,773A1). Ethylene polymerizations were run at 80° C. with a total operating pressure of 300 pounds per square inch gauge (psig). Gas phase compositions for ethylene, 1-hexene and hydrogen were controlled via closed-loop process control to values of 35-51, 0.5-1.7 and 0.018-0.042 mole percent, respectively. Nitrogen constituted the remainder of the gas phase mixture (approximately 49 mole %). Typical production rate for these conditions was 2.0 to 3.0 kg of polyethylene per hour. Triethylaluminum (TEAL) was fed to the reactor continuously, as a 0.25 wt % solution in hexane (solution fed at about 10 mL/hr) in order to scavenge impurities. The residence time in the reactor is held at 1.5-3.0 hr, with a production rate range from 1.5-2.7 kg/hr.

The catalyst metering device used for administering catalyst to the reactor is equipped with a static probe that measures electrostatic charge carried by the solid material passing through a monitored tube leading catalyst to the reactor.

Polymer Analysis

Melt index, $I_2$, in g/10 min was determined on a Tinius Olsen Plastomer (Model MP993) in accordance with ASTM D1238 condition F at 190° C. with a 2.16 kilogram weight. Melt index, $I_{10}$, was determined in accordance with ASTM D1238 condition F at 190° C. with a 10 kilogram weight. High load melt index, $I_{21}$, in g/10 min was determined in accordance with ASTM D1238 condition E at 190° C. with a 21.6 kilogram weight.

Polymer density was determined in grams per cubic centimeter (g/cc) according to ASTM D792.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The peak melting point ($T_m$) and percent of crystallinity of the polymers were determined by using a TA Instrument DSC Q1000 Thermal Analyser at 10° C./min. In a DSC measurement, a heating-cooling-heating cycle from room temperature to 200° C. or vice versa was applied to the polymers to minimize the thermo-mechanical history associated with them. The melting point and percent of crystallinity were determined by the primary peak temperature and the total area under the DSC curve respectively from the second heating data. The peak melting temperature $T_m$ is the higher temperature peak, when two peaks are presented in a bimodal DSC profile (typically also having the greatest peak height).

A compression molded film of 0.0035 inches was extracted at 50° C. in hexane for 2 hours. The sample was re-weighed and the extractable content was determined from the relative change in sample weight according to ASTM D5227.

The branch frequency of copolymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution profile) was carried out using high temperature Gel Permeation Chromatography (GPC) and FT-IR of the eluent. Polyethylene standards with a known branch content, polystyrene and hydrocarbons with a known molecular weight were used for calibration.

To determine CDBI, a solubility distribution curve is first generated for the copolymer. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI is determined by establishing the weight percentage of a copolymer sample that has a comonomer content within 50% of the median comonomer content on each side of the median. The weight percentage of a higher density fraction, (i.e. the wt % eluting from 90-105° C.), is determined by calculating the area under the TREF curve at an elution temperature of from 90 to 105° C. The weight percent of copolymer eluting below 40° C. can be similarly determined. For the purpose of simplifying the correlation of composition with elution temperature, all fractions are assumed to have a Mn≥15,000, where Mn is the number average molecular weight of the fraction. Any low molecular weight fractions present generally represent a trivial portion of the polymer. The remainder of this description maintains this convention of assuming all fractions have Mn≥15,000 in the CDBI measurement.

Temperature rising elution fractionation (TREF) method. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedure described above is well known to persons skilled in the art and can be used to determine: the overall TREF profile, CDBI, copolymer wt % below 40° C., and copolymer wt % from 90° C. to 105° C.

Gel Count Procedure

An in-lab OCS gel measurement system, which consists of an OCS gel camera, FSA 100 film scanning unit, image analysis software, cast line extruder and chill roll windup setup, is used to determine the amount of gels in a 1.0 to 2.0 mil cast film. For a gel count measurement, a polymer sample is added into a 20 mm extruder with a mixing screw of 3:1 or 4:1 compression ratio and run at 60 rpm. The haul-off speed and chill roll temperature of the cast film line are set at 8.0 m/min and 23 to 30° C. respectively. The pictures of cast film are taken by an OCS camera continuously and the film scanning unit with image analysis software is used to monitor the gel data in the pictures. The gel counts in a cast film are defined as the total area of defects per total area measured and reported as a total ppm value.

Polymerization Results

EXAMPLES 1, 3, 5, 6, 13 AND 16 COMPARATIVE BASELINE RUNS

The Type 1 Catalysts (each of the Type 1 Catalysts 1a and 1b, are prepared as described above) were placed under a N2 blanket and using a dry catalyst feeder, a small shot of supported catalyst was continuously added to a technical scale reactor via a feeding tube. Equilibrium polymerization conditions were established after a period of 4 residence times. Once equilibrium conditions were established, the static level in the reactor was measured over 6 hours using a static probe (Correflow Electrostatic Monitor 3410™ available from Progression). The static probe was located within the polymerization reactor. The reactor temperature was also measured. Several similar runs were carried out at different times to establish baseline run conditions prior to running an inventive example (see "baseline" Run Nos. 1, 3, 5, 6, 13 and 16 of Table 1). Static of the solid catalyst entering the reactor was also measured within the catalyst metering area over the 6 hour period. Relevant data for these examples are provided in Table 1.

EXAMPLES 2, 4, 7-12 AND 17 INVENTIVE RUNS

In each polymerization run, a Type 2 polymerization catalyst (each of the Type 2 Catalysts 2a-2e, are prepared as described above using various amounts of a catalyst modifier) was placed under a N2 blanket and using a dry catalyst feeder, a small shot of supported catalyst was continuously added to a technical scale reactor via a feeding tube. Equilibrium polymerization conditions were established after a period of 4 residence times. Once equilibrium conditions were established, the static level in the reactor was measured over 6 hours using a static probe (Correflow Electrostatic Monitor 3410 available from Progression). The static probe was located within the polymerization reactor. During this time reactor temperature was also measured. Polymerization runs using Type 2 catalysts are inventive runs (see "inventive" polymerization Run Nos. 2, 4, 7-12 and 17 in Table 1) and were carried out soon after establishing appropriate baseline conditions. Static of the solid catalyst entering the reactor was also measured within the catalyst metering area over the 6 hour period. An examination of the polymer product obtained during each of these runs revealed a free flowing powder without significant chunks or strings. Relevant data for these examples are provided in Table 1.

EXAMPLES 14 AND 15 COMPARATIVE RUNS

To provide a comparison between adding catalyst modifier directly to the reactor and including a catalyst modifier in the catalyst formulation, polymerization runs were conducted in which the catalyst modifier was added to the reactor directly, instead of including the catalyst modifier in the polymerization catalyst (see "comparative" Run Nos. 14 and 15). These examples were conducted in a manner analogous to Example 1, except that once equilibrium polymerization conditions were established, a catalyst modifier was fed to the reactor. The catalyst modifier was Atmer-163 which was diluted in hexanes to give a 1% by weight mixture and added via a manifold, into the reactor. In Example 14, 25 ppm of Atmer-163 (per mass of polymer produced) was fed to the reactor. Once steady state was achieved, the reaction was held constant for another 3-4 residence times, and then the static level in the reactor was measured over 6 hours. Reactor temperature was measured and the static of the catalyst entering the reactor was measured within the catalyst metering area over the 6 hour period. In Example 15, the level of Atmer-163 fed to the reactor was increased from 25 ppm to 100 ppm (based on the weight of the polymer produced) and then the static level was measured over 6 hours. Reactor temperature and the static of the catalyst entering the reactor were measured within the catalyst metering area over the 6 hour period. An examination of the polymer product obtained during Atmer-163 addition revealed a free flowing powder without significant chunks or strings. Relevant data for these examples are provided in Table 1.

TABLE 1

Static Level, Catalyst Productivity and Reactor Temperature Range

| Examples (Poly. Run No.)[1] | Catalyst Type | Catalyst Modifier in Catalyst | Catalyst Modifier fed to Reactor | Productivity (g poly/ g cat) | Catalyst Static Level[2] | Reactor Static Level[3] | Temp. Standard Deviation[4] |
|---|---|---|---|---|---|---|---|
| 1 (baseline) | Type 1a | none | none | 3209 | 0.045 | 0.71 | 1.2 |
| 2 (inventive) | Type 2a | 1.5 wt % Atmer-163 | none | 4423 | 0.020 | 0.39 | 0.4 |
| 3 (baseline) | Type 1a | none | none | 4900 | 0.031 | 0.63 | 0.7 |
| 4 (inventive) | Type 2b | 1.5 wt % Armostat-1800 | none | 5346 | 0.016 | 0.86[5] | 0.5 |
| 5 (baseline) | Type 1a | none | none | 3909 | 0.041 | 0.43 | 0.8 |
| 6 (baseline) | Type 1a | none | none | 4043 | 0.029 | 0.42 | 0.7 |

TABLE 1-continued

Static Level, Catalyst Productivity and Reactor Temperature Range

| Examples (Poly. Run No.)[1] | Catalyst Type | Catalyst Modifier in Catalyst | Catalyst Modifier fed to Reactor | Productivity (g poly/g cat) | Catalyst Static Level[2] | Reactor Static Level[3] | Temp. Standard Deviation[4] |
|---|---|---|---|---|---|---|---|
| 7 (inventive) | Type 2b | 1.5 wt % Armostat-1800 | none | 4238 | 0.022 | 0.26 | 0.4 |
| 8 (inventive) | Type 2c | 2.5 wt % Armostat-1800 | none | 6842 | 0.023 | 0.87[6] | 0.3 |
| 9 (inventive) | Type 2c | 2.5 wt % Armostat-1800 | none | 5418 | 0.023 | 0.32 | 0.3 |
| 10 (inventive) | Type 2b | 1.5 wt % Armostat-1800 | none | 5328 | 0.013 | 0.26 | 0.5 |
| 11 (inventive) | Type 2d | 3.5 wt % Armostat-1800 | none | 4751 | 0.019 | 0.34 | 0.3 |
| 12 (inventive) | Type 2d | 3.5 wt % Armostat-1800 | none | 5000 | 0.016 | 0.58[7] | 0.6 |
| 13 (baseline) | Type 1a | none | none | 3955 | 0.019 | 0.47 | — |
| 14 (comparative) | Type 1a | none | 25 ppm Atmer-163 | 3653 | 0.026 | 0.31 | — |
| 15 (comparative) | Type 1a | none | 100 ppm Atmer-163 | 276 | 0.027 | 0.29 | — |
| 16 (baseline) | Type 1b | none | none | 2300 | 0.023 | 0.23 | 0.41 |
| 17 (inventive) | Type 2e | 2.5 wt % Armostat-1800 | none | 3000 | 0.046 | 0.14 | 0.22 |

Note
[1]Pol. Run Nos 1-15 use a polymerization catalyst based on the phosphinimine complex (1,2-(n-propyl)($C_6F_5$)Cp)Ti(N=P(t-Bu)$_3$)Cl$_2$; Pol. Run Nos 16 and 17 use a polymerization catalyst based on the phosphinimine complex (1-$C_6F_5CH_2$-Indenyl)((t-Bu)$_3$P=N)TiCl$_2$.

Note
[2]The static level of the catalyst entering the reactor was measured by using a Correstat 3410 static probe over a 6 hour period (or a 12 hour period for Pol Run Nos 16 and 17). To obtain this value, a static signal, in nanoamps, is recorded each second in the catalyst metering tube. These signals are transformed into positive values by taking the absolute value of each number. The sum of the absolute values is divided by the number of seconds used to calculate the sum; this number is reported in Table 1.

Note
[3]The static level of solids in the reactor was measured with a Correstat 3410 static probe over a 6 hour period (or a 12 hour period for Pol Run Nos 16 and 17). To obtain this value, a static signal, in nanoamps, is recorded each second at the reactor wall. These signals are transformed into positive values by taking the absolute value of each number. The sum of the absolute values is divided by the number of seconds used to calculate the sum; this number is reported in Table 1.

Note
[4]The standard deviation in temperature. Standard deviation of the reactor temperature is a way to quantify how much the reactor temperature fluctuates from the mean temperature or control temperature. A smaller standard deviation means smaller temperature fluctuations around the control temperature. A larger standard deviation means larger temperature fluctuations around the control temperature. In the data set generated for the patent, the standard deviation was calculated over 10 hours of steady state operation (or a 12 hour period from Pol. Run Nos 16 and 17).

Note
[5]This run had a higher than expected reactor static reading for unknown reasons. We note however, that the catalyst static level and the size of the temperature excursion are both low relative to the baseline case (Run. No. 3).

Note
[6]An unexpected increase in static suddenly occurred during this run. Examination of the polymer showed a small amount of roped material which may have artificially increased the overall static measurement within the last 6 hours of this run. An examination of the static levels prior to the static spike was consistent with an overall static measurement of 0.49 (i.e. over the previous 6 hours).

Note
[7]An ethylene pressure supply problem created pressure swings in the reactor which may have impacted the reactor static measurement.

The data in Table 1 shows that the inclusion of a catalyst modifier in the phosphinimine based polymerization catalyst can improve catalyst productivity, and that to improve productivity, the preferred amounts of catalyst modifier added are somewhere from about 0.5 wt % to about 4.0 wt % based on the weight of the polymerization catalyst. FIG. 1 also shows how optimizing the amount of catalyst modifier can increase the catalyst productivity. The improvement in catalyst productivity was observed regardless of whether the phosphinimine catalyst used to make the polymerization catalyst included a substituted cyclopentadienyl ligand (e.g. (1,2-(n-propyl)($C_6F_5$)Cp)Ti(N=P(t-Bu)$_3$)Cl$_2$) or a substituted indenyl ligand (e.g. (1-$C_6F_5CH_2$-Indenyl)((t-Bu)$_3$P=N)TiCl$_2$).

The data provided in Table 1 shows that inclusion of a catalyst modifier within the polymerization catalyst reduced at least one of: reactor static level, catalyst static level, and reactor temperature excursions relative to the polymerization catalyst not treated with a catalyst modifier. With the exception of Run No. 8 (in which a small amount of polymer rope was formed; see Note 6) visual examination of all polymer products obtained using a Type 2 catalyst revealed products which were free flowing powders without significant chunks or strings. Hence, the data show that reactor continuity and operability improve when a catalyst modifier is included in the polymerization catalyst formulation.

Inclusion of the catalyst modifier in the polymerization catalyst generally decreases the level of static measured in the reactor. Although there were a few exceptions to this trend (see polymerization Run Nos. 4, 8, 12 and corresponding Notes 5, 6 and 7 respectively), we note that in virtually all cases the catalyst static measured decreased when a Type 2 catalyst was used relative to a Type 1 catalyst (the exception was polymerization Run No. 17). In all inventive Examples using a Type 2 catalyst (treated with a catalyst modifier), the reactor temperature excursions were smaller than when a Type 1 catalyst (not treated with a catalyst modifier) was used.

Figure 8:
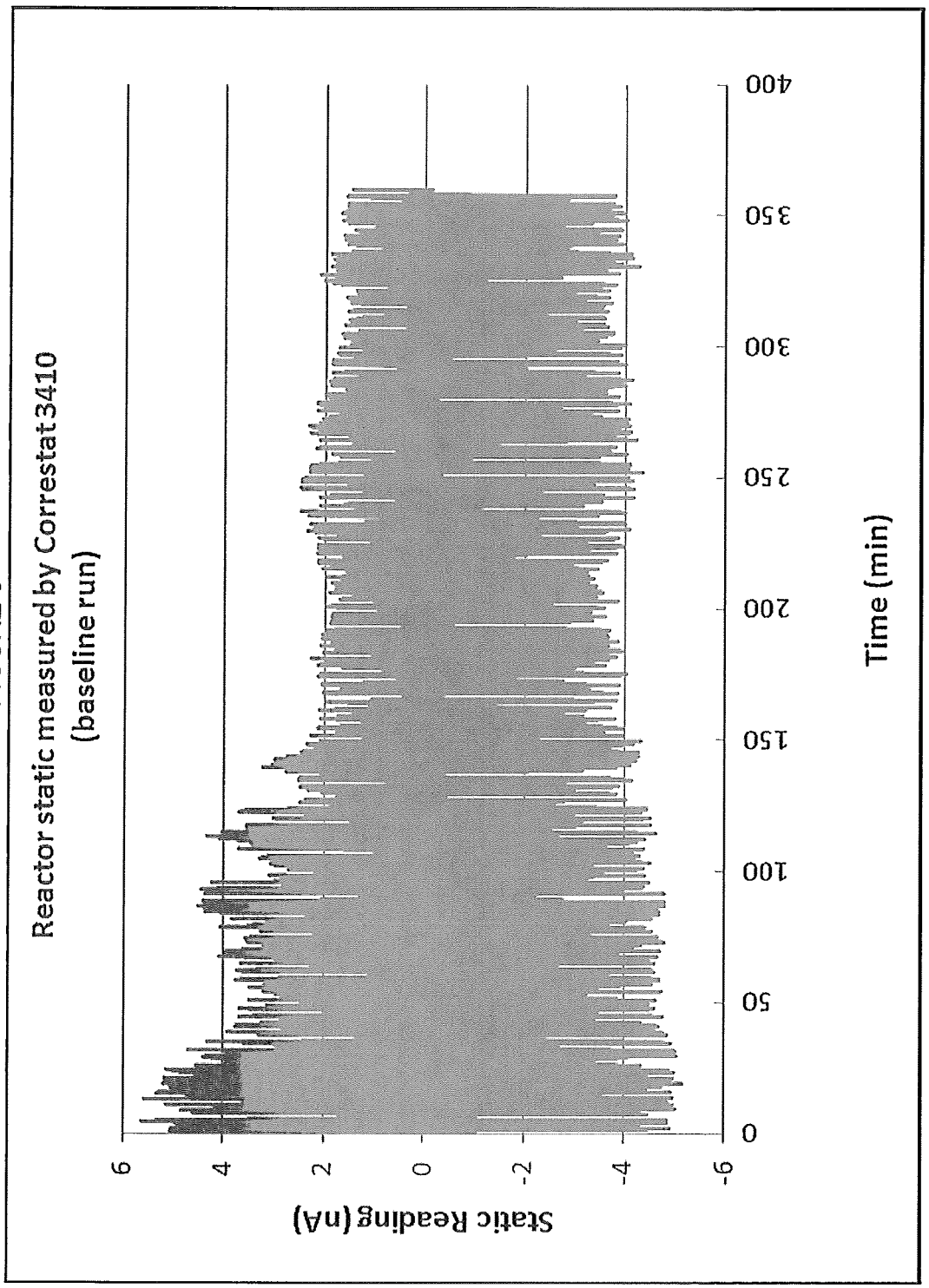
FIG. 8 shows the reactor static in nanoamps (nA) over time, measured using a Correstat 3410 static probe located in the reactor during a polymerization run. The polymerization is carried out in the presence of a catalyst not treated with a catalyst modifier (baseline Run No. 13).
Figure 9:
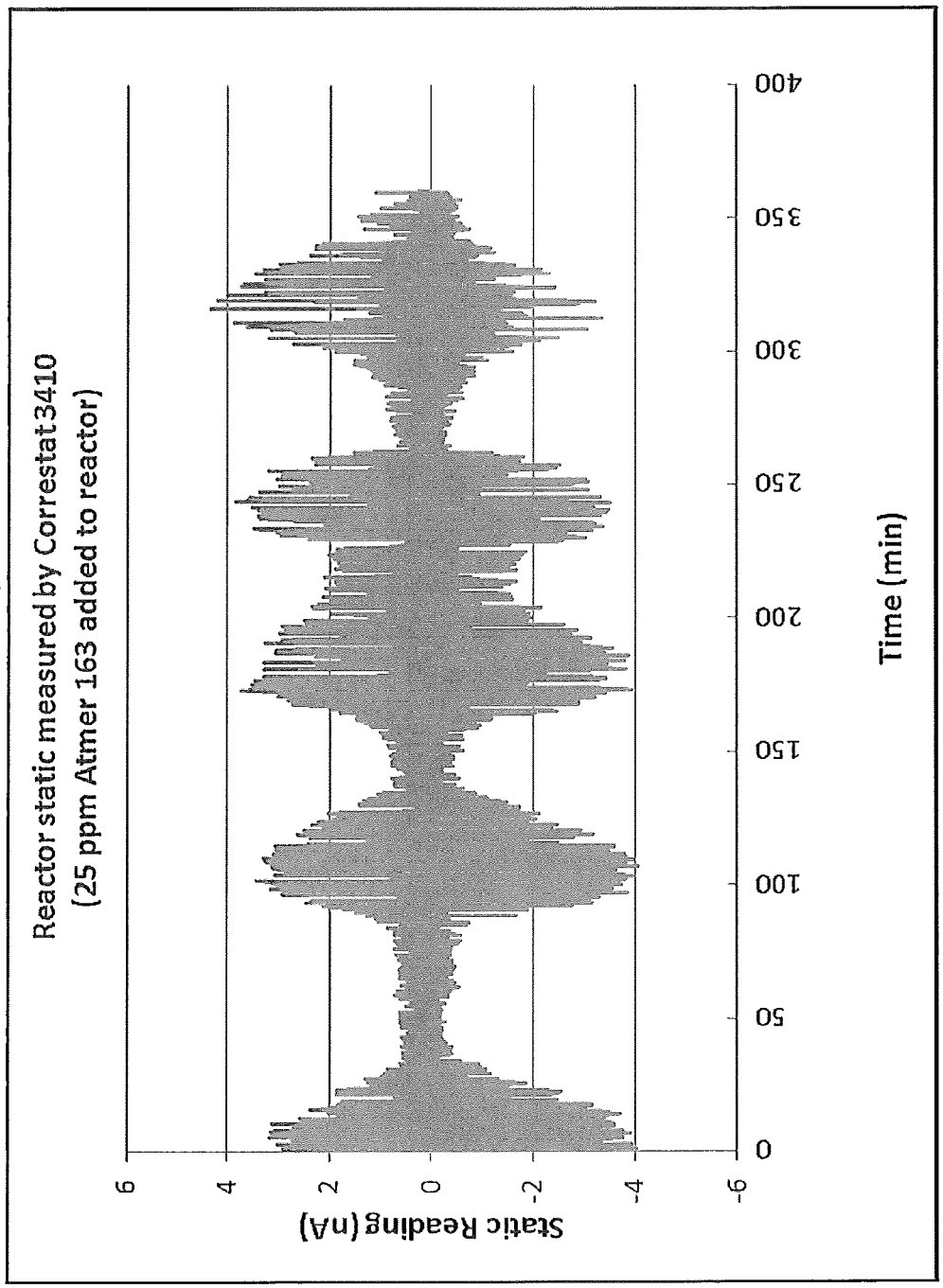
FIG. 9 shows the reactor static in nanoamps (nA) over time, measured using a Correstat 3410 static probe located in the reactor during a polymerization run. The polymerization is carried out in the presence of 25 ppm of Atmer-163 added directly to the reactor (based on the weight of the polymer produced).
Figure 10:
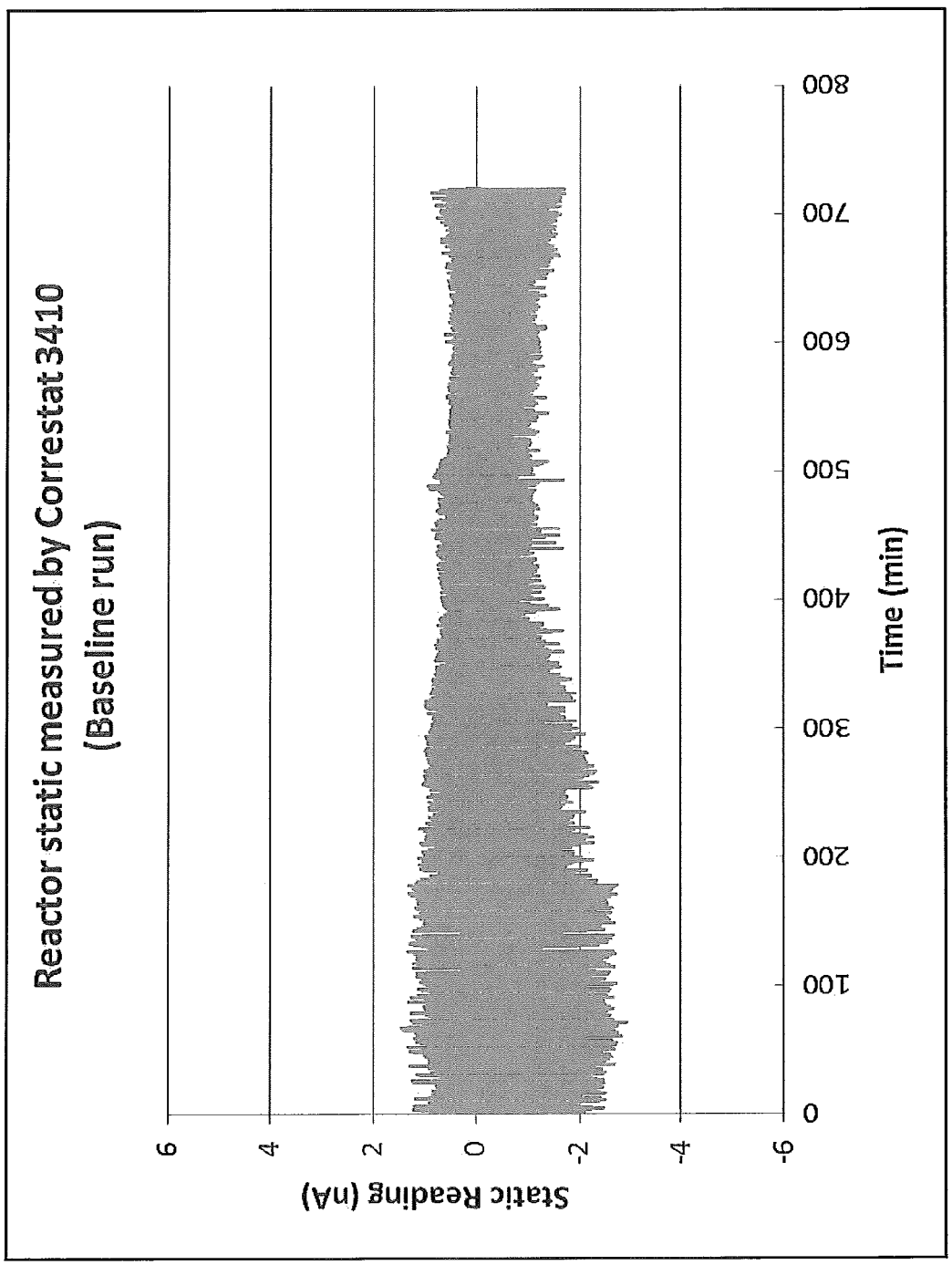
FIG. 10 shows the reactor static in nanoamps (nA) over time, measured using a Correstat 3410 static probe located in the reactor during a polymerization run. The polymerization is carried out in the presence of a catalyst not treated with a catalyst modifier (baseline Run No. 16).
Figure 11:
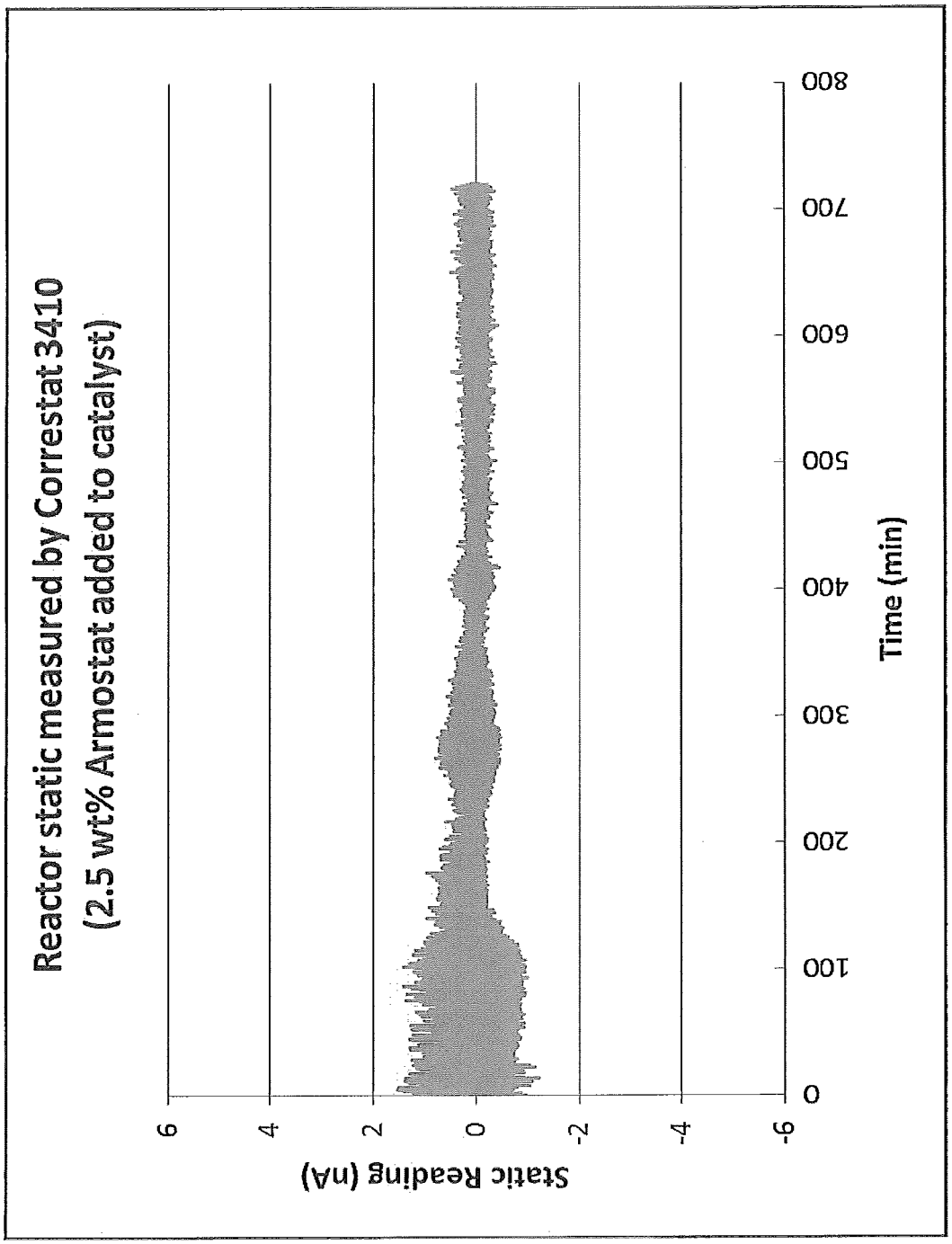
FIG. 11 shows the reactor static in nanoamps (nA) over time, measured using a Correstat 3410 static probe located in the reactor during a polymerization run. The polymerization is carried out in the presence of catalyst treated with 2.5 wt % of Armostat-1800 (Run No. 17).

For plots of reactor static observed over time for polymerization runs using catalysts with and without catalyst modifier treatment see FIGS. 2, 3, 4, 5, 6, 7, 10 and 11 which correspond to Polymerization Run Nos. 1, 2, 6, 7, 9, 11, 16 and 17 respectively. For plots of reactor static observed over time for polymerization runs using the Type 1a catalyst (without catalyst modifier treatment), but where the catalyst modifier was not added or added directly to the reactor see FIGS. 8 and 9 which correspond to Polymerization Run Nos. 13 and 14 respectively.

The data in Table 1 also includes a comparison between adding the catalyst modifier to the catalyst and adding the catalyst modifier directly to the reactor. It is clear that although addition of the catalyst modifier directly to the reactor improves static levels and reactor operability relative to baseline conditions, it also negatively impacts the catalyst productivity to some degree, especially at higher loadings. Hence, the data in Table 1 indicate that only inclusion of the catalyst modifier within the polymerization catalyst formulation provides the dual improvement: higher catalyst productivity and better reactor operability.

In addition to improvements in reactor operability, we have found that inclusion of a catalyst modifier in the polymerization catalyst (or addition of catalyst modifier directly to the reactor) may dramatically affect copolymer product architecture while not significantly changing the polymer density or melt index. The polymer properties of copolymers isolated from polymerization Run Nos. 2, 4, 6, 9, 11, 14, 16 and 17, are provided below in Table 2.

breadth index (CDBI) of the ethylene copolymer as measured using temperature rising elution fractionation (TREF) methods; B) the weight percent of a higher temperature eluting material (i.e. from 90° C. to 105° C.) observed in TREF profile obtained for the ethylene copolymer; and C) the comonomer distribution profile (i.e. the comonomer incorporation vs. molecular weight) of the ethylene copolymer as measured by gel permeation chromatography with Fourier transform detection (GPC-FTIR).

Examination of the data in Table 2 (compare for example Run No. 6 with Run Nos. 4, 9 and 11) shows that the amount of copolymer (in weight percent) which elutes at 90-105° C. in a TREF analysis is lower when a Type 2 catalyst (treated with Armostat-1800) is used than when a Type 1 catalyst (no catalyst modifier) is used to copolymerize ethylene with 1-hexene (an exception occurred during Run No. 2 using a Type 2 catalyst treated with Atmer-163 where the amount of copolymer (in weight percent) which eluted at 90-105° C. in a TREF analysis remained largely unchanged). These results indicate that inclusion of the catalyst modifier in the polymerization catalyst improves short chain branching (i.e. comonomer) homogeneity. This fact is further evidenced by the

TABLE 2

Polymer Properties

| | Poly. Run No. | | | | | | | |
|---|---|---|---|---|---|---|---|---|
| | 6 | 14 | 2 | 4 | 9 | 11 | 16 | 17 |
| Catalyst | Type 1a | Type 1a | Type 2a | Type 2b | Type 2c | Type 2d | Type 1b | Type 2e |
| Catalyst Modifier in Catalyst | none | none | 1.5 wt % Atmer-163 | 1.5 wt % Armostat-1800 | 2.5 wt % Armostat-1800 | 3.5 wt % Armostat-1800 | none | 2.5 wt % Armostat-1800 |
| Catalyst Modifier fed to Reactor | none | 25 ppm Atmer-163 | none | none | none | none | none | none |
| Density (g/cc) | 0.9182 | 0.9174 | 0.9189 | 0.9180 | 0.9186 | 0.9185 | 0.923 | 0.92 |
| $I_2$ (g/10 min) | 1.01 | 1.03 | 0.89 | 1.03 | 0.90 | 0.93 | 0.6 | 0.54 |
| $I_{10}/I_2$ | 5.78 | 5.63 | 5.76 | 5.64 | 5.64 | 5.66 | 9.55 | 10.6 |
| $I_{21}/I_2$ | 16.3 | 15.9 | 16.7 | 15.8 | 14.1 | 16.1 | 34.1 | 43.5 |
| CDBI (wt %) | 50.2 | 58.2 | 55.2 | 57.9 | 61.4 | 58.1 | 46 | 47.2 |
| TREF (90-105° C., wt %) | 20.4 | 15.3 | 20.9 | 16.7 | 15.4 | 17.0 | 25 | 20 |
| Mn | 52879 | 55077 | 50825 | 47455 | 53940 | 57167 | 23637 | 25053 |
| Mw | 103750 | 104231 | 109275 | 100157 | 106495 | 106771 | 114502 | 120821 |
| Mz | 177076 | 179401 | 205446 | 164387 | 177080 | 174086 | 330614 | 372081 |
| Mw/Mn | 1.96 | 1.89 | 2.15 | 2.11 | 1.97 | 1.87 | 4.84 | 4.82 |
| SCB/1000 C's | 10.4 | 10.9 | 9.6 | 10.1 | 10.0 | 10.3 | 10.9 | 13.3 |
| mole % of C6 | 2.1 | 2.2 | 1.9 | 2.0 | 2.0 | 2.1 | 2.2 | 2.7 |
| wt % of C6 | 6.00 | 6.20 | 5.5 | 5.80 | 5.70 | 5.90 | 6.3 | 7.6 |
| Comonomer | 1-hexene | 1-hexene | 1-hexane | 1-hexane | 1-hexene | 1-hexene | 1-hexene | 1-hexene |
| Comonomer Profile (GPC-FTIR) | normal | flat | reversed | reversed | reversed | partially reversed | slightly reversed | highly reversed |
| Peak Melting Temperature (° C.) | 118.5 | 117.0 | 119.0 | 117.6 | 117.3 | 117.3 | 107.5/121.4 | 121.1 |
| % Crystallinity | 44.2 | 44.5 | 45.3 | 47.4 | 44.5 | 44.6 | 47.4 | 44.4 |
| Hexane Extractables (wt %) | 0.21 | 0.19 | 0.22 | 0.22 | 0.27 | 0.26 | 0.52 | 0.72 |

The data in Table 2 shows that the "composition distribution" may be different for copolymers made with a Type 2 catalyst relative to copolymers made with a Type 1 catalyst. Indices which characterize changes in "composition distribution" of the ethylene copolymer include changes to one or more of the following: A) the composition distribution increase in CDBI observed with all the Type 2 catalysts tested. Comparison of Run No. 6 with Run Nos. 2, 4, 9 and 11 in Table 2 shows that, for every case, the CDBI is higher when a Type 2 catalyst is used relative to a Type 1 catalyst. In fact, the CDBI is increased by at least 5% in each case and more than 10% for the copolymer obtained in Run No. 9. The comonomer distribution profile is also changed when a catalyst modifier is present in the polymerization catalyst. When a Type 2 catalyst is employed, the amount of comonomer incorporation at higher molecular weights relative to lower molecular weights (as measured by GPC-FTIR) is higher than the amount of comonomer incorporation at higher molecular weights relative to lower molecular weights when a Type 1 catalyst is used (Table 2 shows that the comonomer distribution changes from a normal profile to a flat, reversed or partially reversed profile, or from a slightly reversed profile to a highly reversed profile, when a catalyst modifier is present in the polymerization catalyst). Increasing the amount of comonomer incorporation at higher molecular weights may improve polymer end use properties such as dart impact, puncture resistance, optical properties, and hot tack or seal performance.

Finally we note that inclusion of a catalyst modifier in the polymerization catalyst improved the gel properties of cast film made from ethylene copolymers obtained with such catalysts (i.e. Type 2 Catalysts). The gel properties of copolymers isolated from selected polymerization runs are provided below in Table 3.

TABLE 3

Gels in Cast Film

| Poly. Run No. | Catalyst Modifier in Catalyst | Catalyst Modifier fed to Reactor | OCS Gel Count (ppm) |
|---|---|---|---|
| 5 | none | None | 83 |
| 6 | none | None | 141 |
| 7 | 1.5 wt % Armostat-1800 | None | 9 |
| 9 | 2.5 wt % Armostat-1800 | None | 6 |
| 11 | 3.5 wt % Armostat-1800 | None | 7 |
| 14 | none | 25 ppm Atmer-163 | 13 |

Table 3 shows that use of a Type 1 Catalyst (no catalyst modifier) gives copolymer product which when cast into film has high gels counts (83 and 141 for baseline runs 5 and 6) while use of a Type 2 Catalyst (includes a catalyst modifier) gives copolymer product which has a gel count of below 10 when cast into film.

The Effect of the Order of Addition of Catalyst Components

In the next set of examples, the order of addition of catalyst components to an inert support was changed to examine whether there was any effect in terms of catalyst flowability, catalyst polymerization performance, and the resulting polymer architecture. Polymerization catalysts which were modified with Armostat-1800™ and based on either the $(1,2\text{-}(n\text{-propyl})(C_6F_5)Cp)Ti(N=P(t\text{-Bu})_3)Cl_2$ phosphinimine catalyst compound or the $(1\text{-}C_6F_5CH_2\text{—Indenyl})((t\text{-Bu})_3P=N)TiCl_2$ phosphinimine catalyst compound were examined. Polymerization catalysts based on $1,2\text{-}(n\text{-propyl})(C_6F_5)Cp)Ti(N=P(t\text{-Bu})_3)Cl_2$ are coded A1-A5. Polymerization catalysts based on $(1\text{-}C_6F_5CH_2\text{—Indenyl})((t\text{-Bu})_3P=N)TiCl_2$ are coded B1-B3.

Catalyst A1 (Standard Order of Addition of a Catalyst Modifier). In a glovebox, into a 3 L, three-neck round bottom flask equipped with an overhead stirrer was added 490 mL toluene. While the solvent was stirred, 122.5 g of dehydrated silica was added. Next, 233.8 g of a methylaluminoxane (MAO) in toluene solution containing 4.5 wt % Al was added into the flask by cannula over a period of 10 minutes while stirring was maintained. The MAO solution container was rinsed three times with 25 mL of toluene and the rinsings were added into the flask. The slurry was stirred for 2 hours at room temperature. A solution of 2.28 g of $(1,2\text{-}(n\text{-propyl})(C_6F_5)Cp)Ti(N=P(t\text{-Bu})_3)Cl_2$ in 46 mL toluene was then added into the flask over a period of 5 minutes. The slurry was stirred for 2 hours at ambient temperature. Next, 24.84 g of a 16.4 wt % Armostat-1800/toluene solution was added into the flask over a period of 5 minutes. The catalyst modifying agent solution container was rinsed with toluene (3×5 mL), and the rinsings were added in the flask. The slurry was further stirred at ambient temperature for 30 minutes. The catalyst slurry was poured into a fritted funnel, which was fitted onto a filter flask, and vacuum applied to the filter flask to separate the reaction solvent. Next, 225 mL of pentane was added to the filter cake and stirred with spatula to obtain a well dispersed slurry. Reduced pressure was then applied to the filter flask to remove the wash solvent. A second pentane wash was done and vacuum applied to remove solvent until the filter cake appeared to be dry. The filter cake was then transferred to a 2 L round-bottomed flask and the catalyst was dried by applying reduced pressure to the flask until <250 mTorr was obtained.

Catalyst A2 (Reverse Order of Addition of a Catalyst Modifier).

In a glovebox, into a 3 L, three-neck round bottom flask equipped with an overhead stirrer was added 327 mL toluene. While the solvent was stirred, 81.7 g dehydrated silica was added. Next, 16.6 g of a 16.4 wt % Armostat-1800/toluene solution was added into the flask over a period of 5 minutes. The catalyst modifying agent solution container was rinsed with toluene (3×5 mL), and the rinsings were added in the flask. The slurry was further stirred at ambient temperature for 30 minutes. Next, 155.9 g of a MAO in toluene solution containing 4.5 wt % Al was added into the flask by cannula over a period of 10 minutes while stirring was maintained. The MAO solution container was rinsed three times, each with 25 mL toluene and the rinsings were added into the flask. The slurry was stirred for 2 hours at room temperature. A solution of 1.52 g of $(1,2\text{-}(n\text{-propyl})(C_6F_5)Cp)Ti(N=P(t\text{-Bu})_3)Cl_2$ dissolved in 30 mL toluene was then added into the flask over a period of 5 minutes. The slurry was stirred for 2 hours at ambient temperature. The catalyst slurry was poured into a fritted funnel, which was fitted onto a filter flask, and vacuum was applied to the filter flask to separate the reaction solvent. 150 mL pentane was added to the filter cake and stirred with spatula to obtain a well dispersed slurry. Reduced pressure was then applied to the filter flask to remove wash solvent. A second pentane wash was done and vacuum was applied to remove solvent until the filter cake appears to be dry. The filter cake was then transferred to a 2 L round-bottomed flask and the catalyst was dried by applying reduced pressure to the flask until 350 mTorr was obtained.

Catalyst A3 (Reverse Order of Addition of a Catalyst Modifier-Repeat). In a 3 L, three-neck round bottom flask equipped with an overhead stirrer was added toluene (330 mL). While the stirrer was maintained at 200 rpm, dehydrated silica (76.069 g) was added. A 15 wt % Armostat-1800 in toluene solution (18.106 g) was added into the flask over a period of 3 minutes. The container was rinsed with toluene (2×5 mL), and the rinsings were added to the flask. The slurry was further stirred at ambient temperature for 30 minutes. A 10 wt % MAO in toluene solution (195.625 g) was added into the flask by cannula over a period of 13 minutes while stirring was maintained. The MAO solution container was rinsed with toluene (2×25 mL), and the rinsings were added to the flask. The slurry was stirred for 2 hours at room temperature. The phosphinimine catalyst compound (1,2-(n-propyl)($C_6F_5$)Cp)Ti(N=P(t-Bu)$_3$)Cl$_2$ (1.765 g) was then added into the flask in solid form over a period of 4 minutes. The slurry was stirred for 2 hours at ambient temperature. The catalyst slurry was poured into a fritted funnel, which was fitted onto a filter flask, and reduced pressure applied to the filter flask to separate the reaction solvent. Toluene (150 mL) was added to the filter cake and stirred with a spatula to obtain a well-dispersed slurry. Reduced pressure was then applied to the filter flask to remove the wash solvent. Pentane (150 mL) was added to the filter cake and stirred with spatula to obtain a well dispersed slurry. Reduced pressure was then applied to the filter flask to remove wash solvent. A second pentane wash was done and reduced pressure applied to remove solvent until the filter cake appeared to be dry. The filter cake was then transferred to a 2 L round-bottomed flask and the catalyst was dried by applying reduced pressure to the flask until 350 mTorr was obtained.

Catalyst A4 (Semi-Reversed Order of Addition of a Catalyst Modifier). To a 3 L, three-neck round bottom flask equipped with an overhead stirrer was added toluene (330 mL). While the stirrer was maintained at 200 rpm, dehydrated silica (76.08 g) was added. A 10 wt % MAO in toluene solution (195.62 g) was added into the flask by cannula over a period of 13 minutes while stirring was maintained. The MAO solution container was rinsed with toluene (2×25 mL), and the rinsings were added into the flask. The slurry was stirred for 2 hours at room temperature. A 15 wt % Armostat-1800 in toluene solution (18.1 g) was added into the flask over a period of 3 minutes. The container was rinsed with toluene (2×5 mL), and the rinsings were added in the flask. The slurry was further stirred at ambient temperature for 30 minutes. The phosphinimine catalyst compound (1,2-(n-propyl)($C_6F_5$)Cp)Ti(N=P(t-Bu)$_3$)Cl$_2$ (1.76 g) was then added into the flask in solid form over a period of 5 minutes. The slurry was stirred for 2 hours at ambient temperature. The catalyst slurry was poured into a fritted funnel, which was fitted onto a filter flask, and reduced pressure applied to the filter flask to separate the reaction solvent. Toluene (150 mL) was added to the filter cake and stirred with a spatula to obtain a well dispersed slurry. Reduced pressure was then applied to the filter flask to remove the wash solvent. Pentane (150 mL) was added to the filter cake and stirred with spatula to obtain a well dispersed slurry. Reduced pressure was then applied to the filter flask to remove wash solvent. A second pentane wash was done and reduced pressure applied to remove solvent until the filter cake appeared to be dry. The filter cake was then transferred to a 2 L round-bottomed flask and the catalyst was dried by applying reduced pressure to the flask until 450 mTorr was obtained.

Catalyst A5 (Split Addition of a Catalyst Modifier: 50 Wt % before MAO and 50 Wt % after the Phosphinimine Catalyst Compound). To a 3 L, three-neck round bottom flask equipped with an overhead stirrer was added toluene (330 mL). While the stirrer was maintained at 200 rpm, dehydrated silica (76.018 g) was added. A 15 wt % Armostat-1800 in toluene solution (9.056 g) was added into the flask over a period of 2 minutes. The container was rinsed with toluene (2×3 mL), and the rinsings were added to the flask. The slurry was further stirred at ambient temperature for 30 minutes. A 10 wt % MAO in toluene solution (204.126 g) was added into the flask by cannula over a period of 15 minutes while stirring was maintained. The MAO solution container was rinsed with toluene (2×25 mL), and the rinsings were added into the flask. The slurry was stirred for 2 hours at room temperature. The phosphinimine catalyst compound (1,2-(n-propyl)($C_6F_5$)Cp)Ti(N=P(t-Bu)$_3$)Cl$_2$ (1.765 g) was then added to the flask in solid form over a period of 4 minutes. The slurry was stirred for 2 hours at ambient temperature. A 15 wt % Armostat-1800 in toluene solution (9.05 g) was added into the flask over a period of 1 minute. The container was rinsed with toluene (2×3 mL), and the rinsings were added to the flask. The slurry was further stirred at ambient temperature for 30 minutes. The catalyst slurry was poured into a fritted funnel, which was fitted onto a filter flask, and reduced pressure applied to the filter flask to separate the reaction solvent. Toluene (150 mL) was added to the filter cake and stirred with a spatula to obtain a well dispersed slurry. Reduced pressure was then applied to the filter flask to remove the wash solvent. Pentane (150 mL) was added to the filter cake and stirred with spatula to obtain a well dispersed slurry. Reduced pressure was then applied to the filter flask to remove wash solvent. A second pentane wash was done and reduced pressure applied to remove solvent until the filter cake appeared to be dry. The filter cake was then transferred to a 2 L round-bottomed flask and the catalyst was dried by applying reduced pressure to the flask until 350 mTorr was obtained.

Catalyst B1 (Standard Order of Addition of a Catalyst Modifier). In a glovebox, into a 5 L, three-neck round bottom flask equipped with an overhead stirrer was added 1.7 L toluene. While the solvent was stirred, 381.9 g dehydrated silica was added. Next, 1049.3 g of a MAO in toluene solution containing 4.5 wt % Al was added into the flask by cannula over a period of 55 minutes while stirring was maintained. The MAO solution container was rinsed three times, each with 25 mL toluene and the rinsings were added to the flask. The slurry was stirred for 2 hours at room temperature. A solution of 7.88 g (1-$C_6F_5CH_2$—Indenyl)((t-Bu)$_3$P=N)TiCl$_2$ in 600 mL toluene was then added into the flask over a period of 25 minutes. The slurry was stirred for 2 hours at ambient temperature. Next, 67.77 g of a 18.55 wt % Armostat-1800/toluene solution was added to the flask over a period of 15 minutes. The catalyst modifying agent solution container was rinsed with toluene (3×25 mL), and the rinsings were added to the flask. The slurry was further stirred at ambient temperature for 30 minutes. The catalyst slurry was poured into a fritted funnel, which was fitted onto a filter flask, and vacuum was applied to the filter flask to separate the reaction solvent. Next, 2000 mL of pentane was added to the filter cake and stirred with spatula to obtain a well dispersed slurry. Reduced pressure was then applied to the filter flask to remove wash solvent. The filter cake was then transferred to a 3 L round-bottomed flask and the catalyst was dried by applying reduced pressure to the flask until 450 mTorr was obtained.

Catalyst B2 (Reverse Order of Addition of a Catalyst Modifier). In a glovebox, into a 3 L, three-neck round bottom flask equipped with an overhead stirrer was added 327 mL toluene. While the solvent was stirred, 81.8 g dehydrated silica was added. Next, 16.8 g of a 15.0 wt % Armostat-1800/toluene solution was added to the flask over a period of 1 minute. The catalyst modifying agent solution container was rinsed with toluene (3×5 mL), and the rinsings were added to the flask. The slurry was further stirred at ambient temperature for 30 minutes. Next, 155.9 g of a MAO in toluene solution containing 4.5 wt % Al was added to the flask by cannula over a period of 10 minutes while stirring was maintained. The MAO solution container was rinsed three times with toluene and the rinsings were added into the flask. The slurry was stirred for 2 hours at room temperature. A solution of 1.58 g $(1-C_6F_5CH_2$—Indenyl$)((t-Bu)_3P$=$N)TiCl_2$ dissolved in 32 mL of toluene was then added into the flask over a period of 3 minutes. The slurry was stirred for 2 hours at ambient temperature. The catalyst slurry was poured into a fritted funnel, which was fitted onto a filter flask, and vacuum applied to the filter flask to separate the reaction solvent. Next, 150 mL of pentane was added to the filter cake and stirred with spatula to obtain a well dispersed slurry. Reduced pressure was then applied to the filter flask to remove wash solvent. A second pentane wash was done and vacuum applied to remove solvent until the filter cake appeared to be dry. The filter cake was then transferred to a 2 L round-bottomed flask and the catalyst was dried by applying reduced pressure to the flask until 350 mTorr was obtained.

Catalyst B3 (Reverse Order of Addition of a Catalyst Modifier-Repeat). In a glovebox, into a 3 L, three-neck round bottom flask equipped with an overhead stirrer was added 309 mL toluene. While the solvent was stirred, 77.3 g dehydrated silica was added. 13.6 g of a 18.55 wt % Armostat-1800/toluene solution was added into the flask over a period of 5 minutes. The catalyst modifying agent solution container was rinsed with toluene (3×5 mL), and the rinses were added to the flask. The slurry was further stirred at ambient temperature for 30 minutes. 200.9 g of a MAO in toluene solution containing 4.5 wt % Al was added into the flask by cannula over a period of 6 minutes while stirring was maintained. The MAO solution container was rinsed three times, each with 25 mL toluene and the rinses were added into the flask. The slurry was stirred for 2 hours at room temperature. A solution of 1.58 g $(1-C_6F_5CH_2$—Indenyl$)((t-Bu)_3P$=$N)TiCl_2$ complex dissolved in 32 mL toluene was then added into the flask over a period of 4 minutes. The slurry was stirred for 2 hours at ambient temperature. The catalyst slurry was poured into a fritted funnel, which was fitted onto a filter flask, and vacuum applied to the filter flask to separate the reaction solvent. 150 mL toluene was added to the filter cake and stirred with spatula to obtain a well dispersed slurry. Reduced pressure was then applied to the filter flask to remove wash solvent. 150 mL pentane was added to the filter cake and stirred with spatula to obtain a well dispersed slurry. Reduced pressure was then applied to the filter flask to remove wash solvent. A second pentane wash was done and vacuum applied to remove solvent until the filter cake appears to be dry. The filter cake was then transferred to a 2 L round-bottomed flask and the catalyst was dried by applying reduced pressure to the flask until 450 mTorr was obtained.

Polymerization Catalyst Flowability

The polymerization catalyst flow properties were assessed using a "Flodex™" test instrument purchased from Hanson Research Corporation. The Flodex test instrument utilizes a cylinder with a series of replaceable discs placed at the bottom with a hole of differing diameters at the center of each of the different discs. The disc hole is covered with a shutter. After 40 g of the polymerization catalyst is poured into the cylinder, the shutter covering the hole is released allowing the sample to fall through the hole. The diameter in millimeters of the smallest hole through which the polymerization catalyst sample falls through three times out of three attempts is taken as the "Flodex". The smaller the Flodex value, the better the solid polymerization catalyst flows though the Flodex instrument. The lower the Flodex number, the better the solid polymerization catalyst is expected to flow from the catalyst feeder and associated catalyst feed lines to the polymerization reactor.

Table 4 compares the catalyst flowability as measured using a Flodex™ instrument for polymerization catalysts made by adding Armostat-1800 to a silica support after the phosphinimine catalyst and the cocatalyst components have been added (see Catalysts A1 and B1) with polymerization catalysts made by adding the Armostat-1800 to a silica support before the phosphinimine catalyst and the cocatalyst components have been added (see Catalysts A2, A3, B2 and B3).

TABLE 4

| Catalyst | Catalyst Formula | Weight % Armostat-1800 (based on weight of the inert support, phosphinimine catalyst and cocatalyst) | Flodex (mm) |
| --- | --- | --- | --- |
| A1 | $(1,2-(n-propyl)(C_6F_5)Cp)Ti(N$=$P(t-Bu)_3)Cl_2$ | 2.7 | 20-22 |
| A2 | $(1,2-(n-propyl)(C_6F_5)Cp)Ti(N$=$P(t-Bu)_3)Cl_2$ | 2.7 | 9 |
| A3 | $(1,2-(n-propyl)(C_6F_5)Cp)Ti(N$=$P(t-Bu)_3)Cl_2$ | 2.7 | 8 |
| A4 | $(1,2-(n-propyl)(C_6F_5)Cp)Ti(N$=$P(t-Bu)_3)Cl_2$ | 2.7 | 18 |
| A5 | $(1,2-(n-propyl)(C_6F_5)Cp)Ti(N$=$P(t-Bu)_3)Cl_2$ | 2.7 | 20 |
| B1 | $(1-C_6F_5CH_2$-Indenyl$)((t-Bu)_3P$=$N)TiCl_2$ | 2.5 | 16 |
| B2 | $(1-C_6F_5CH_2$-Indenyl$)((t-Bu)_3P$=$N)TiCl_2$ | 2.5 | 8 |
| B3 | $(1-C_6F_5CH_2$-Indenyl$)((t-Bu)_3P$=$N)TiCl_2$ | 2.5 | 4 |

Continuous ethylene/1-hexene gas phase copolymerization experiments using catalysts A1-A5 and B1-B3, were conducted in a 56.4 liter technical scale reactor (TSR) in continuous gas phase operation (for an example of a TSR reactor set up see Eur. Pat. Appl. No. 659,773A1). Ethylene polymerizations were run at 80-85° C. and a total operating pressure of 300 pounds per square inch gauge (psig). Gas phase compositions for ethylene, 1-hexene and hydrogen were controlled via closed-loop process control to values of 35-65, 0.5-2.1 and 0.018-0.055 mole percent, respectively. Nitrogen constituted the remainder of the gas phase mixture. Typical production rate for these conditions was 2.0 to 3.0 kg of polyethylene per hour. Triethylaluminum (TEAL) may be fed to the reactor continuously, as a 0.25 wt % solution in hexane (solution fed at about 10 mL/hr) in order to scavenge impurities or experiments can be carried out without a scavenger. The residence time in the reactor is held at 1.5-3.0 hr, with a production rate range from 1.5-2.8 kg/hr. Selected polymerization conditions and polymer data are provided in Tables 5 and 6 respectively (note: C2=ethylene; C6=1-hexene; H2=hydrogen).

TABLE 5

| Catalyst | Production Rate (kg/hour) | Residence Time, (hours) | Temp. (°C.) | Ethylene in Reactor, (mol %) | C6/C2 Molar Flow | C6/C2 by GC | H2/C2 Molar Flow | Bulk Density (lb/ft$^3$) |
|---|---|---|---|---|---|---|---|---|
| A1 | 2.50 | 1.60 | 85 | 50 | 0.0215 | — | 0.0003 | — |
| A2 | 2.57 | 1.55 | 85 | 50 | 0.0212 | 0.0215 | 0.0003 | — |
| A3 | 2.50 | 1.60 | 85 | 50 | 0.0213 | 0.019 | 0.0003 | 24.1 |
| A4 | 2.49 | 1.63 | 85 | 50 | 0.0213 | 0.0226 | 0.0003 | 20.4 |
| A5 | 1.98 | 2.03 | 85 | 50 | 0.0213 | 0.0233 | 0.0003 | 22.1 |
| B1 | 2.39 | 1.91 | 80 | 65 | 0.0236 | 0.0206 | 0.0012 | — |
| B2 | 2.20 | 2.02 | 80 | 50 | 0.0215 | 0.0141 | 0.0011 | 23.9 |
| B3 | 2.50 | 1.80 | 80 | 65 | 0.0200 | 0.0141 | 0.0012 | — |

TABLE 6

| Catalyst | Density (g/cm$^3$) | MI (g/10 min) | Mw/Mn | $I_{21}/I_2$ | CDBI-50 (wt %) | Wt % HD (90-105° C.) | Melt Strength (cN) |
|---|---|---|---|---|---|---|---|
| A1 | 0.9177 | 0.91 | — | — | — | — | — |
| A2 | 0.9172 | 1.11 | 1.89 | 15.4 | 64.2 | 12.9 | 2.43 |
| A3 | 0.917 | 1.33 | 1.87 | 15.6 | 62.9 | 10.4 | 1.94 |
| A4 | 0.9176 | 0.97 | 2.0 | 15.1 | 67.6 | 11.8 | 2.51 |
| A5 | 0.9162 | 1.12 | 1.75 | 15.4 | 68.2 | 11.1 | 2.18 |
| B1 | 0.9206 | 0.86 | 4.62 | 36.7 | 46.4 | 19.2 | 5.04 |
| B2 | 0.9196 | 0.57 | 4.56 | 40.2 | 52 | 18 | — |
| B3 | 0.92 | 0.63 | — | — | — | — | — |

The data in Table 4 shows that when using a reversed order of addition of the catalyst modifier (i.e. adding the catalyst modifier to the support before the phosphinimine catalyst and cocatalyst components), whether the polymerization catalyst be based on either the (1,2-(n-propyl)($C_6F_5$)Cp)Ti(N=P(t-Bu)$_3$)Cl$_2$ or the (1-$C_6F_5CH_2$—Indenyl)((t-Bu)$_3$P=N)TiCl$_2$ phosphinimine catalysts, the flowability of the polymerization catalyst improves considerably as evidenced by the decrease in the Flodex number. Compare for example, the Flodex value for Catalyst A1 with Catalyst A2 or A3. The Flodex drops from about 20 mm to about 9 mm and 8 mm respectively. Also compare the Flodex of Catalyst B1 with Catalyst B2 or B3, where the Flodex value drops from about 16 mm to 8 mm and 4 mm respectively. In addition, the data show, that if the catalyst modifier is added to an inert support (e.g. silica) after the cocatalyst (e.g. MAO), but before the active catalyst compound (a phosphinimine catalyst), then the Flodex remains largely unchanged. Compare Catalyst A1 with Catalyst A4, where the Flodex only drops from about 20 mm to about 18 mm. Finally, if the catalyst modifier is added both before and after the cocatalyst and phosphinimine catalyst components are added to the inert support, the Flodex remains unaffected. Compare Catalyst A1 in which all of the catalyst modifier is added after both the cocatalyst and the phosphinimine catalyst complex, with Catalyst A5 in which the catalyst modifier was split into equal portion additions to the inert support, with half being added before the cocatalyst and phosphinimine complex, and half being added to the inert support after the cocatalyst and phosphinimine catalyst. For A1 and A5 the Flodex value is the same.

Figure 12:
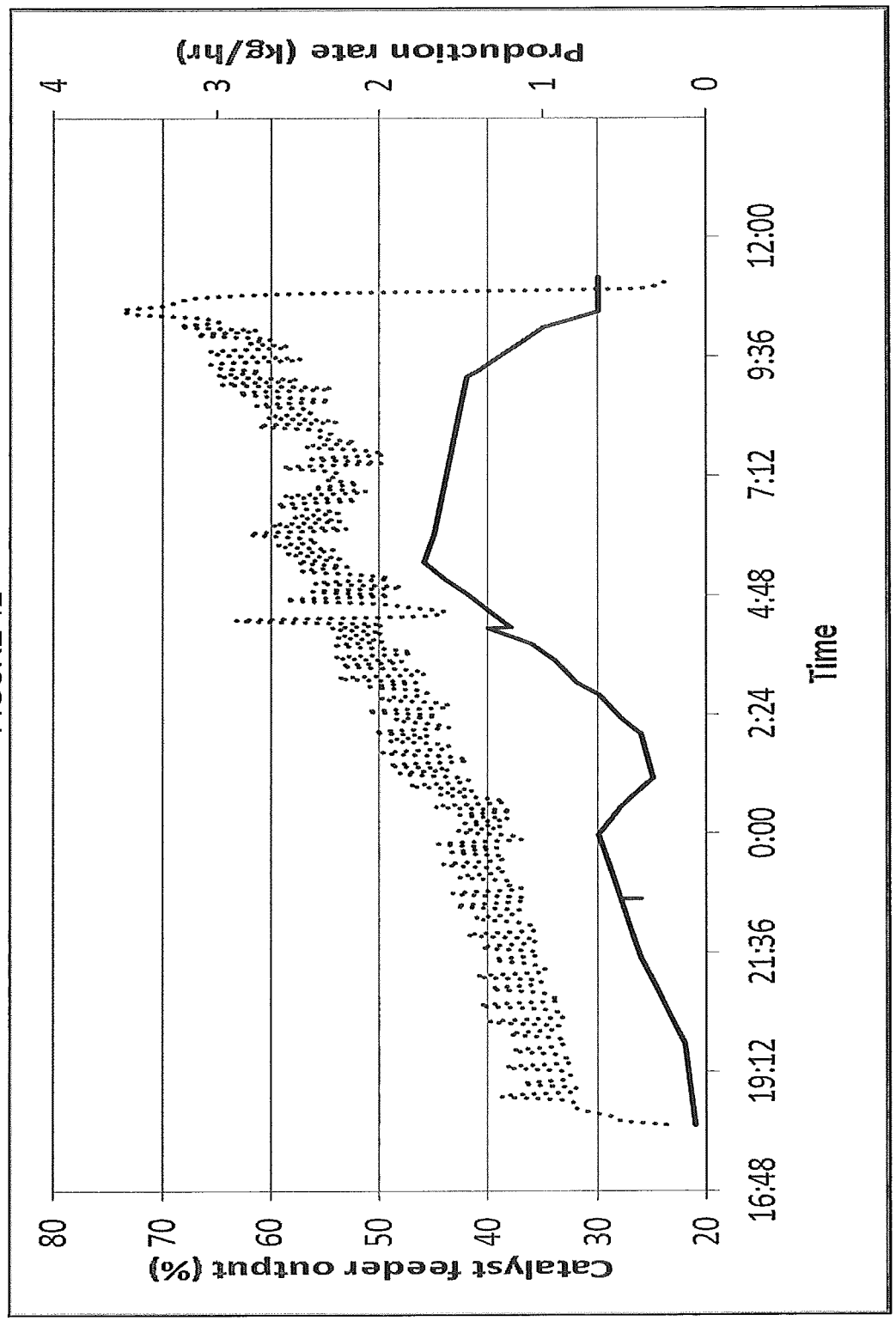
FIG. 12 shows the production rate in kg/hour of polymer and the catalyst feeder output (measured as the percentage of the maximum rotation speed of the variable-speed motor of the catalyst feeder, which corresponds to the rotation speed of the disk in the catalyst feeder) for ethylene/1-hexene copolymerization with catalyst A1.
Figure 13:
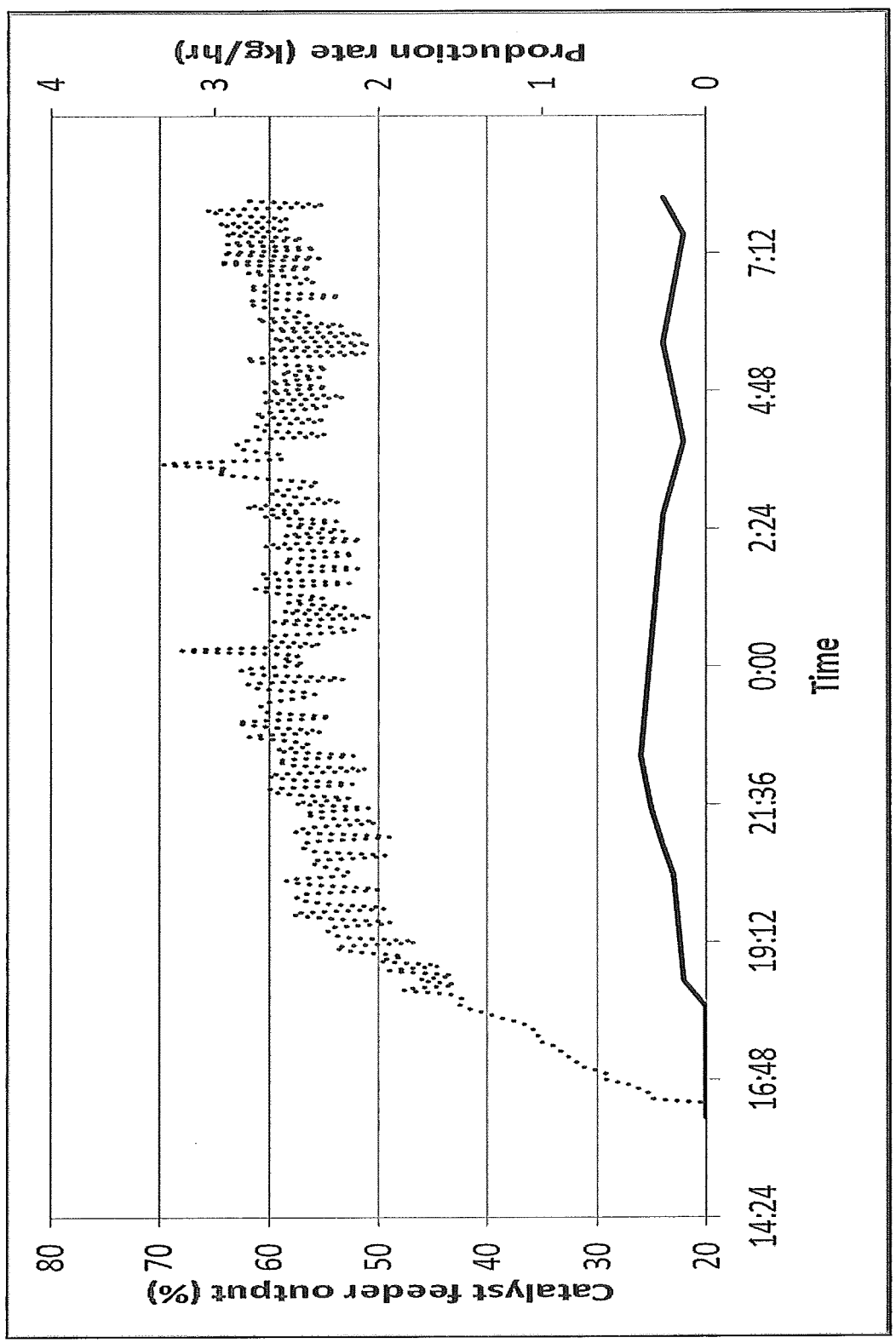
FIG. 13 shows the production rate in kg/hour of polymer and the catalyst feeder output (measured as the percentage of the maximum rotation speed of the variable-speed motor of the catalyst feeder, which corresponds to the rotation speed of the disk in the catalyst feeder) for ethylene/1-hexene copolymerization with catalyst A2.

The reactor operability of polymerization catalysts A1 and A2 is illustrated in FIGS. 12 and 13 respectively. They show plots of the production rate (dotted black line) in kg of polymer/hour vs. time as well as the catalyst feeder output rate (solid black line) in percentage of the maximum rotation speed of the variable-speed motor of the catalyst feeder (which corresponds to the rotation speed of the disk in the catalyst feeder) vs. time. In the TSR scale polymerization, the desired production rate of approximately 2.5 kg/hr is reached by adjusting the catalyst feeder output. If the catalyst flows well to the reactor and shows reasonable activity, the catalyst feeder output does not need to be heavily adjusted to meet target productivity levels. In this sense, the operability of catalyst A2 was found to be better than catalyst A1, because for catalyst A2 the desired production rate was reached relatively quickly with no major adjustments in the catalyst feeder output as shown in FIG. 13. The polymerization ran smoothly and with well controlled reactor temperatures. In contrast, for catalyst A1, the polymerization production rate only took off after several hours and only while major increments in catalyst feeder output were being made. This led to a temperature runaway (not shown in FIG. 12, but indicated by the rapid increase in polymerization production rate toward the end of the run) and the polymerization run had to be aborted. The improved performance of catalyst A2 over catalyst A1 was consistent with the Flodex measurements shown in Table 4. The lower Flodex number associated with Catalyst A2, corresponded to a lower and more steady catalyst feeder output rate at the same polymer production rate as that observed with Catalyst A1 (Compare FIG. 13 with FIG. 12), which in turn indicated better filling efficiency of the catalyst feeder disk holes and better catalyst feeding generally. The catalyst feeder used is similar to that described in U.S. Pat. No. 3,779,712 and U.S. Pat. No. 3,876,602. The catalyst feeder delivers catalyst by aligning a rotating disk with holes to an opening in the catalyst reservoir from which catalyst drops into the holes. The disk rotates further until it aligns with the inlet of an entrainment chamber into which the catalyst drops and is carried away with nitrogen to the reactor. A percentage of the feeder output relates to the speed to which the feeder disk rotates. Higher feeder output equals higher rotation speed and therefore more catalyst being delivered as a function of time. The actual percentage of feeder output set corresponds to a percentage of the maximum rotation speed of the variable-speed motor, which in turn determines the rotation speed of the perforated catalyst feeder disk.

Figure 14:
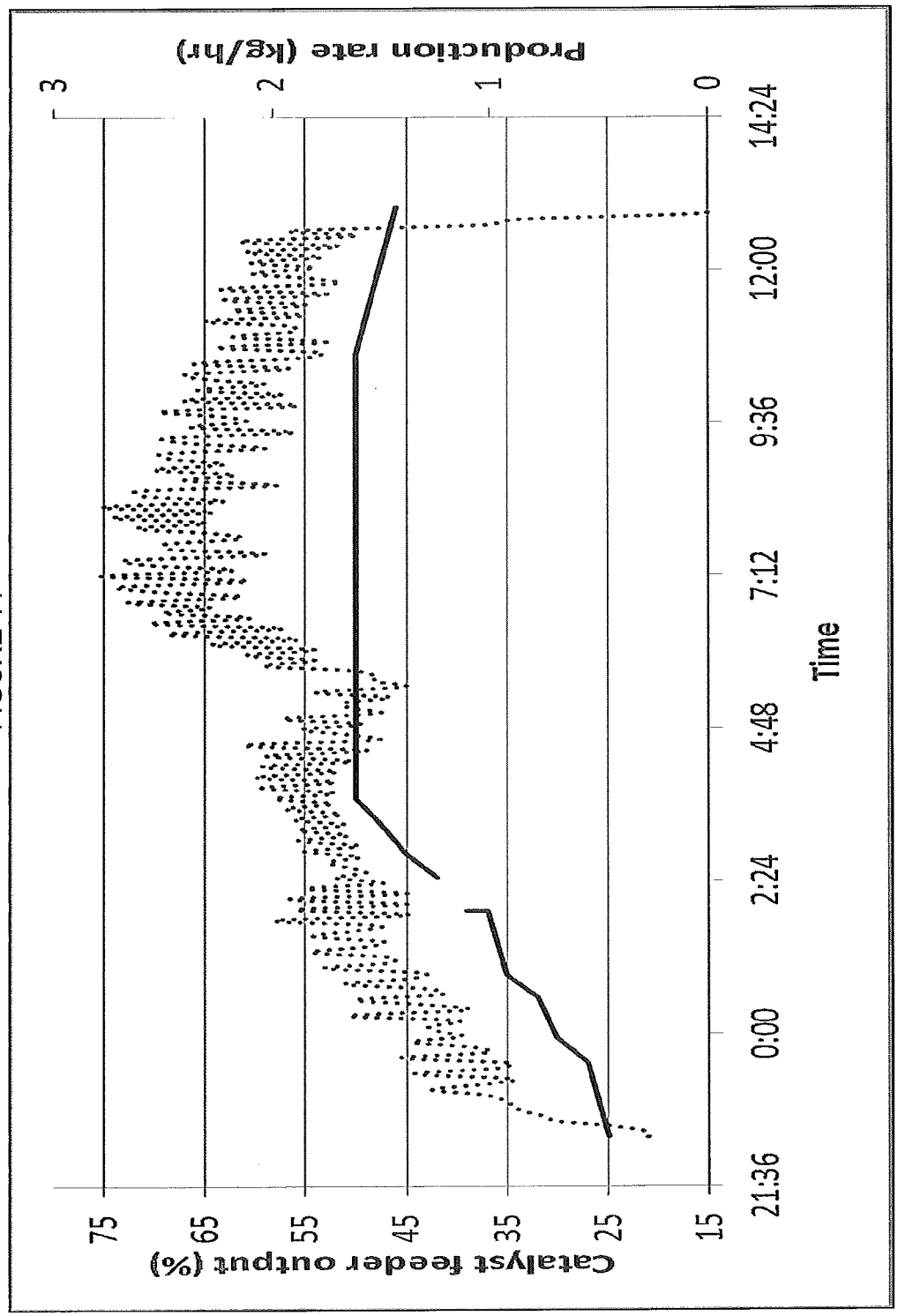
FIG. 14 shows the production rate in kg/hour of polymer and the catalyst feeder output (measured as the percentage of the maximum rotation speed of the variable-speed motor of the catalyst feeder, which corresponds to the rotation speed of the disk in the catalyst feeder) for ethylene/1-hexene copolymerization with catalyst B1.
Figure 15:
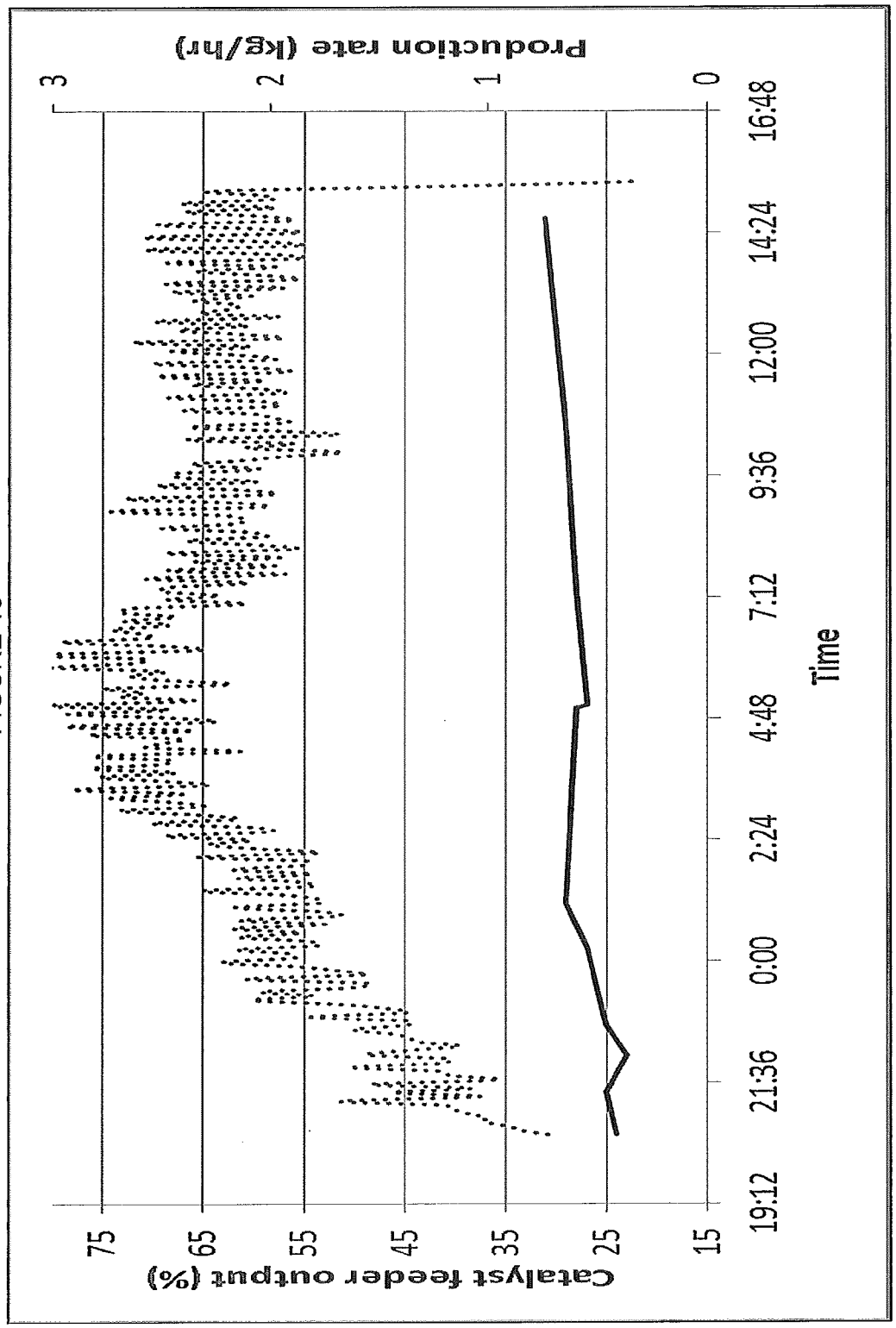
FIG. 15 shows the production rate in kg/hour of polymer and the catalyst feeder output (measured as the percentage of the maximum rotation speed of the variable-speed motor of the catalyst feeder, which corresponds to the rotation speed of the disk in the catalyst feeder) for ethylene/1-hexene copolymerization with catalyst B2.
Figure 16:
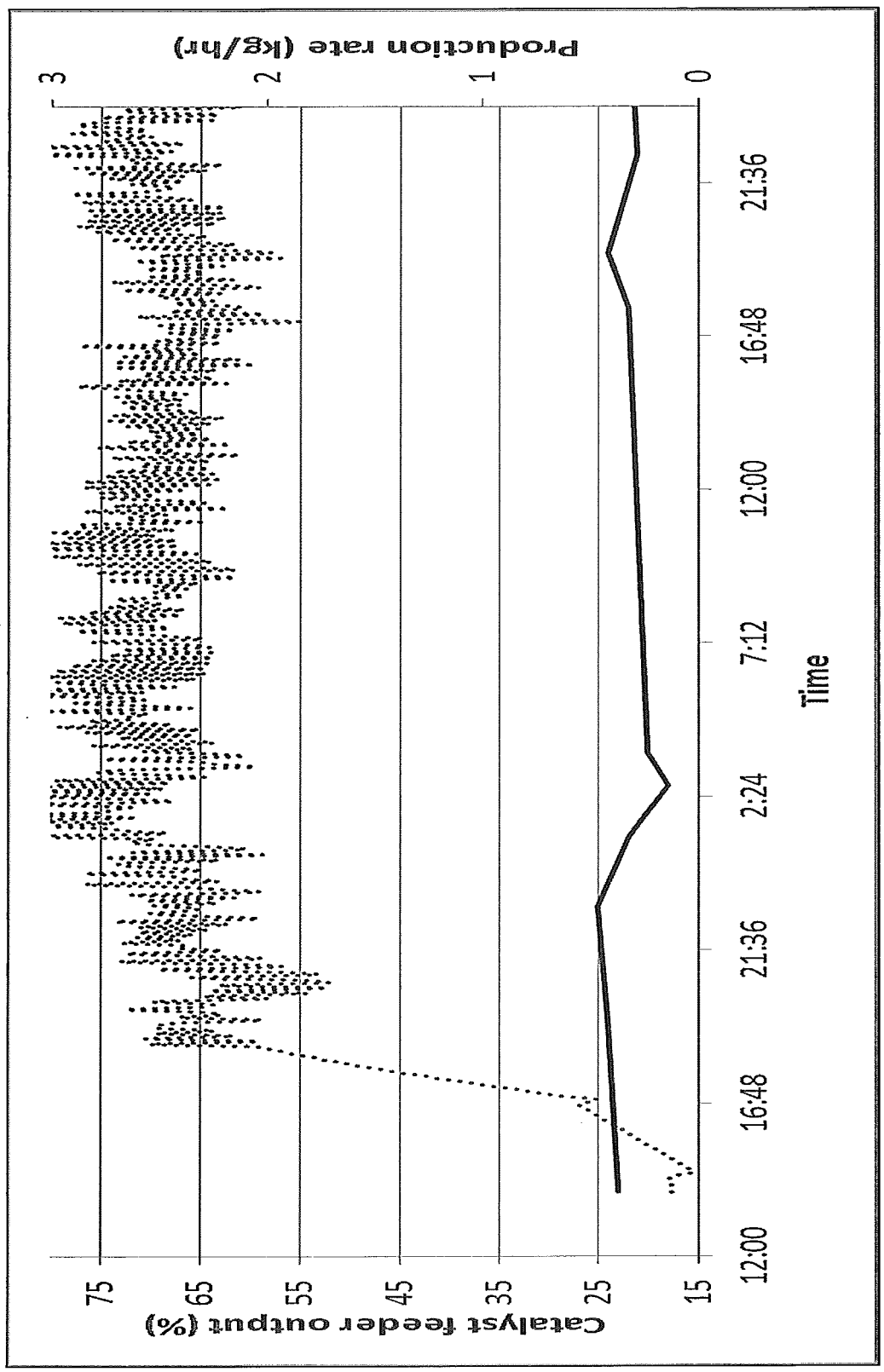
FIG. 16 shows the production rate in kg/hour of polymer and the catalyst feeder output (measured as the percentage of the maximum rotation speed of the variable-speed motor of the catalyst feeder, which corresponds to the rotation speed of the disk in the catalyst feeder) for ethylene/1-hexene copolymerization with catalyst B3.

The reactor operability of polymerization catalysts B1, B2 and B3 is illustrated in FIGS. 14, 15 and 16 respectively. The Figures show plots of the production rate (dotted black line) in kg of polymer/hour vs. time, as well as the catalyst feeder output rate (solid black line) given in percentage of the maximum rotation speed of the variable-speed motor of the catalyst feeder (which corresponds to the rotation speed of the disk in the catalyst feeder) vs. time. As discussed above, in the TSR scale polymerization, the desired production rate of approximately 2.5 kg/hr is reached by adjusting the catalyst feeder output. If the catalyst flows well to the reactor and shows comparable activity, the catalyst feeder output does not need to be heavily adjusted to meet target productivity levels.

For Catalyst B1, the catalyst feeder output was increased to reach a polymer production rate of approximately 2.5 kg/hr, but it was difficult to maintain a constant production rate despite a constant catalyst feeder output (see FIG. 14). This was attributed to erratic catalyst delivery to the reactor.

For Catalysts B2, and B3, the desired polymer production rate of approximately 2.5 kg/hr was more quickly obtained and was more constant while catalyst feeder output was held relatively constant (see FIGS. 15 and 16). This was attributed to smoother catalyst delivery to the reactor. Catalysts B2 and B3 also showed reduced reactor temperature variance and less reactor fouling than catalyst B1. Without wishing to be bound by theory, we speculate that the better reactor performance was due to a more consistent catalyst delivery to the reactor. The differences in the catalyst flowability between catalyst B1 and catalysts B2 and B3 were consistent with the Flodex measurements shown in Table 4. The lower Flodex numbers shown in Table 4 for catalysts B2 and B3, corresponded to lower catalyst feeder output rates in order to achieve the same polymer production rate and catalyst productivity as that obtained with catalyst B1. This supports the notion that for catalyst B2 and B3 there is better filling efficiency of the catalyst feeder disk holes in the catalyst feeder and better catalyst feeding generally.

The above results show that the polymerization catalyst feeding and reactor operability at the TSR scale improved when using a reverse order of addition of the catalyst modifier (i.e. the catalyst modifier is added to a silica support prior to the addition of a phosphinimine catalyst and a cocatalyst). For the polymerization catalysts A2, the flowability of the catalyst to the reactor appeared to be better than for polymerization catalyst A1. For the polymerization catalysts B2 and B3, a similar improvement in catalyst flow to the reactor was observed relative to catalyst B1.

Unexpectedly, both catalyst types A and B prepared with reverse order of catalyst modifier addition produced ethylene copolymers with different characteristics than those made when the standard order of addition of catalyst modifier was used.

Figure 17:
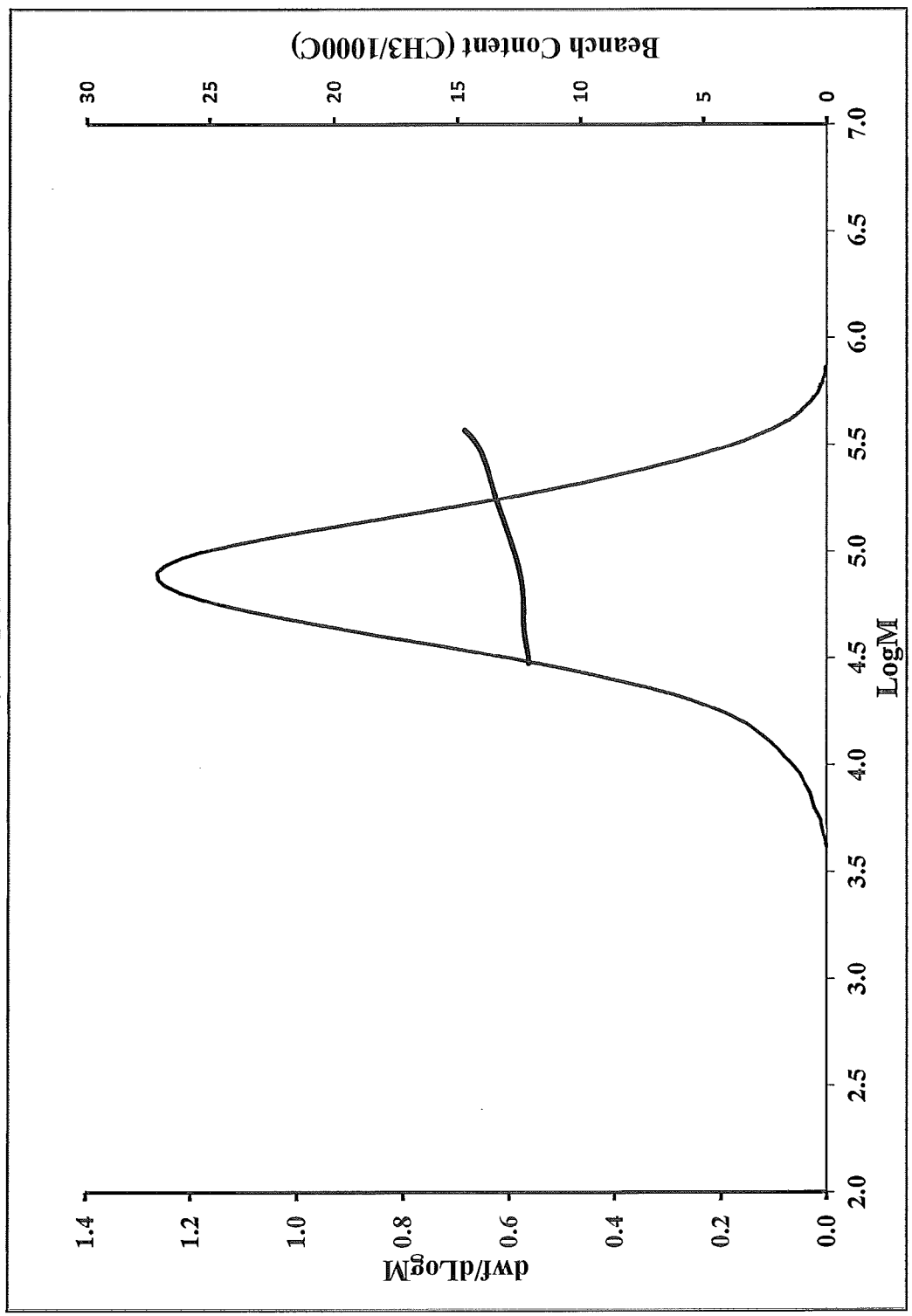
FIG. 17 shows a gel permeation chromatograph with Fourier transform infra-red (GPC-FTIR) detection obtained for an ethylene copolymer made using catalyst A1. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".
Figure 18A:
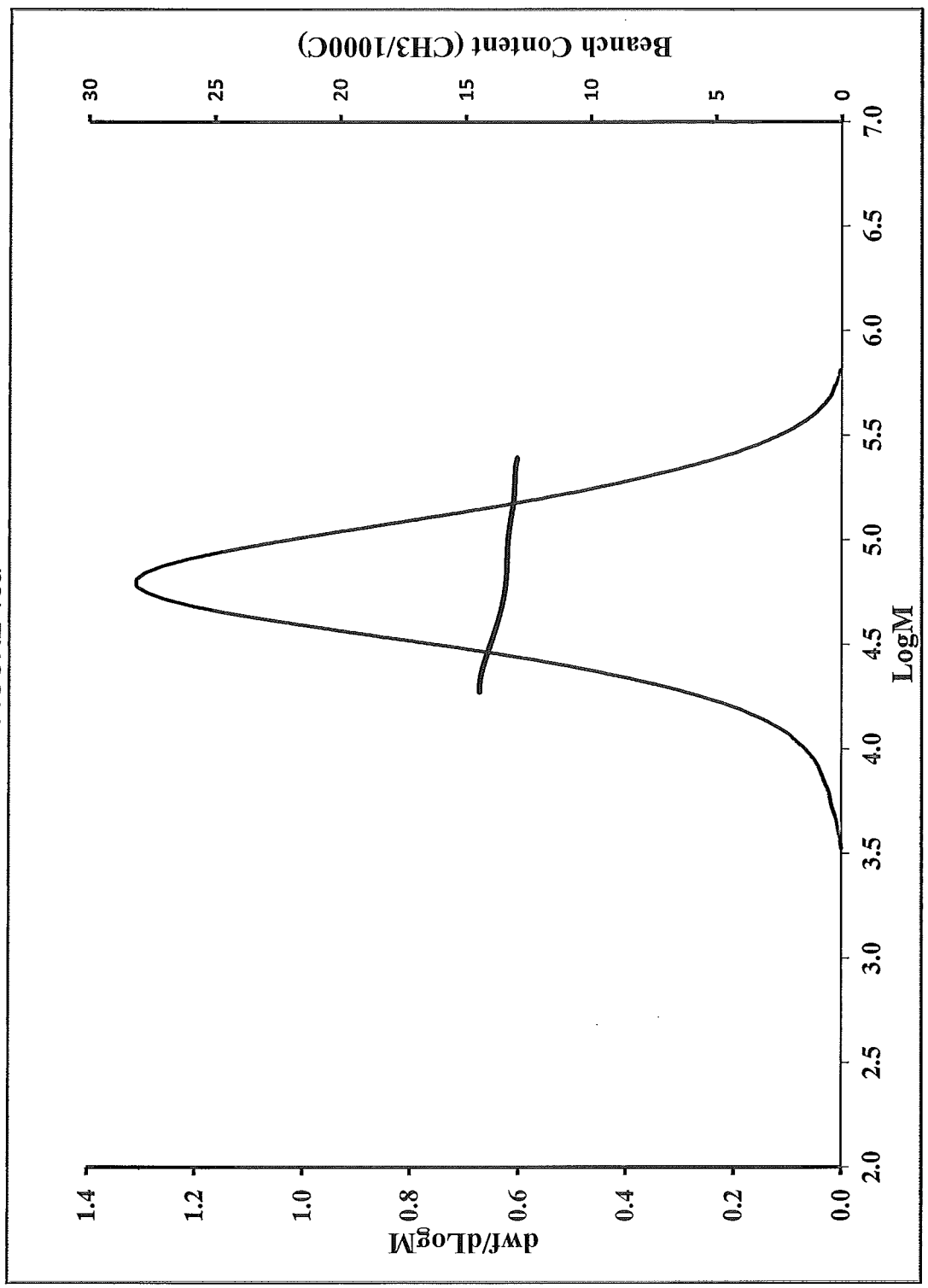
FIG. 18a shows a gel permeation chromatograph with Fourier transform infra-red (GPC-FTIR) detection obtained for an ethylene copolymer made using catalyst A2. The comonomer content, shown as the number of short chain branches per 1000 carbons (y-axis), is given relative to the copolymer molecular weight (x-axis). The slightly downwardly sloping line (from left to right) is the short chain branching (in short chain branches per 1000 carbons atoms) determined by FTIR. As can be seen in the Figure, the number of short chain branches decreases slightly at higher molecular weights, and hence the comonomer incorporation is said to be "normal".
Figure 18B:
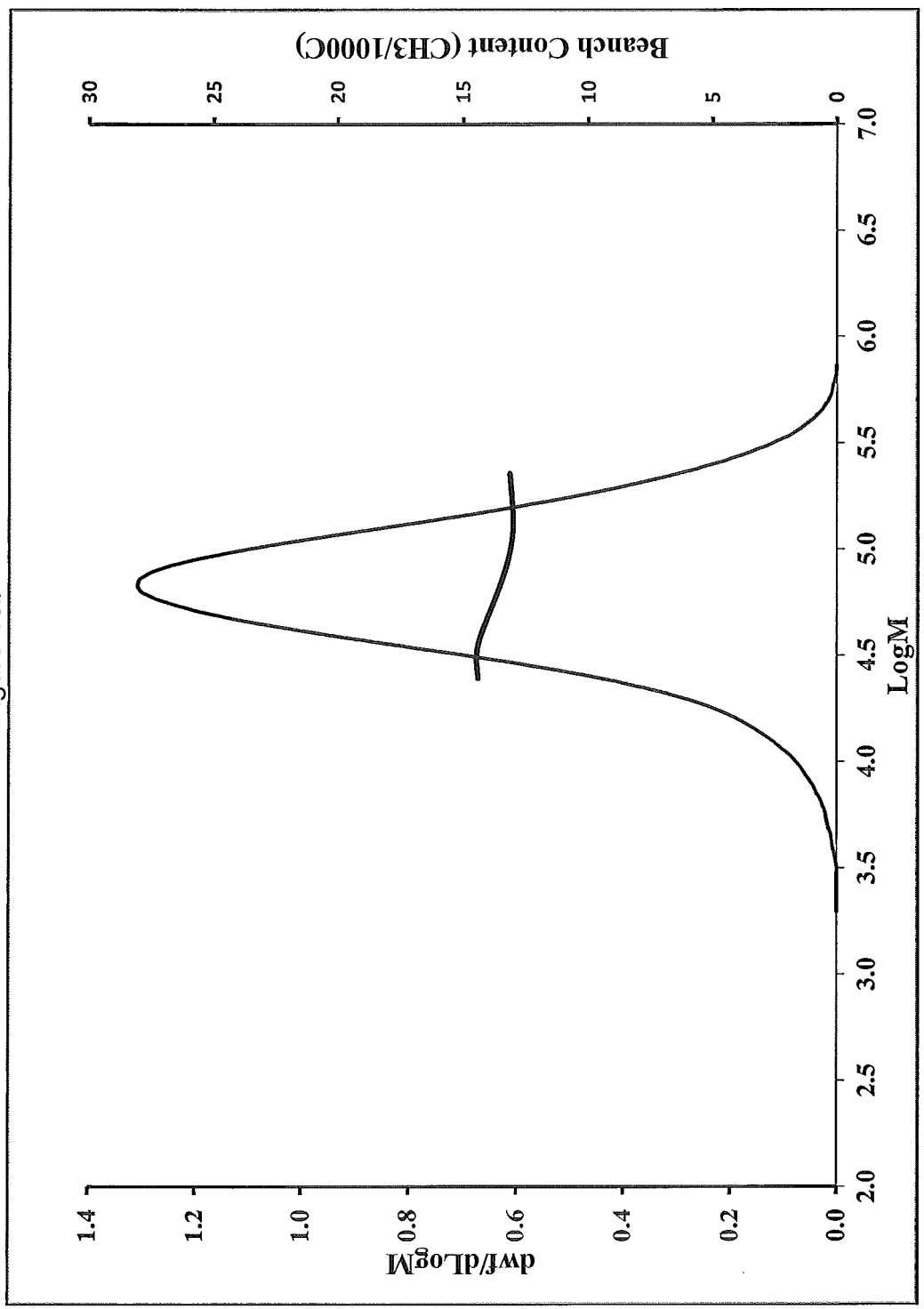
FIG. 18b shows a gel permeation chromatograph with Fourier transform infra-red (GPC-FTIR) detection obtained for an ethylene copolymer made using catalyst A3. The comonomer content, shown as the number of short chain branches per 1000 carbons (y-axis), is given relative to the copolymer molecular weight (x-axis). The slightly downwardly sloping line (from left to right) is the short chain branching (in short chain branches per 1000 carbons atoms) determined by FTIR. As can be seen in the Figure, the number of short chain branches slightly decreases at higher molecular weights, and hence the comonomer incorporation is said to be "normal".

With reference to FIG. 17, it is clear that with polymerization catalyst A1 which is prepared so that the catalyst modifier is added to the inert support last, the GPC-FTIR profile is consistent with a generally reversed comonomer incorporation profile, in which short chain side chain branching increases as the molecular weight of the polymer increases. With reference to FIG. 18a and FIG. 18b, a person skilled in the art will recognize that polymerization catalysts A2, and A3 respectively, which are prepared by adding the catalyst modifier to the support prior to the phosphinimine catalyst and the cocatalyst components, the GPC-FTIR is consistent with a generally flat (or even slightly negative) comonomer incorporation. That is, the short side chain branching stays relatively constant (or decreases slightly) with increasing molecular weight. Hence, a comparison between FIG. 17 and FIGS. 18a/18b, shows that simply by changing the order of addition of the catalyst components, namely by adding the catalyst modifier to the support, before the addition of the phosphinimine catalyst and the cocatalyst components, a different polymer architecture can be obtained.

Figure 19:
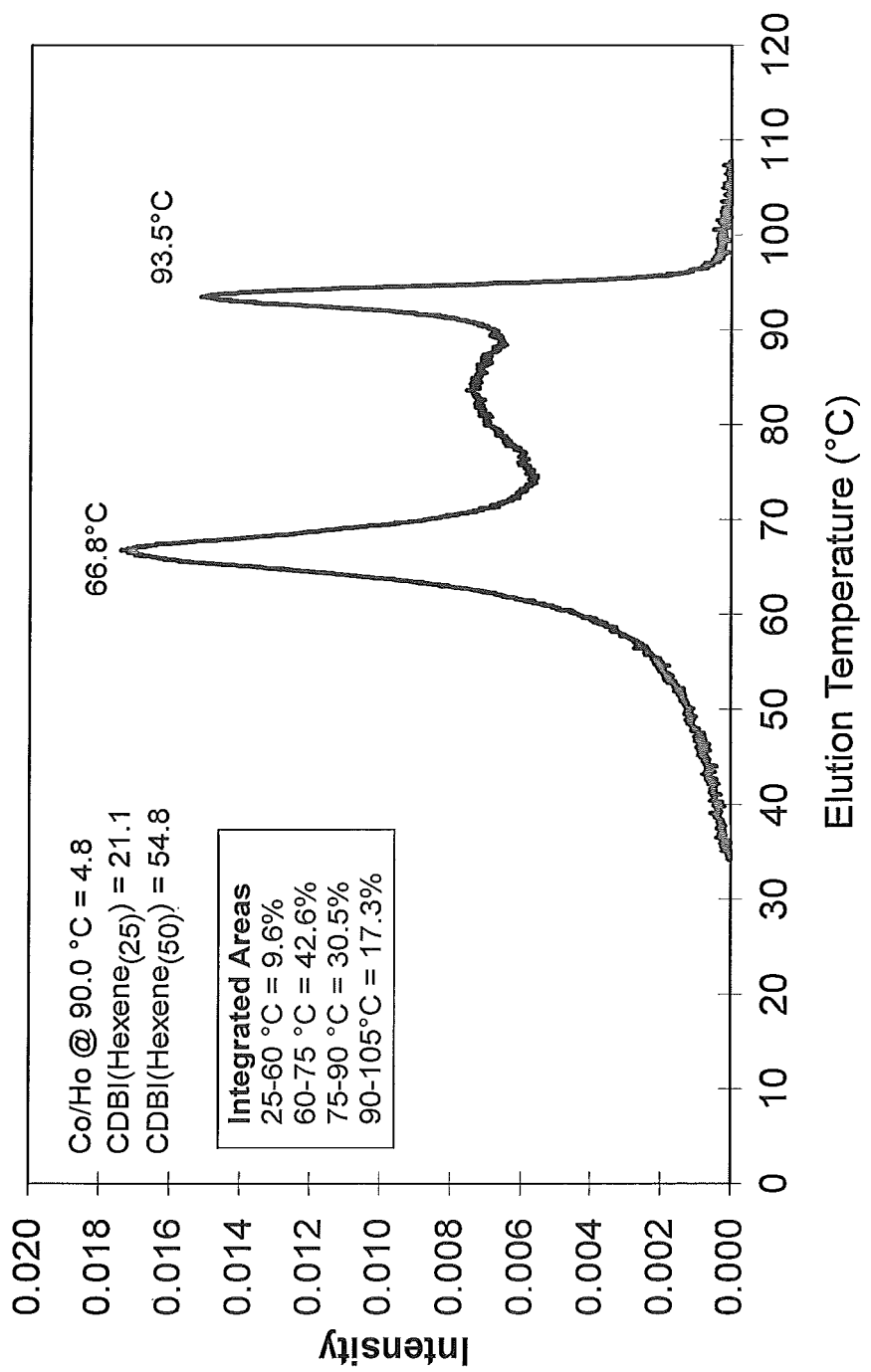
FIG. 19 shows a temperature rising elution fractionation (TREF) analysis and profile of an ethylene copolymer made using catalyst B1.
Figure 20:
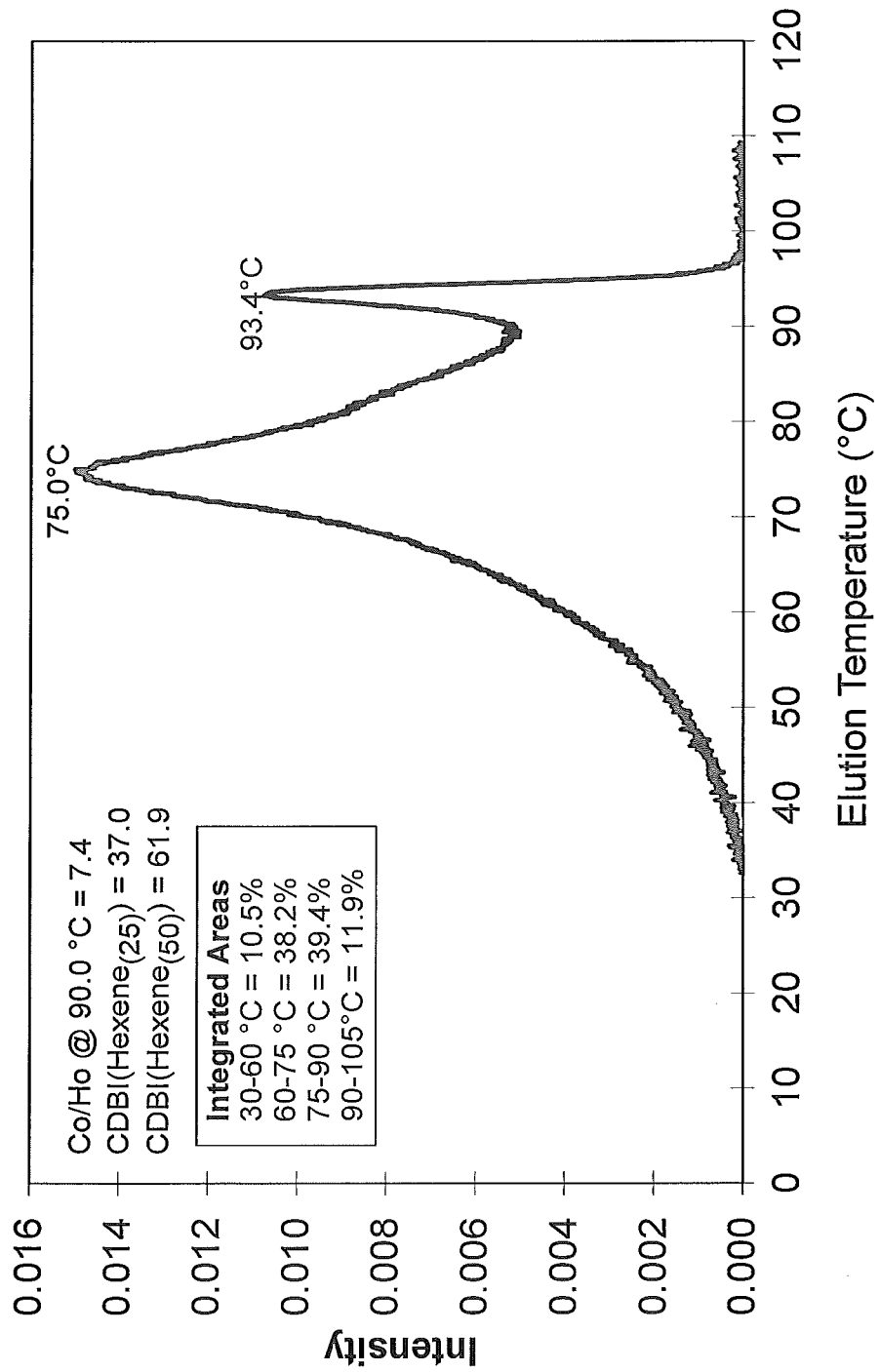
FIG. 20 shows a temperature rising elution fractionation (TREF) analysis and profile of an ethylene copolymer made using catalyst B3.

With reference to FIG. 19, a distinctly trimodal TREF profile is observed when an ethylene copolymer is made with polymerization catalyst B1 which is prepared by adding the catalyst modifier to the support after both the phosphinimine catalyst and the cocatalyst. In contrast, and with reference to FIG. 20, which shows the TREF profile of an ethylene copolymer made using polymerization catalyst B3, which is prepared by adding the catalyst modifier to the support first, before the phosphinimine catalyst and cocatalyst components, two prevailing peak areas are observed. Further, the temperatures at which the lowest elution peak temperature occurs in the TREF profile shifts by close to 10° C. (higher) when using polymerization catalyst B3 instead of polymerization catalyst B1. Comparing the TREF profiles in FIGS. 19 and 20, shows that changing the order in which the catalyst modifier is added to formulate the polymerization catalyst has an effect on the resulting polymer architecture. The results show that different polymers can be obtained, depending on how the polymerization catalyst is synthesized.

What is claimed is:

1. A polymerization process comprising contacting ethylene and at least one alpha olefin with a polymerization catalyst in a gas phase reactor, the polymerization catalyst comprising: i) a phosphinimine catalyst, ii) an inert support, iii) a cocatalyst, and iv) a catalyst modifier; wherein the catalyst modifier is present in from 0.25 to 6.0 weight percent based on the weight of i), ii), and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; and wherein the polymerization catalyst is prepared by adding all of the catalyst modifier to the inert support prior to the addition of the phosphinimine catalyst and prior to the addition of the cocatalyst; wherein the phosphinimine catalyst has the formula:

(1,2-(R*)(Ar—F)Cp)Ti(N=P(t-Bu)$_3$)X$_2$, where R* is a straight chain alkyl group, Ar—F is a perfluorinated phenyl group, a 2,6 fluoro substituted phenyl group, a 2,4,6 fluoro substituted phenyl group, or a 2,3,5,6 fluoro substituted phenyl group, and X is an activatable ligand.

2. The process of claim 1, wherein the catalyst modifier is present in from 0.5 to 4.5 weight percent based on the weight of i), ii) and iii) of the polymerization catalyst.

3. The process of claim 1 wherein the catalyst modifier comprises at least one compound represented by the formula: $R^1N((CH_2)_nOH)((CH_2)_mOH)$ where $R^1$ is a hydrocarbyl group having from 5 to 30 carbon atoms, and n and m are integers from 1 to 20.

4. The process of claim 1 wherein the catalyst modifier comprises at least one compound represented by the formula: $R^1N((CH_2)_nOH)_2$ where $R^1$ is a hydrocarbyl group having from 6 to 30 carbon atoms, and n is independently an integer from 1-20.

5. The process of claim 1 wherein the catalyst modifier comprises at least one compound represented by the formula: $R^1N((CH_2)_nOH)_2$ where $R^1$ is a hydrocarbyl group having from 6 to 30 carbon atoms, and n is 2 or 3.

6. The process of claim 1 wherein the catalyst modifier comprises at least one compound represented by the formula: $R^1N(CH_2CH_2OH)_2$ where $R^1$ is a hydrocarbyl group having from 8 to 22 carbon atoms.

7. The process of claim 1 wherein the catalyst modifier comprises a compound represented by the formula: $C_{18}H_{37}N(CH_2CH_2OH)_2$.

8. The process claim 1 wherein the catalyst modifier comprises compounds represented by the formulas: $C_{13}H_{27}N(CH_2CH_2OH)_2$ and $C_{15}H_{31}N(CH_2CH_2OH)_2$.

9. The process of claim 1 wherein the catalyst modifier is a mixture of compounds represented by the formula: $R^1N(CH_2CH_2OH)_2$ where $R^1$ is a hydrocarbyl group having from 8 to 18 carbon atoms.

10. The process of claim 1 wherein the cocatalyst is selected from ionic activators, alkylaluminoxanes and mixtures thereof.

11. The process of claim 1 wherein the inert support is silica.

12. A polymerization catalyst comprising: i) a phosphinimine catalyst; ii) an inert support; iii) a cocatalyst; and iv) a catalyst modifier; wherein the catalyst modifier is present from 0.25 to 6.0 weight percent based on the weight of i), ii) and iii) of the polymerization catalyst and comprises a compound having the formula: $R^1R^2{}_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; and wherein the polymerization catalyst is prepared by adding all of the catalyst modifier to the inert support prior to the addition of the phosphinimine catalyst and prior to the addition of the cocatalyst; wherein the phosphinimine catalyst has the formula: $(1,2-(R^*)(Ar-F)Cp)Ti(N=P(t-Bu)_3)X_2$, where $R^*$ is a straight chain alkyl group, Ar—F is a perfluorinated phenyl group, a 2,6 fluoro substituted phenyl group, a 2,4,6 fluoro substituted phenyl group, or a 2,3,5,6 fluoro substituted phenyl group, and X is an activatable ligand.

13. The catalyst of claim 12 wherein the catalyst modifier is present in from 1.0 to 4.0 weight percent based on the weight of i), ii) and iii) of the polymerization catalyst.

14. The catalyst of claim 12 wherein the catalyst modifier comprises at least one compound represented by the formula: $R^1N((CH_2)_nOH)((CH_2)_mOH)$ where $R^1$ is a hydrocarbyl group having anywhere from 5 to 30 carbon atoms, and n and m are integers from 1 to 20.

15. The catalyst of claim 12 wherein the catalyst modifier comprises at least one compound represented by the formula: $R^1N((CH_2)_nOH)_2$ where $R^1$ is a hydrocarbyl group having from 6 to 30 carbon atoms, and n is independently an integer from 1 to 20.

16. The catalyst of claim 12 wherein the catalyst modifier comprises at least one compound represented by the formula: $R^1N((CH_2)_nOH)_2$ where $R^1$ is a hydrocarbyl group having from 6 to 30 carbon atoms, and n is 2 or 3.

17. The catalyst of claim 12 wherein the catalyst modifier comprises at least one compound represented by the formula: $R^1N(CH_2CH_2OH)_2$ where $R^1$ is a hydrocarbyl group having from 8 to 22 carbon atoms.

18. The catalyst of claim 12 wherein the catalyst modifier comprises a compound represented by the formula: $C_{18}H_{37}N(CH2CH2OH)_2$.

19. The catalyst claim 12 wherein the catalyst modifier comprises compounds represented by the formulas: $C_{13}H_{27}N(CH_2CH_2OH)_2$ and $C_{15}H_{31}N(CH_2CH_2OH)_2$.

20. The catalyst of claim 12 wherein the catalyst modifier is a mixture of compounds represented by the formula: $R^1N(CH_2CH_2OH)_2$ where $R^1$ is a hydrocarbyl group having from 8 to 18 carbon atoms.

21. The catalyst of claim 12 wherein the cocatalyst is selected from ionic activators, alkylaluminoxanes and mixtures thereof.

22. The catalyst of claim 12 wherein the inert support is silica.

* * * * *